US012743193B2

(12) United States Patent
Jiang et al.

(10) Patent No.: US 12,743,193 B2
(45) Date of Patent: Sep. 22, 2026

(54) INFORMATION DISPLAY METHOD AND ELECTRONIC DEVICE

(71) Applicant: Huawei Technologies Co., Ltd., Shenzhen (CN)

(72) Inventors: Yantao Jiang, Shenzhen (CN); Feng Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 151 days.

(21) Appl. No.: 18/497,800

(22) Filed: Oct. 30, 2023

(65) Prior Publication Data

US 2024/0061558 A1 Feb. 22, 2024

Related U.S. Application Data

(63) Continuation of application No. PCT/CN2021/141789, filed on Dec. 27, 2021.

(30) Foreign Application Priority Data

Apr. 30, 2021 (CN) ........................ 202110485851.X

(51) Int. Cl.

*G06F 3/048* (2013.01)
*G06F 3/0482* (2013.01)
*G06F 3/0484* (2022.01)
*G06Q 10/1093* (2023.01)

(52) U.S. Cl.

CPC .......... *G06F 3/0484* (2013.01); *G06F 3/0482* (2013.01); *G06Q 10/1093* (2013.01)

(58) Field of Classification Search

None

See application file for complete search history.

(56) References Cited

U.S. PATENT DOCUMENTS

| | | | | |
|---|---|---|---|---|
| 11,494,440 | B1 * | 11/2022 | Black | G06F 40/35 |
| 2009/0100347 | A1 * | 4/2009 | Schemers | G06Q 10/109 715/781 |
| 2011/0212711 | A1 * | 9/2011 | Scott | H04L 67/04 455/414.2 |
| 2014/0344249 | A1 * | 11/2014 | Magistrado | G06F 16/9032 707/722 |
| 2016/0308794 | A1 * | 10/2016 | Kim | H04L 51/02 |

(Continued)

FOREIGN PATENT DOCUMENTS

| | | | |
|---|---|---|---|
| CN | 103428349 | A | 12/2013 |
| CN | 104461561 | A | 3/2015 |
| CN | 109669596 | A | 4/2019 |

*Primary Examiner* — Thanh T Vu

(74) *Attorney, Agent, or Firm* — Conley Rose, P.C.

(57) ABSTRACT

An information display method includes: receiving a first operation performed by a user on a date label or a time label displayed on a first interface of a first application, where the date label indicates a date corresponding to information displayed on the first interface, and the time label indicates time information corresponding to the information displayed on the first interface; displaying an operation menu in response to the first operation, where the operation menu includes a first control; receiving a second operation performed by the user on the first control; and displaying, in response to the second operation, a historical information record corresponding to a first date or a first time period.

20 Claims, 65 Drawing Sheets

(56) References Cited

U.S. PATENT DOCUMENTS

| | | | | |
|---|---|---|---|---|
| 2017/0235739 | A1* | 8/2017 | Yang | G06F 16/447 715/781 |
| 2018/0225038 | A1* | 8/2018 | Kennedy | G06F 3/04842 |
| 2018/0337918 | A1* | 11/2018 | Chang | H04L 63/108 |
| 2021/0027211 | A1* | 1/2021 | Akimoto | G01C 21/3889 |

* cited by examiner

104

5G 5G 8:00

Search Chat Records

Receiving unit 1901

Display unit 1902

INFORMATION DISPLAY METHOD AND ELECTRONIC DEVICE

CROSS-REFERENCE TO RELATED APPLICATIONS

This is a continuation of International Patent Application No. PCT/CN2021/141789, filed on Dec. 27, 2021, which claims priority to Chinese Patent Application No. 202110485851.X, filed on Apr. 30, 2021, both of which are incorporated by reference.

FIELD

This disclosure relates to the field of electronic devices, and in particular, to an information display method and an electronic device.

BACKGROUND

With development of information technologies, people are surrounded by a lot of information in life. It is indispensable to send and receive information and search for information by using electronic devices in people's life and work.

In the conventional technology, when a user needs to search for a piece of information in an electronic device, the user usually needs to perform cumbersome operations. For example, in an instant messaging application, when the user needs to search for a historical message of a chat group in a historical time period, the user needs to first tap an icon in an upper right corner on a chat interface 101 of the chat group shown in FIG. 1A, to enter a group details interface 102 shown in FIG. 1B. Then, on the group details interface 102, the user taps "Search chat records", to enter a search interface 103 shown in FIG. 1C. Then, on the search interface 103, the user taps "Date", to enter a calendar interface 104 shown in FIG. 1D. Subsequently, after the user selects a corresponding date on the calendar interface 104, the electronic device displays a historical message corresponding to the date.

Therefore, how to prevent a user from performing cumbersome operations during information searching is a problem that needs to be resolved currently.

SUMMARY

Embodiments of this disclosure provide an information display method and an electronic device, so as to resolve a problem that a user needs to perform complex and cumbersome operations when searching for information by using an electronic device.

To achieve the foregoing objective, the following technical solutions are used in the embodiments of this disclosure.

According to a first aspect, an information display method is provided. The method is applied to an electronic device, and the method includes: receiving a first operation performed by a user on a date label or a time label displayed on a first interface of a first application, where the date label indicates a date corresponding to information displayed on the first interface, and the time label indicates time information corresponding to the information displayed on the first interface; displaying an operation menu in response to the first operation, where the operation menu includes a first control; receiving a second operation performed by the user on the first control; and displaying, in response to the second operation, a historical information record corresponding to a first date or a first time period.

In the foregoing method in this disclosure, after the electronic device receives the first operation performed by the user on the date label displayed on the first interface of the first application (such as an instant messaging application), the operation menu displayed by the electronic device in response to the first operation may include a control. After receiving a second operation performed by the user on the control a, the electronic device displays a historical information record in a manner corresponding to the control. For example, the historical information record is displayed based on a time period corresponding to the control, the historical information record is displayed based on a date corresponding to the control, and the historical information record is displayed based on a date selected by the user in a calendar triggered to be displayed by using the control. Compared with the conventional technology, the foregoing method improves user experience because the user can complete information search and display by performing fewer steps.

It should be noted that, in a specific implementation process, the first interface of the first application may be various interfaces that display information having a corresponding time or date. For example, the first application may be an instant messaging application, an email application, an SMS application, a call application, a schedule application, or a calendar application. The first interface of the first application may be a chat interface of the instant messaging application, an email list interface of the email application, an SMS list interface of the SMS application, a call record list interface of the call application, a schedule list interface of the schedule application or the calendar application, or the like. In other words, in this embodiment, specific types of the first application and the first interface may not be limited. In addition, an example in which the first operation and the second operation each are a tap operation is used for description in the foregoing example. It is easy to understand that, in some implementation scenarios, the first operation and the second operation each may alternatively be any one of a double-tap operation, a triple-tap operation, a touch and hold operation, a press operation, or the like. In this case, similar to the foregoing example, after receiving the double-tap operation, the triple-tap operation, the touch and hold operation, or the press operation, the electronic device performs a subsequent step in response to the operation. In other words, specific forms of the first operation and the second operation may not be limited in this disclosure.

In a possible design, content displayed on the first control includes information indicating the first date or information indicating the first time period. According to the foregoing design, the user may learn of, by reading the content displayed on the first control, a historical information record corresponding to the control, so that the user can select an appropriate control to trigger an operation.

In a possible design, the first date is consistent with a date indicated by the date label; or the first time period corresponds to a time indicated by the time information indicated by the time label. According to the foregoing design, an effect of quickly displaying a historical information record in a date corresponding to the date label or displaying a historical information record in a time period corresponding to a time information indicated by the time label can be achieved, so that user experience is improved.

In a possible design, the displaying, in response to the second operation, a historical information record corresponding to a first date or a first time period includes:

displaying a second interface in response to the second operation, where the second interface includes a calendar; and after receiving a third operation that the user selects the first date in the calendar, displaying the historical information record corresponding to the first date. According to the foregoing design, according to a user selection, by performing an operation that the user selects a date in the calendar, a historical information record on the date that the user needs to view can be quickly viewed.

In a possible design, the displaying a historical information record corresponding to a first date or a first time period includes: displaying a historical information record of the first application on the first date or within the first time period. According to the foregoing design, the user can trigger display of the historical information record in the first application by performing the first operation and the second operation on an interface of the first application, so that the user can quickly view the historical information record in the first application.

In a possible design, the content displayed on the first control includes an identifier of a second application, and the second application is different from the first application. In addition, the displaying a historical information record corresponding to a first date or a first time period includes: displaying a historical information record of the second application on the first date or within the first time period. According to the foregoing design, the user can trigger display of the historical information record in the second application by performing the first operation and the second operation on the interface of the first application, so that the user can quickly view the historical information record in the second application.

In a possible design, the displaying a historical information record of the second application on the first date or within the first time period includes: determining the second application based on the identifier of the second application; determining the historical information record of the second application on the first date or within the first time period; and displaying a third interface, where the third interface includes the historical information record of the second application on the first date or within the first time period. According to the foregoing design, after receiving the second operation performed by the user, the electronic device can search for the historical information record in the second application, to display the historical information record on the third interface.

In a possible design, the second application is any one of an instant messaging application, an email application, a schedule application, a calendar application, a call application, or an SMS application.

In a possible design, the first application is any one of an instant messaging application, an email application, a schedule application, a calendar application, a call application, or an SMS application.

According to a second aspect, an information display method is provided. The method is applied to an electronic device, and the method includes: receiving a first operation performed by a user on a date label or a time label displayed on a first interface of a first application, where the date label indicates a date corresponding to information displayed on the first interface, and the time label indicates time information corresponding to the information displayed on the first interface; and displaying, in response to the first operation, a historical information record corresponding to a first date or a first time period. In the foregoing method, when the user performs the first operation on the date label or the time label corresponding to the information displayed on the first interface of the first application, the electronic device displays the historical information record in response to the first operation, so that the historical information record can be conveniently viewed.

In a possible design, the first date is consistent with a date indicated by the date label; or the first time period corresponds to a time indicated by the time information indicated by the time label. According to the foregoing design, an effect of quickly displaying a historical information record in a date corresponding to the date label or displaying a historical information record in a time period corresponding to a time information indicated by the time label can be achieved, so that user experience is improved.

In a possible design, the displaying, in response to the first operation, a historical information record corresponding to a first date or a first time period includes: displaying a second interface in response to the first operation, where the second interface includes a calendar; and after receiving a third operation that the user selects the first date in the calendar, displaying the historical information record corresponding to the first date. According to the foregoing design, according to a user selection, by performing an operation that the user selects a date in the calendar, a historical information record on the date that the user needs to view can be quickly viewed.

In a possible design, the displaying a historical information record corresponding to a first date or a first time period includes: displaying a historical information record of the first application on the first date or within the first time period. According to the foregoing design, the user can trigger display of the historical information record in the first application by performing the first operation and the second operation on the interface of the first application, so that the user can quickly view the historical information record in the first application.

In a possible design, the displaying a historical information record corresponding to a first date or a first time period includes: displaying a historical information record of a second application on the first date or within the first time period, where the second application is different from the first application. According to the foregoing design, the user can trigger display of the historical information record in the second application by performing the first operation and the second operation on the interface of the first application, so that the user can quickly view the historical information record in the second application.

In a possible design, the second application is any one of an instant messaging application, an email application, a schedule application, a calendar application, a call application, or an SMS application.

In a possible design, the first application is any one of an instant messaging application, an email application, a schedule application, a calendar application, a call application, or an SMS application.

According to a third aspect, an electronic device is provided, including a receiving unit and a display unit. The receiving unit is configured to receive a first operation performed by a user on a date label or a time label displayed on a first interface of a first application, where the date label indicates a date corresponding to information displayed on the first interface, and the time label indicates time information corresponding to the information displayed on the first interface. The display unit is configured to display an operation menu in response to the first operation, where the operation menu includes a first control. The receiving unit is further configured to receive a second operation performed by the user on the first control. The display unit is configured to display, in response to the second operation, a historical information record corresponding to a first date or a first time period.

In a possible design, content displayed on the first control includes information indicating the first date or information indicating the first time period.

In a possible design, the first date is consistent with a date indicated by the date label; or the first time period corresponds to a time indicated by the time information indicated by the time label.

In a possible design, that the display unit is configured to display, in response to the second operation, a historical information record corresponding to a first date or a first time period includes: the display unit is further configured to display a second interface in response to the second operation, where the second interface includes a calendar; and the display unit is further configured to: after receiving a third operation that the user selects the first date in the calendar, display the historical information record corresponding to the first date.

In a possible design, the displaying a historical information record corresponding to a first date or a first time period includes: displaying a historical information record of the first application on the first date or within the first time period.

In a possible design, the content displayed on the first control includes an identifier of a second application, and the second application is different from the first application. The displaying a historical information record corresponding to a first date or a first time period includes: displaying a historical information record of the second application on the first date or within the first time period.

In a possible design, the displaying a historical information record of the second application on the first date or within the first time period includes: determining the second application based on the identifier of the second application; determining the historical information record of the second application on the first date or within the first time period; and displaying a third interface, where the third interface includes the historical information record of the second application on the first date or within the first time period.

In a possible design, the second application is any one of an instant messaging application, an email application, a schedule application, a calendar application, a call application, or an SMS application.

In a possible design, the first application is any one of an instant messaging application, an email application, a schedule application, a calendar application, a call application, or an SMS application.

According to a fourth aspect, an electronic device is provided, including a receiving unit and a display unit. The receiving unit is configured to receive a first operation performed by a user on a date label or a time label displayed on a first interface of a first application, where the date label indicates a date corresponding to information displayed on the first interface, and the time label indicates time information corresponding to the information displayed on the first interface. The display unit is configured to display, in response to the first operation, a historical information record corresponding to a first date or a first time period.

Optionally, the first date is consistent with a date indicated by the date label; or the first time period corresponds to a time indicated by the time information indicated by the time label.

Optionally, that the display unit is configured to display, in response to the first operation, a historical information record corresponding to a first date or a first time period includes: the display unit is further configured to display a second interface in response to the first operation, where the second interface includes a calendar; and the display unit is further configured to: after receiving a third operation that the user selects the first date in the calendar, display the historical information record corresponding to the first date.

Optionally, the displaying a historical information record corresponding to a first date or a first time period includes: displaying a historical information record of the first application on the first date or within the first time period.

Optionally, the displaying a historical information record corresponding to a first date or a first time period includes: displaying a historical information record of a second application on the first date or within the first time period, where the second application is different from the first application.

Optionally, the second application is any one of an instant messaging application, an email application, a schedule application, a calendar application, a call application, or an SMS application.

Optionally, the first application is any one of an instant messaging application, an email application, a schedule application, a calendar application, a call application, or an SMS application.

According to a fifth aspect, an electronic device is provided, and the electronic device includes: a processor, a memory, and a touchscreen. The processor, the touchscreen, and the memory are coupled, the memory is configured to store computer program code, the computer program code includes computer instructions, and when the computer instructions are executed by the electronic device, the electronic device is enabled to perform the information display method according to any one of the first aspect and the designs of the first aspect or according to any one of the second aspect and the designs of the second aspect.

According to a sixth aspect, a computer-readable storage medium is provided, including computer software instructions. When the computer software instructions are run in an electronic device, the electronic device is enabled to perform the information display method according to any one of the first aspect and the designs of the first aspect or according to any one of the second aspect and the designs of the second aspect.

According to a seventh aspect, a computer program product is provided. When the computer program product runs on a computer, the computer is enabled to perform the information display method according to any one of the first aspect and the designs of the first aspect or according to any one of the second aspect and the designs of the second aspect.

It should be understood that descriptions of technical features, technical solutions, beneficial effects, or similar languages in this disclosure do not imply that all features and advantages can be implemented in any single embodiment. On the contrary, it may be understood that the description of a feature or a beneficial effect means that at least one embodiment includes a specific technical feature, technical solution, or beneficial effect. Therefore, the descriptions of the technical features, the technical solutions, or the beneficial effects in this disclosure may not indicate a same embodiment. Further, the technical features, the technical solutions, and the beneficial effects described in the embodiments may be combined in any appropriate manner. A person skilled in the art may understand that an embodiment may be implemented without one or more specific technical features, technical solutions, or beneficial effect in a specific embodiment. In other embodiments, additional technical features and beneficial effects may also be identified in specific embodiments that do not embody all embodiments.

BRIEF DESCRIPTION OF THE DRAWINGS

FIG. 1A to FIG. 1D are a schematic diagram of an interface displayed on an electronic device according to the conventional technology.

FIG. 3A to FIG. 3C are a schematic diagram 1 of an interface displayed on an electronic device according to an embodiment.

FIG. 7A to FIG. 7D are a schematic diagram 5 of an interface displayed on an electronic device according to an embodiment.

FIG. 8A to FIG. 8E are a schematic diagram 6 of an interface displayed on an electronic device according to an embodiment.

FIG. 13A to FIG. 13C are a schematic diagram 13 of an interface displayed on an electronic device according to an embodiment.

FIG. 15D and FIG. 15E are a schematic diagram 16 of an interface displayed on an electronic device according to an embodiment.

DETAILED DESCRIPTION

The following describes technical solutions in embodiments of this disclosure with reference to accompanying drawings in the embodiments of this disclosure. To clearly describe the technical solutions in the embodiments of this disclosure, terms such as "first" and "second" are used in the embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in the embodiments of this disclosure, a word such as "example" or "for example" is used to represent an example, an instance, or an illustration, and the word such as "example" or "for example" is used to present a related concept in a specific manner for ease of understanding.

An embodiment of this disclosure provides an information display method. The method may be applied to an electronic device. After detecting that a user enters an operation at a specific location of a touchscreen, the electronic device may display a corresponding interface and information based on the operation.

For example, the electronic device in this embodiment of this disclosure may be an electronic device having a touchscreen, such as a mobile phone, a tablet computer, a desktop computer, a laptop computer, a handheld computer, a notebook computer, an ultra-mobile personal computer (UMPC), a netbook, a cellular phone, a personal digital assistant (PDA), or an augmented reality (AR)/virtual reality (VR) device. A specific form of the device is not specially limited in this embodiment of this disclosure.

The following describes implementations of embodiments of this disclosure in detail with reference to the accompanying drawings.

Figure 2:
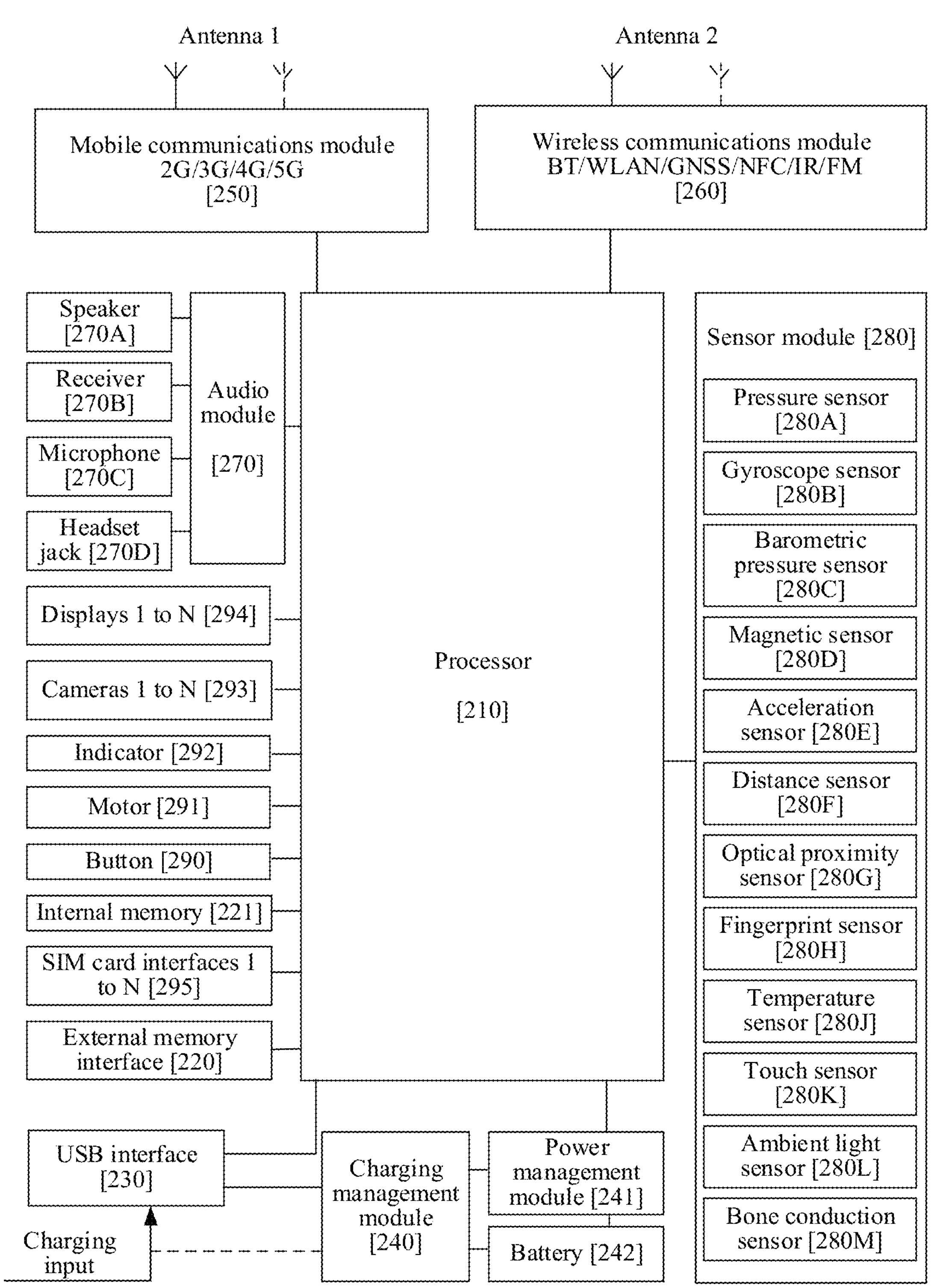
FIG. 2 is a schematic diagram 1 of a structure of an electronic device according to an embodiment.

FIG. 2 is a schematic diagram of a structure of an electronic device according to an embodiment of this disclosure. As shown in FIG. 2, the electronic device may include a processor 210, an external memory interface 220, an internal memory 221, a Universal Serial Bus (USB) interface 230, a charging management module 240, a power management module 241, a battery 242, an antenna 1, an antenna 2, a mobile communications module 250, a wireless communications module 260, an audio module 270, a sensor module 280, a button 290, a motor 291, an indicator 292, a camera 293, a display 294, a subscriber identity module (SIM) card interface 295, and the like. The audio module 270 may include a speaker 270A, a receiver 270B, a microphone 270C, a headset jack 270D, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment does not constitute a specific limitation on the electronic device. In some other embodiments, the electronic device may include more or fewer components than those shown in the figure, or may combine some components, or may split some components, or may have different component arrangements. The components shown in the figure may be implemented by using hardware, software, or a combination of software and hardware.

The processor 210 may include one or more processing units. For example, the processor 210 may include a central processing unit, an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device. The controller may generate an operation control signal based on an instruction operation code and a time sequence signal, to complete control of instruction fetching and instruction execution.

The memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

It may be understood that an interface connection relationship between the modules shown in this embodiment is merely used as an example for description, and does not constitute a limitation on the structure of the electronic device. In some other embodiments, the electronic device may alternatively use an interface connection manner different from that in the foregoing embodiment, or use a combination of a plurality of interface connection manners.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the electronic device. When charging the battery 242, the charging management module 240 may further supply power to the electronic device by using the power management module 241.

The power management module 241 is configured to connect to the battery 242, the charging management module 240, and the processor 210. The power management module 241 receives an input from the battery 242 and/or an input from the charging management module 240, and supplies power to the processor 210, the internal memory 221, an external memory, the display 294, the camera 293, the wireless communications module 260, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same component.

A wireless communication function of the electronic device may be implemented by using the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device may be configured to cover one or more communications frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communications module 250 may provide a solution that is applied to the electronic device and that includes wireless communication such as 2G/3G/4G/5G. The mobile communications module 250 may include at least one filter, a switch, a power amplifier, a low-noise amplifier (LNA), and the like. The mobile communications module 250 may receive an electromagnetic wave through the antenna 1, perform processing such as filtering or amplification on the received electromagnetic wave, and transmit a processed electromagnetic wave to the modem processor for demodulation. The mobile communications module 250 may further amplify a signal modulated by the modem processor, and convert an amplified signal into an electromagnetic wave for radiation through the antenna 1. In some embodiments, at least some function modules in the mobile communications module 250 may be disposed in the processor 210. In some embodiments, at least some function modules in the mobile communications module 250 may be disposed in a same component as at least some modules in the processor 210.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal through an audio device (not limited to the speaker 270A, the receiver 270B, and the like), and displays an image or a video through the display 294. In some embodiments, the modem processor may be an independent component. In some other embodiments, the modem processor may be independent of the processor 210, and is disposed in a same device as the mobile communications module 250 or another function module.

The wireless communications module 260 may provide a solution that is applied to the electronic device and that includes wireless communication such as a wireless local area network (WLAN) (for example, a wireless fidelity (Wi-Fi) network), Bluetooth (BT), a global navigation satellite system (GNSS), frequency modulation (FM), a near-field communication (NFC) technology, and an infrared (IR)

technology. The wireless communications module 260 may be one or more components integrating at least one communications processing module. The wireless communications module 260 receives an electromagnetic wave through the antenna 2, performs frequency modulation and filtering processing on the electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

In some embodiments, in the electronic device, the antenna 1 and the mobile communications module 250 are coupled, and the antenna 2 and the wireless communications module 260 are coupled, so that the electronic device can communicate with a network and another device by using a wireless communications technology. The wireless communications technology may include a Global System for Mobile Communications (GSM), a general packet radio service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change displayed information.

The display 294 is configured to display an image, a video, or the like. The display 294 includes a display panel. The display panel may be a liquid-crystal display (LCD), an organic light-emitting diode (OLED), an active-matrix organic light-emitting diode (a AMOLED), a flexible light-emitting diode (FLED), a mini-LED, a micro-LED, a micro-OLED, a quantum dot light emitting diode (QLED), or the like. In some embodiments, the electronic device may include one or N displays 294, where N is a positive integer greater than 1.

The electronic device may implement a photographing function by using the ISP, the camera 293, the video codec, the GPU, the display 294, the application processor, or the like.

The camera 293 is configured to capture a static image or a video. An object is projected onto a photosensitive element by generating an optical image through a lens. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal of a format such as RGB or YUV. In some embodiments, the electronic device may include one or N cameras 293, where N is a positive integer greater than 1.

The external memory interface 220 may be configured to connect to an external storage card, for example, a micro SD card, to expand a storage capability of the electronic device. The external storage card communicates with the processor 210 through the external memory interface 220, to implement a data storage function. For example, files such as music and videos are stored in the external storage card.

The internal memory 221 may be configured to store computer-executable program code. The executable program code includes instructions. The processor 210 executes various function applications of the electronic device and data processing by running the instructions stored in the internal memory 221. For example, in this embodiment of this disclosure, when receiving an operation entered by a user at a specific location of a touchscreen, by executing the instructions stored in the internal memory 221, the processor 210 may display a corresponding interface such as a desktop, an upper-level interface of a current interface, or a multi-task interface as a response to the operation. For another example, by executing the instructions stored in the internal memory 221, the processor 210 may start a navigation mode after receiving a specific operation of a user or an operation entered at a specific location or detecting a specific holding posture of the user. In the navigation mode, if an operation entered by the user on a touchscreen is received, a corresponding interface such as a desktop, an upper-level interface of a current interface, or a multi-task interface is displayed as a response to the operation. The internal memory 221 may include a program storage area and a data storage area. The program storage area may store an operating system, an application that may be used by at least one function (for example, a sound playing function or an image playing function), and the like. The data storage area may store data (for example, audio data or an address book) and the like created when the electronic device is used. In addition, the internal memory 221 may include a high-speed random access memory, or may include a non-volatile memory, for example, at least one magnetic disk storage device, a flash memory, or a Universal Flash Storage (UFS).

The electronic device may implement an audio function such as music playing or recording by using the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to code and decode an audio signal. In some embodiments, the audio module 270 may be disposed in the processor 210, or some function modules in the audio module 270 may be disposed in the processor 210.

The speaker 270A, also referred to as a "horn", is configured to convert an audio electrical signal into a sound signal. The electronic device may listen to music or listen to a hands-free call through the speaker 270A.

The receiver 270B, also referred to as an "earpiece", is configured to convert an audio electrical signal into a sound signal. When the electronic device answers a call or voice information, the receiver 270B may be placed close to the human ear to answer the voice.

The microphone 270C, also referred to as a "mike" or a "mic", is configured to convert a sound signal into an electrical signal. When the user makes a call or sends voice information, or when the electronic device needs to be triggered to perform some functions by using a voice assistant, the user may make a sound by using the human mouth close to the microphone 270C, and enter a sound signal to the microphone 270C. At least one microphone 270C may be disposed in the electronic device. In some other embodiments, two microphones 270C may be disposed in the electronic device, to collect a sound signal and implement a noise reduction function. In some other embodiments, three, four, or more microphones 270C may alternatively be disposed in the electronic device, to collect a sound signal, implement noise reduction, identify a sound source, implement a directional recording function, and the like.

The headset jack 270D is configured to connect to a wired headset. The headset jack 270D may be a USB interface 230, or may be a 3.5 mm Open Mobile Terminal Platform (OMTP) standard interface, or a CTIA standard interface.

The pressure sensor 280A is configured to sense a pressure signal, and can convert the pressure signal into an electrical signal. In some embodiments, the pressure sensor 280A may be disposed on the display 294. There are many types of pressure sensors 280A, for example, a resistive pressure sensor, an inductive pressure sensor, and a capacitive pressure sensor. The capacitive pressure sensor may be at least two parallel plates having electrically conductive materials. When a force is applied to the pressure sensor 280A, a capacitance between electrodes changes. The electronic device determines a pressure strength based on the change of the capacitance. When a touch operation is performed on the display 294, the electronic device detects touch operation intensity based on the pressure sensor 280A. Alternatively, the electronic device may calculate a touch location based on a signal detected by the pressure sensor 280A. In some embodiments, touch operations that are performed at a same touch location but have different touch operation intensities may correspond to different operation instructions. For example, when a touch operation whose touch operation intensity is less than a first pressure threshold is performed on an SMS application icon, an instruction for searching for an SMS is executed. When a touch operation whose touch operation intensity is greater than or equal to the first pressure threshold is performed on the SMS application icon, an instruction for creating a new SMS is executed.

In addition, the gyroscope sensor 280B may be configured to determine a motion posture of the electronic device. The barometric pressure sensor 280C is configured to measure barometric pressure. The magnetic sensor 280D includes a Hall sensor. The electronic device may detect opening and closing of a flip cover leather case by using the magnetic sensor 280D. The acceleration sensor 280E may detect magnitude of accelerations of the electronic device in various directions (usually on three axes). The distance sensor 280F is configured to measure a distance. The optical proximity sensor 280G may include, for example, a light-emitting diode (LED) and a photodetector such as a photodiode. The light-emitting diode may be an infrared light-emitting diode. The electronic device emits infrared light outwards through the light-emitting diode. The electronic device uses the photodiode to detect infrared reflected light from a nearby object. When detecting sufficient reflected light, the electronic device may determine that there is an object near the electronic device. The ambient light sensor 280L is configured to sense ambient light brightness. The fingerprint sensor 280H is configured to collect a fingerprint. The electronic device may implement fingerprint unlocking, application lock access, fingerprint photographing, incoming call answering, and the like by using a collected fingerprint feature. The temperature sensor 280J is configured to detect a temperature. In some embodiments, the electronic device executes a temperature processing policy by using the temperature detected by the temperature sensor 280J.

In addition, the touch sensor 280K is also referred to as a "touch panel". The touch sensor 280K may be disposed on the display 294. The touch sensor 280K and the display 294 form a touchscreen. The touch sensor 280K is configured to detect a touch operation performed on or near the touch sensor. The touch sensor may transfer the detected touch operation to the application processor, to determine a touch event type. The display 294 may provide a visual output related to the touch operation. In some other embodiments, the touch sensor 280K may alternatively be disposed on a surface of the electronic device, and a location of the touch sensor 280K is different from that of the display 294.

The bone conduction sensor 280M may obtain a vibration signal. In some embodiments, the bone conduction sensor 280M may obtain a vibration signal of a vibration bone block of a human vocal part. The bone conduction sensor 280M may also contact a human pulse, and receive a blood pressure beat signal. In some embodiments, the bone conduction sensor 280M may alternatively be disposed in a headset, to constitute a bone conduction headset. The audio module 270 may obtain a speech signal through parsing based on the vibration signal of the vibration bone block of the human vocal part that is obtained by the bone conduction sensor 280M, to implement a speech function. The application processor may parse heart rate information based on the blood pressure beat signal obtained by the bone conduction sensor 280M, to implement a heart rate detection function.

The button 290 includes a power button, a volume button, or the like. The button 290 may be a mechanical button or a touch button. The electronic device may receive a key input, and generate a key signal input related to a user setting and function control of the electronic device.

The motor 291 may generate a vibration prompt. The motor 291 may be configured to provide an incoming call vibration prompt and a touch vibration feedback. For example, touch operations performed on different applications (such as photographing and audio playing) may correspond to different vibration feedback effects. The motor 291 may also correspond to different vibration feedback effects for touch operations performed on different areas of the display 294. Different application scenarios (for example, time reminder, information receiving, alarm clock, and game) may also correspond to different vibration feedback effects. The touch vibration feedback effect may alternatively be customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or removed from the SIM card interface 295, to implement contact with and separation from the electronic device. The electronic device may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. Types of the plurality of cards may be the same or may be different. The SIM card interface 295 is also compatible with different types of SIM cards. The SIM card interface 295 is also compatible with an external storage card. The electronic device interacts with a network through the SIM card, to implement functions such as a call and data communication. In some embodiments, the electronic device uses eSIM, that is, an embedded SIM card. The eSIM card may be embedded into the electronic device, and cannot be separated from the electronic device.

All methods in the following embodiments may be implemented on the electronic device having the foregoing hardware structure. For ease of description, the foregoing electronic device is used as an example for description below.

Currently, as shown in FIG. 1A to FIG. 1D, a historical information record that a user wants to view (for example, an SMS record, a call record, an email record, or a chat record in instant messaging) can be displayed on the electronic device only after a user performs cumbersome operations.

To simplify a user operation, an embodiment of this disclosure provides an information display method. In some embodiments of the method provided in this disclosure, to prevent a user from performing cumbersome operations during information searching, a date label or a time label corresponding to information displayed on an interface of an electronic device may be used to trigger display of a historical information record on a corresponding date or within a corresponding time period.

The information displayed on the interface may be various types of information that are displayed on the interface and that each have a corresponding time or date, for example, a chat record on a chat interface in an instant messaging application, an email in an email application, an SMS in an SMS application, a call record in a call application, and a schedule in a schedule application or a calendar application. A date label or a time label indicating date or time information corresponding to the displayed information is usually displayed on the interface.

Figure 1A:
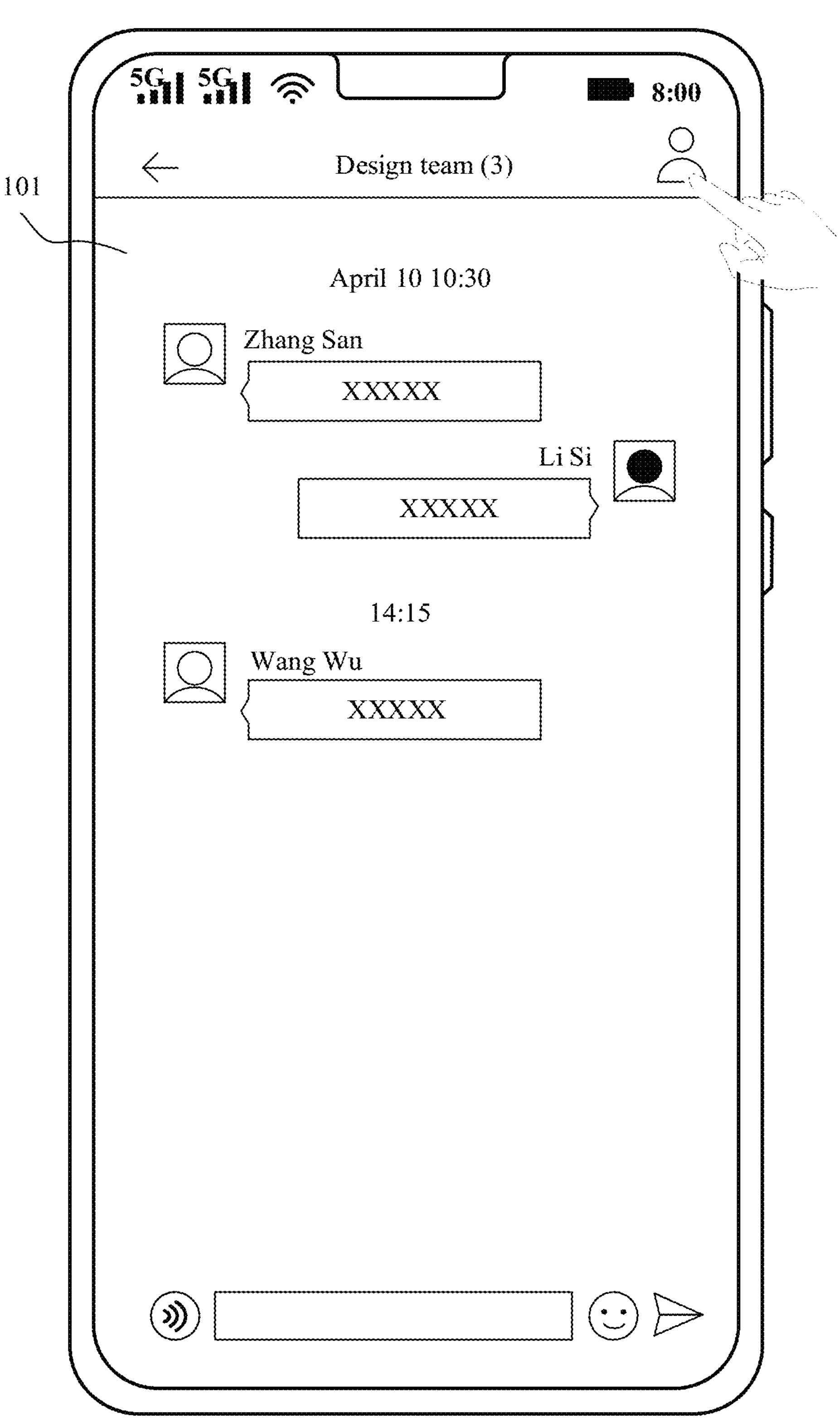
Figure 1B:
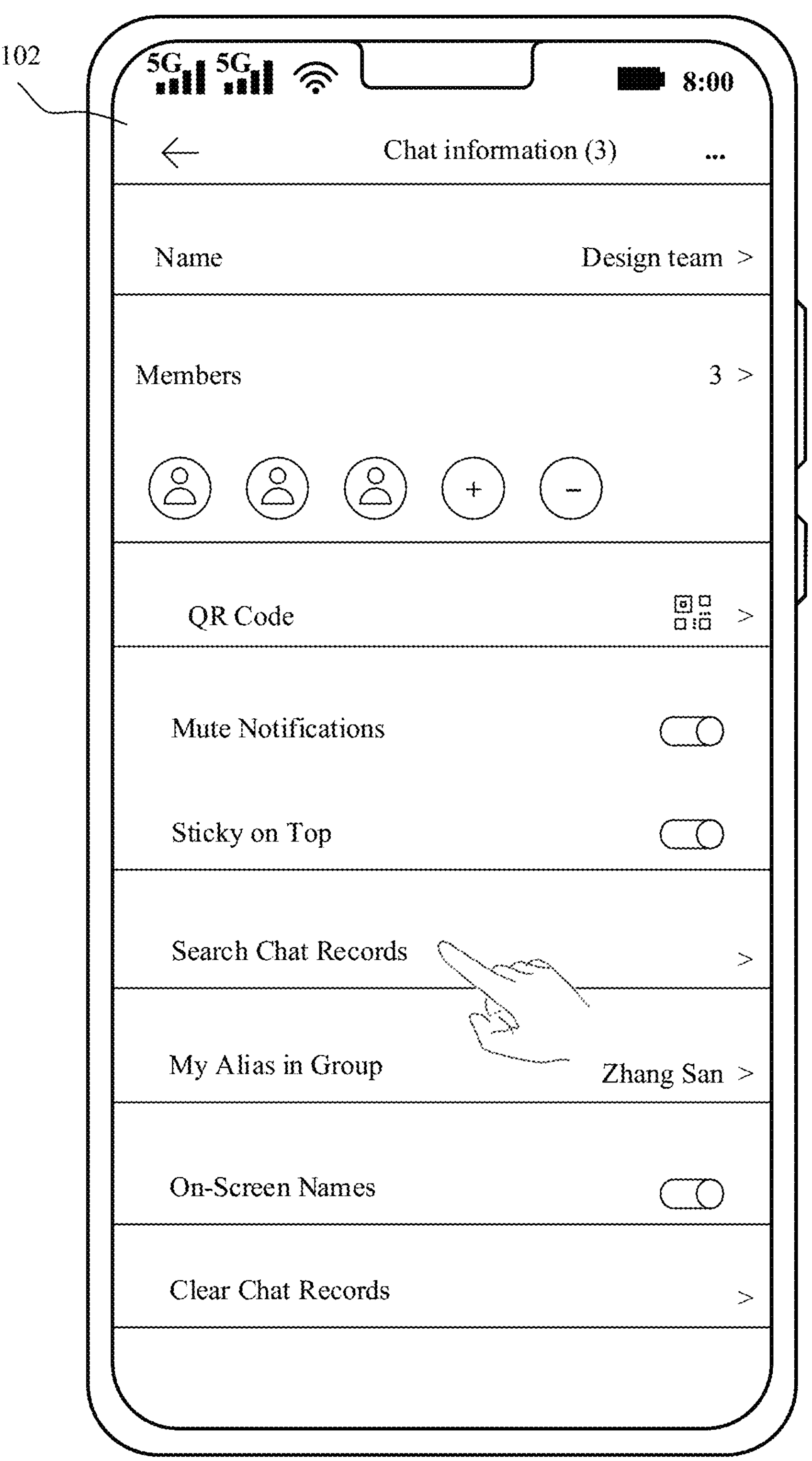
Figure 1C:
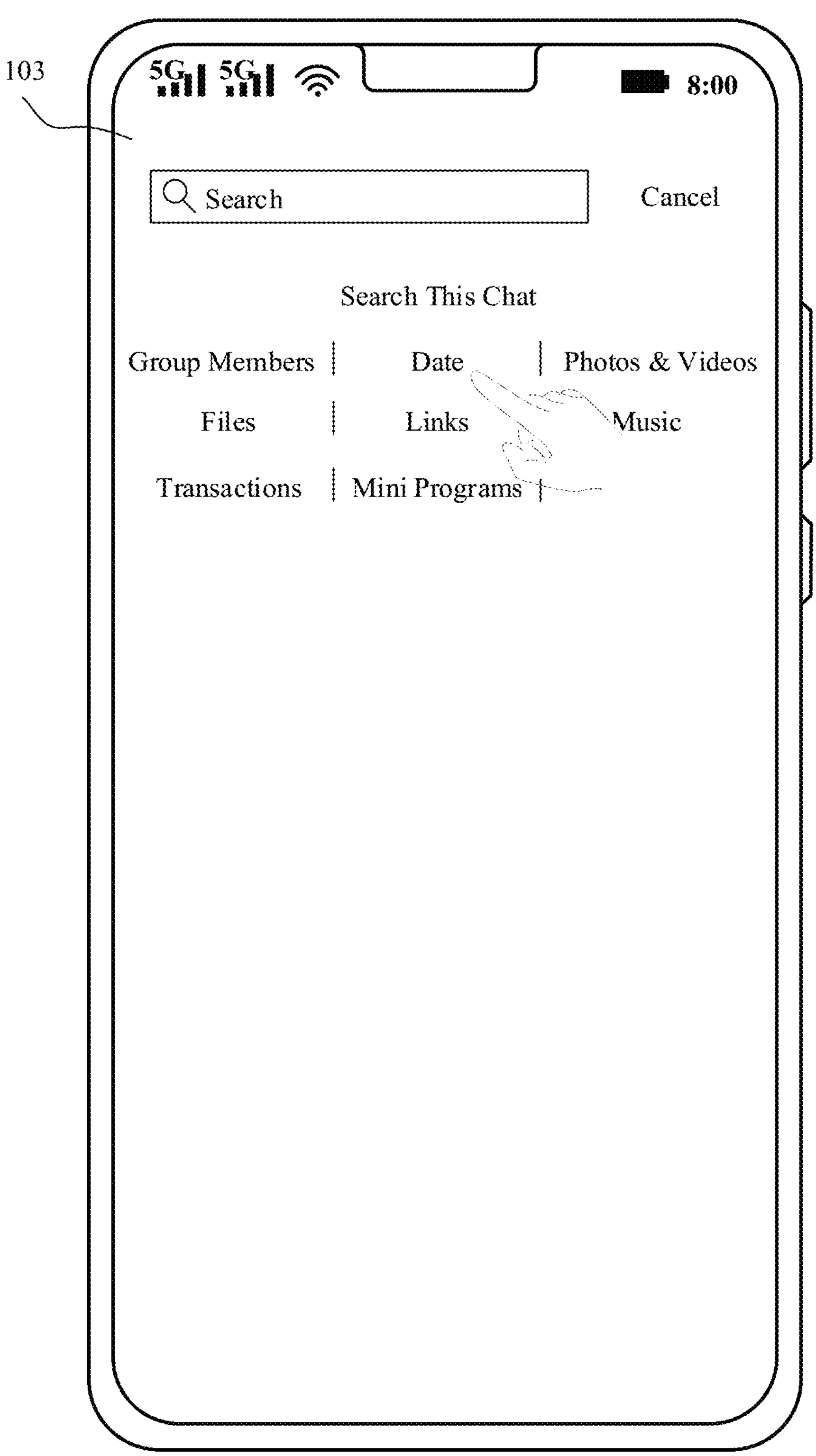
Figure 1D:
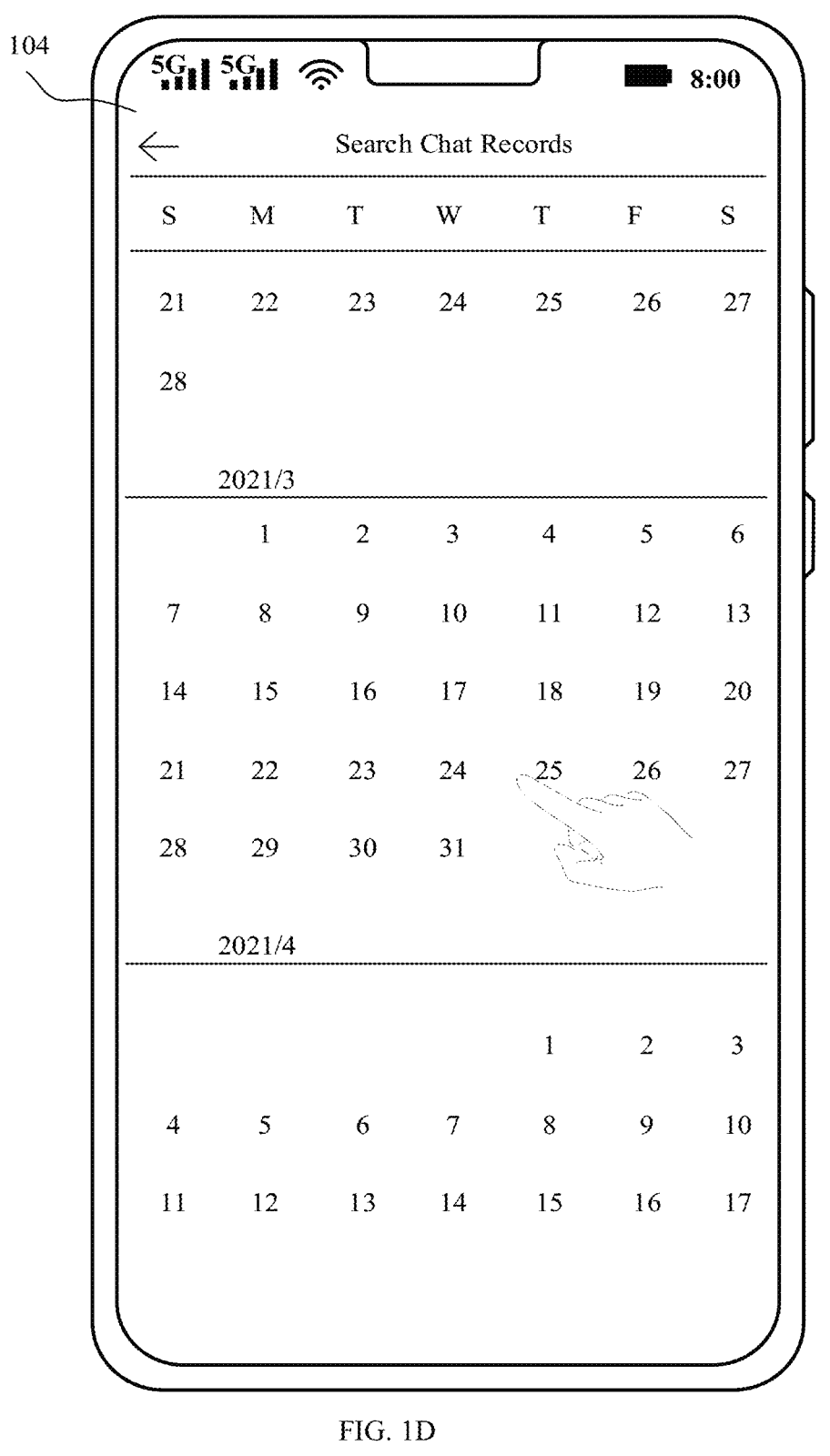

For example, on a chat interface 101 in an instant messaging application in FIG. 1A, a date label (that is, "April 10" in the figure) and a time label (that is, "10:30" in the figure) of chat content sent by Zhang San are displayed on the chat content, to indicate that the chat content corresponds to 10:30 on April 10, so as to indicate that a sending time of the chat content is 10:30 on April 10; and a time label (that is, "14:15" in the figure) of chat content sent by Wang Wu is displayed on the chat content, to indicate that the chat content corresponds to 14:15 on a current day, so as to indicate that a sending time of the chat content is 14:15 on the current day.

Figure 3A:
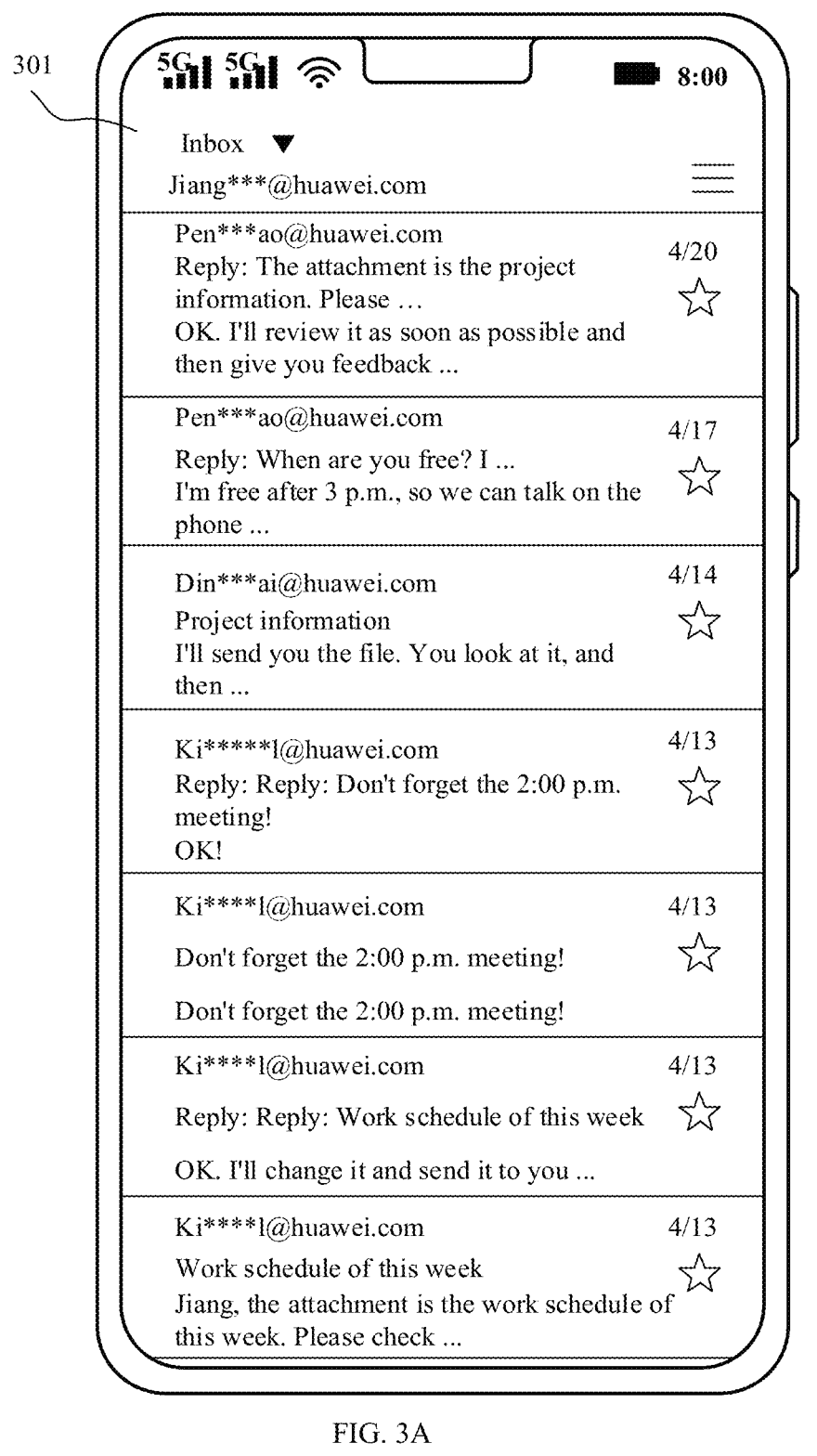

For another example, on an inbox interface 301 in an email application shown in FIG. 3A, a date label (that is, "4/20", "4/17", "4/14", or "4/13" in the figure) of each email is displayed on the email, to indicate a date corresponding to the email, so as to indicate a sending date of the email.

Figure 3B:
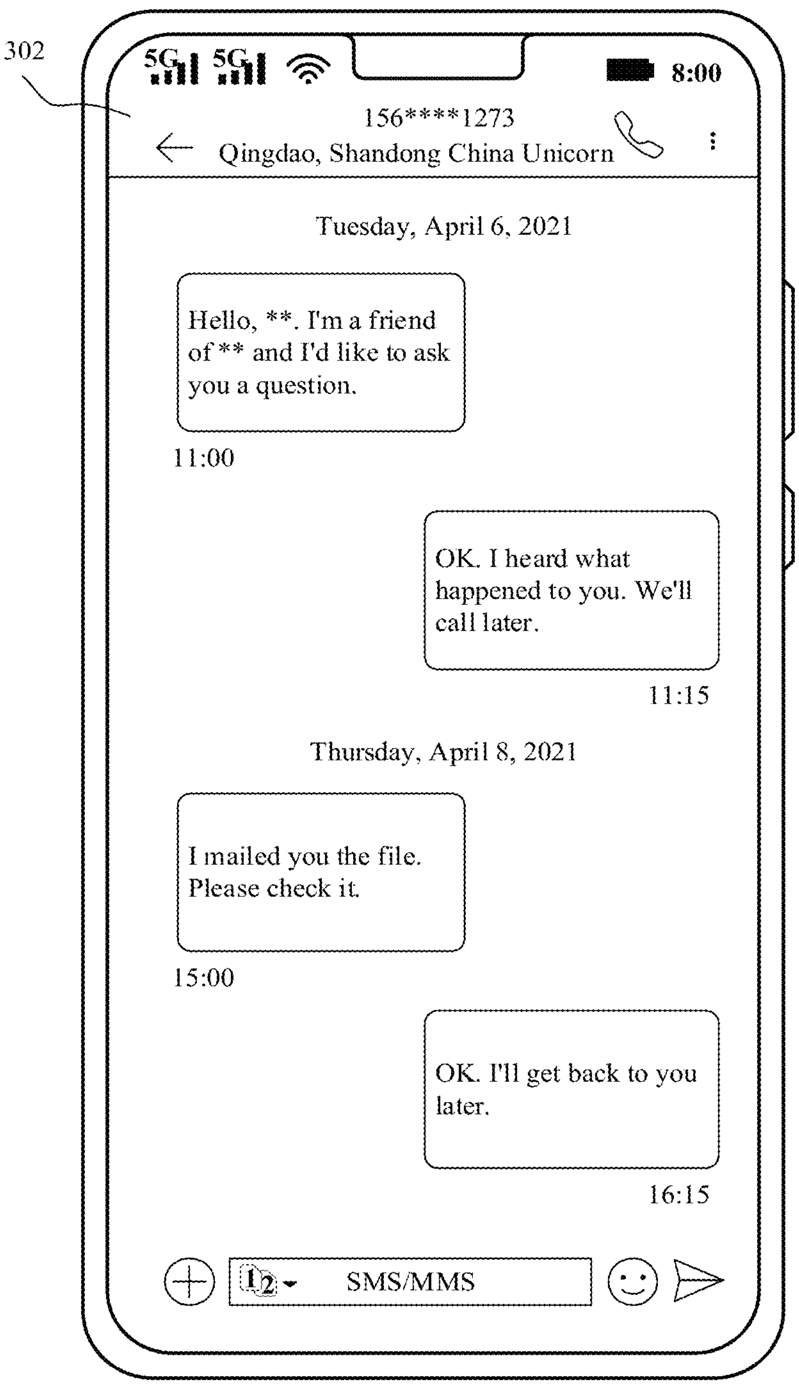

For another example, on a chat interface 302 in an SMS application shown in FIG. 3B, a date label (that is, "Tuesday, Apr. 6, 2021" or "Thursday, Apr. 8, 2021" in the figure) of an SMS and a time label (that is, "11:00", "11:15", "15:00", or "16:15" in the figure) of the SMS are displayed, to respectively indicate date and time information corresponding to the SMS.

Figure 3C:
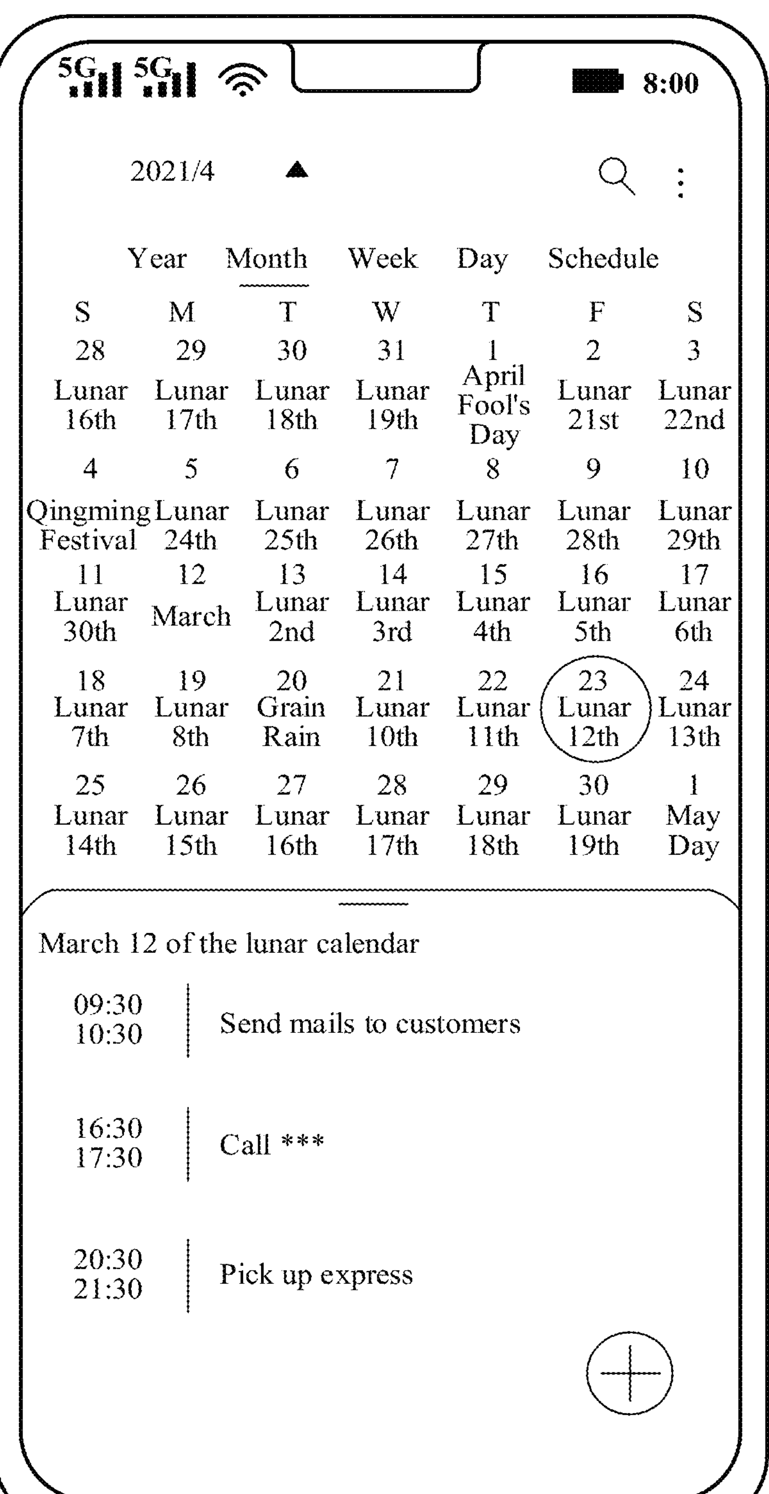

For another example, on a schedule display interface 303 in a calendar application shown in FIG. 3C, a time label (that is, "09:30 10:30", "16:30 17:30", or "20:30 21:30" in the figure) of each schedule is displayed on the schedule, to indicate a time corresponding to the schedule.

In this embodiment of this disclosure, when the user wants to search for a historical information record on the foregoing interface on which the displayed information is displayed, the user may perform an operation on the date label or the time label corresponding to the displayed information to search the historical information record, so as to prevent the user from performing cumbersome operations.

Examples are used below to describe two solutions for searching a history information record by performing an operation on a date label or a time label corresponding to displayed information.

Solution 1:

When the user performs an operation (which may be referred to as a first operation) on a date label or a time label corresponding to information displayed on an interface (which may be referred to as a first interface) in an application (which may be referred to as a first application), the electronic device may display an operation menu. The operation menu may include several controls, and each control is configured to indicate to display a historical information record in a manner corresponding to the control (information such as a text or a pattern used to prompt the user of a function of the control may be displayed on each control for the user to select). Then, when receiving an operation (which may be referred to as a second operation) performed by the user on a control in the operation menu, the electronic device displays a historical information record in a manner corresponding to the control.

The displaying a historical information record in a manner corresponding to the control may include: displaying the historical information record based on a time period corresponding to the control, displaying the historical information record based on a date corresponding to the control, displaying the historical information record based on a date selected by the user in a calendar triggered to be displayed by using the control, or the like.

The following describes a specific implementation process of the solution by using an example.

Example 1

Figure 4A:
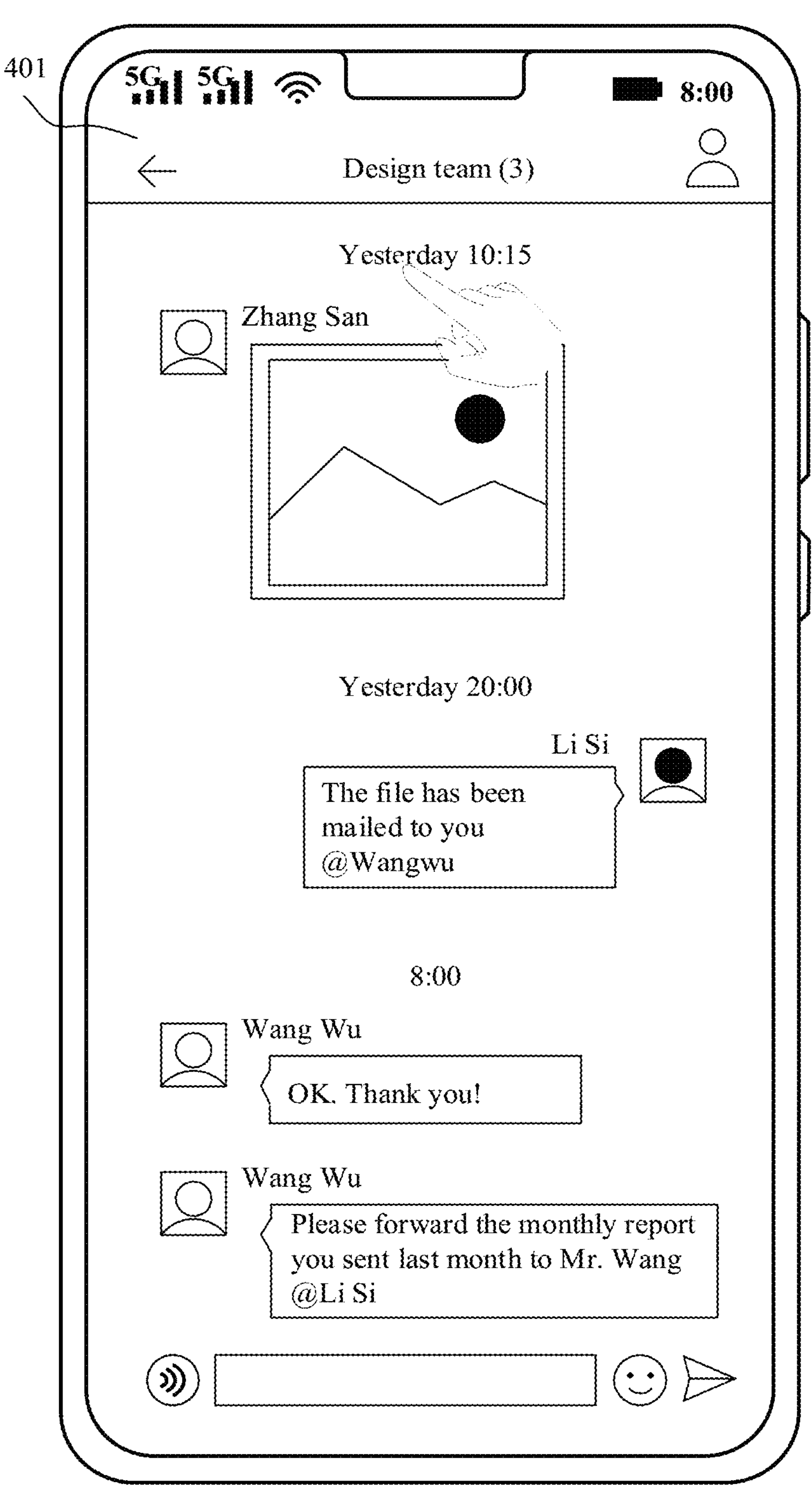
FIG. 4A to FIG. 4D are a schematic diagram 2 of an interface displayed on an electronic device according to an embodiment.
Figure 4B:
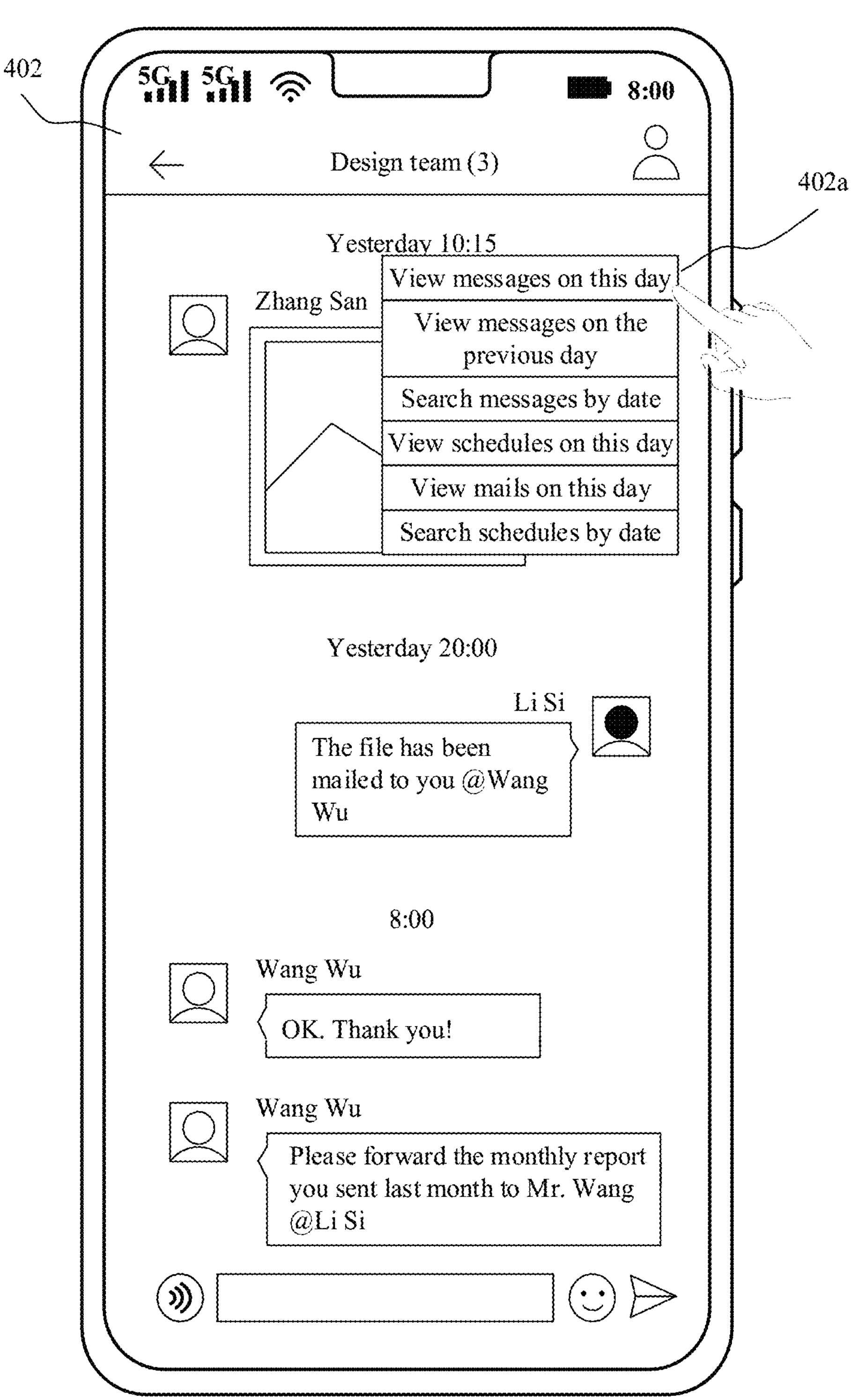

As shown in FIG. 4A, the electronic device displays a chat interface 401 (the chat interface 401 may be understood as the first interface in this application) of an instant messaging application (in this case, the instant messaging application may be understood as the first application in this application). When the electronic device receives a tap operation (the tap operation may be understood as the first operation) performed by the user on a date label "Yesterday" on the chat interface 401, as shown in FIG. 4B, the electronic device displays an operation menu 402*a* on an interface 402.

Figure 4C:
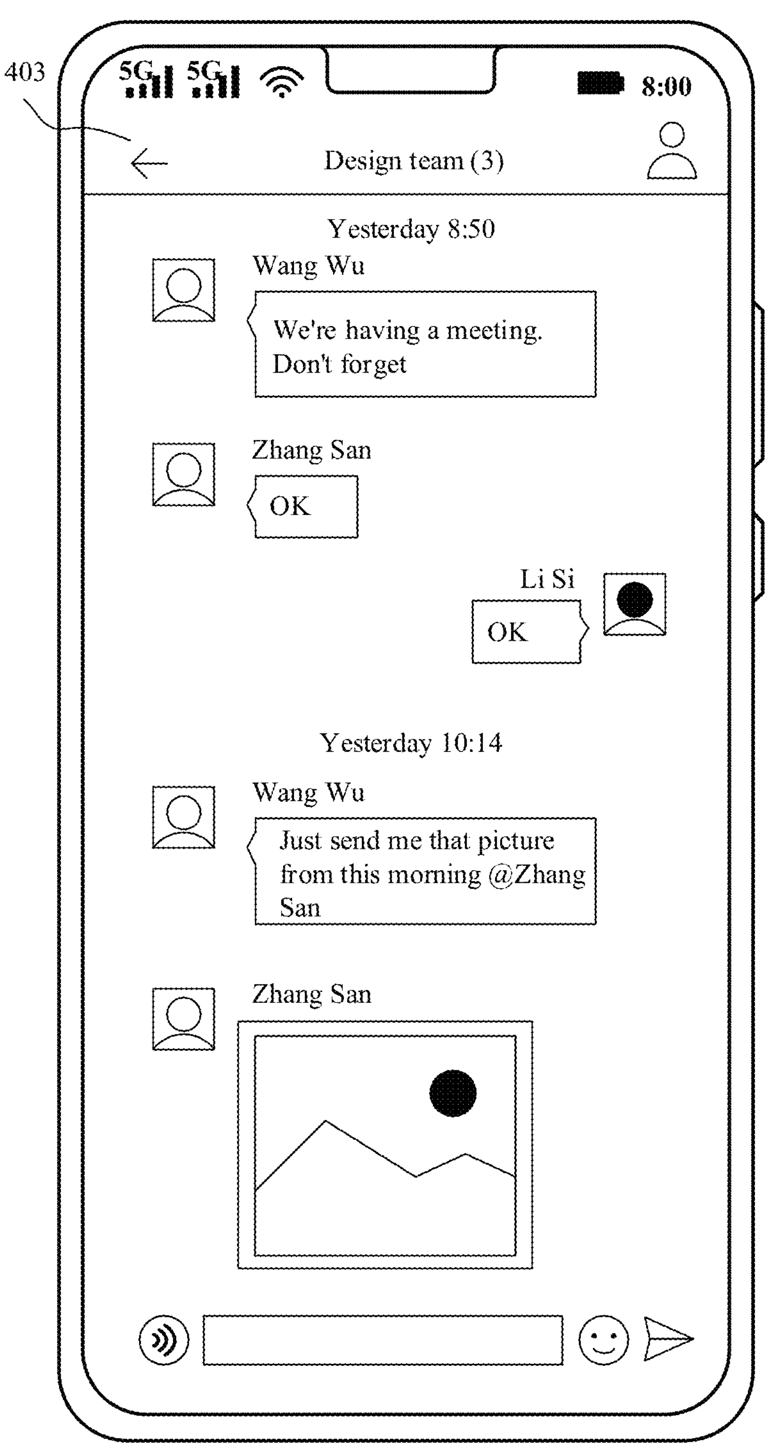

After the electronic device receives a tap operation (the tap operation may be understood as the second operation in this embodiment) performed by the user on a control on which displayed content is "View messages on this day" in the operation menu 402*a*, as shown in FIG. 4C, the electronic device displays, on an interface 403, chat records on a date (that is, "Yesterday") corresponding to the date label.

Specifically, in an implementation, when there are many chat records on the date corresponding to the date label, the electronic device may display some chat records on the date on the interface 403 in a preset manner (for example, the electronic device displays, on the interface 403, some chat records that occur earlier on the date), and then display other chat records after receiving a user operation (for example, a slide operation). For example, in the example shown in FIG. 4A to FIG. 4D, if the earliest chat record in "Yesterday" is a chat record sent by Wang Wu at 8:50 in FIG. 4C, the electronic device may display chat records that occur at a moment starting from 8:50 on the date on the interface 403 in chronological order. After receiving a slide-up operation performed by the user, the electronic device displays, on the interface, chat records that occur after 10:14 in FIG. 4C. In another implementation, when there are few chat records on the date corresponding to the date label, the electronic device may display all chat records on the date on the interface 403.

In other words, in this embodiment of this disclosure, that the electronic device displays a historical information record on a date or within a time period may be understood as follows: The electronic device displays all or some historical information records on the date or within the time period on an interface. In addition, to help the user view all the historical information records on the date or within the time period, when the electronic device displays some historical information records on the date or within the time period on the interface, the electronic device may display other historical information records on the interface after receiving a user operation. It should be noted that, for the following examples provided in this embodiment of this disclosure and similar descriptions in specific implementations described in the examples, same understanding may be performed unless otherwise specified, and details are not described below.

Figure 4D:
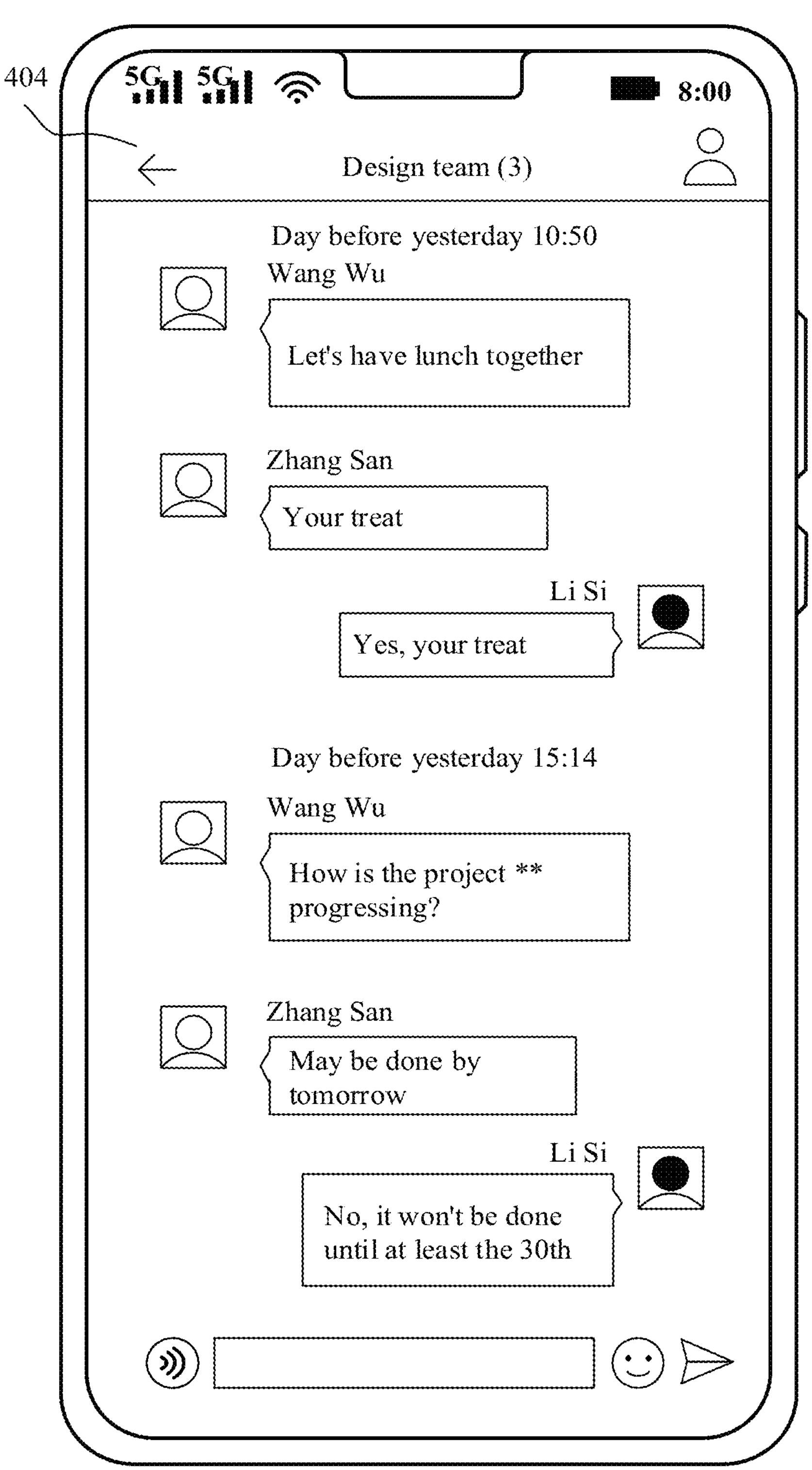

Alternatively, after the electronic device receives a tap operation (the tap operation may be understood as the second operation in this embodiment) performed by the user on a control on which displayed content is "View messages on the previous day" in the operation menu 402*a*, as shown in FIG. 4D, the electronic device displays, on an interface 404, chat records on a previous day of the date corresponding to the date label.

In other words, in this embodiment of this disclosure, after the electronic device receives the first operation performed by the user on the date label displayed on the first interface of the first application (such as the instant messaging application), the operation menu displayed by the electronic device in response to the first operation may include a control (referred to as a control a). After receiving the second operation performed by the user on the control a, the electronic device displays a historical information record of the first application on a specific date. For example, in the foregoing example, the electronic device displays a chat record of the instant messaging application on a date corresponding to a date label, or displays a chat record of the instant messaging application on a previous day of the date corresponding to the date label.

It should be noted that an example in which the first operation and the second operation each are a tap operation is used for description in the foregoing example. It is easy to understand that, in some implementation scenarios, the first operation and the second operation each may alternatively be any one of a double-tap operation, a triple-tap operation, a touch and hold operation, a press operation, or the like. In this case, similar to the foregoing example, after receiving the double-tap operation, the triple-tap operation, the touch and hold operation, or the press operation, the electronic device performs a subsequent step in response to the operation. In other words, specific forms of the first operation and the second operation may not be limited in this disclosure.

In addition, in the foregoing example, "Yesterday" on the chat interface 401 is used as a date label. It is easy to understand that the date label in this embodiment of this disclosure may be any text or pattern that can indicate a date corresponding to displayed information on an interface. For example, "Yesterday 10:15" displayed on the chat interface 401 may be understood as one label, and the label can indicate that a date corresponding to the displayed information is "Yesterday". Therefore, "Yesterday 10:15" may be used as a date label. Further, after receiving a tap operation performed by the user on any place on "Yesterday 10:15", the electronic device displays an image in FIG. 4B to perform a subsequent step. For another example, "8:00" displayed on the chat interface 401 may be understood as one label. Although no date information is displayed in the displayed content on the label, the label implicitly indicates that a date is "Current day". Therefore, "8:00" may also be used as a date label. Further, after receiving a tap operation performed by the user on any place on "8:00", the electronic device displays the image in FIG. 4B to perform a subsequent step. In other words, a specific form of the date label may not be limited in this embodiment of this disclosure.

In addition, it should be noted that the control in this embodiment of this disclosure may be understood as a graphical user interface (GUI) element. The control is a software component, and is included in an application to control all data processed by the application and an interaction operation on the data. The user may interact with the control through direct manipulation, to read or edit related information of the application. Generally, the control may include a visual interface element such as an icon, a button, a menu, a tab, a text box, a dialog box, a status bar, a navigation bar, or a widget.

Example 2

Figure 5A:
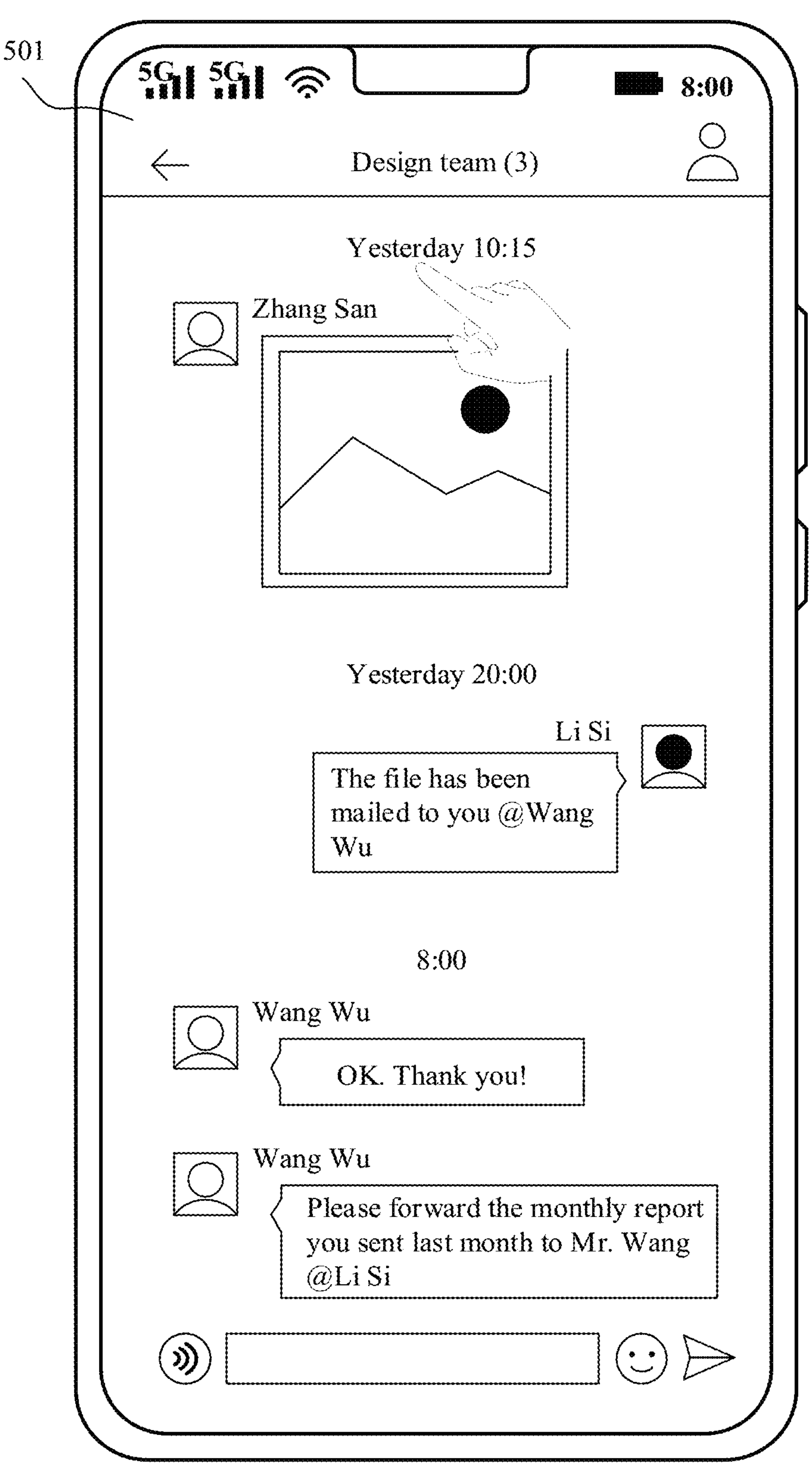
FIG. 5A to FIG. 5D are a schematic diagram 3 of an interface displayed on an electronic device according to an embodiment.
Figure 5B:
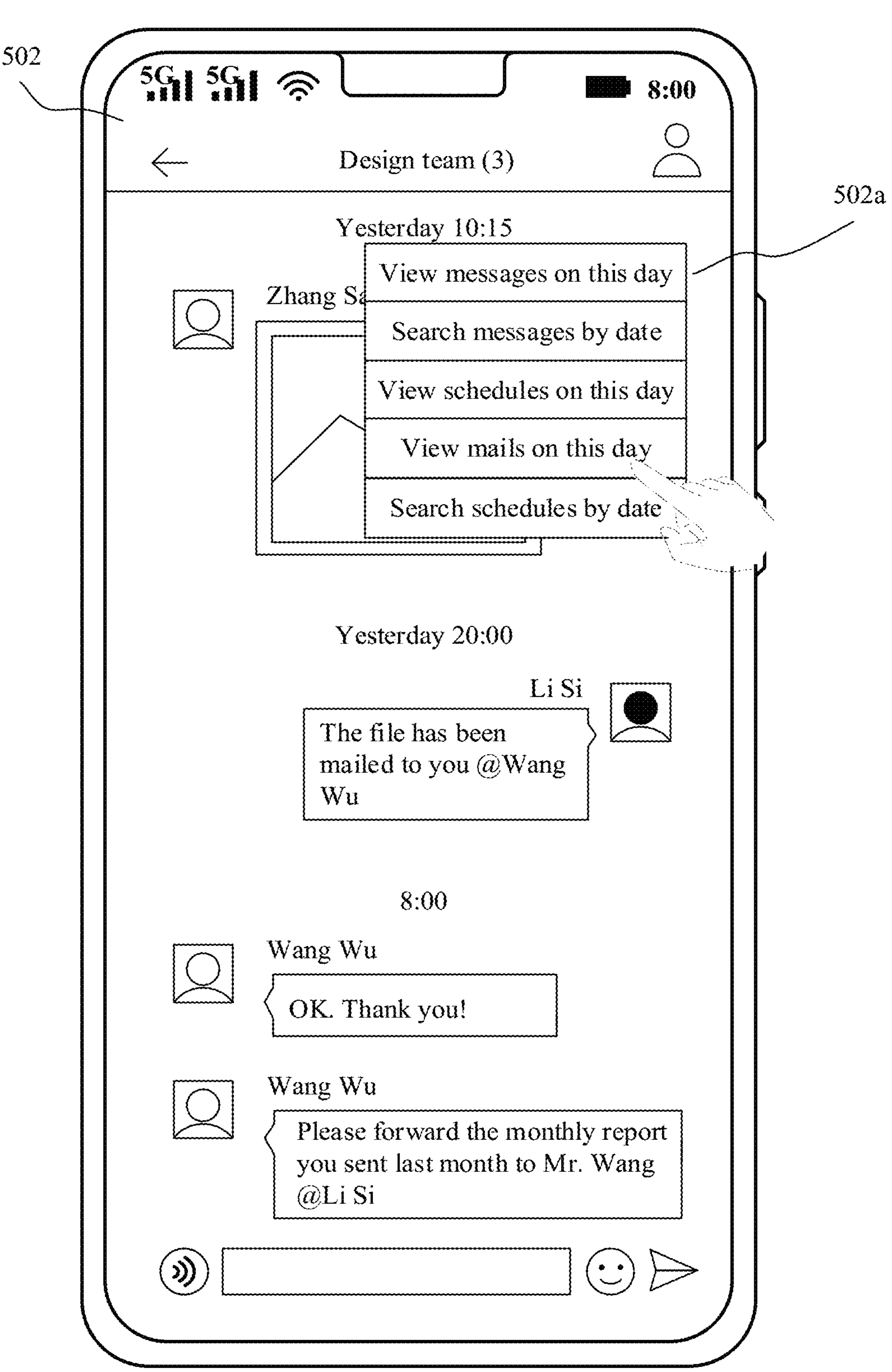
Figure 5C:
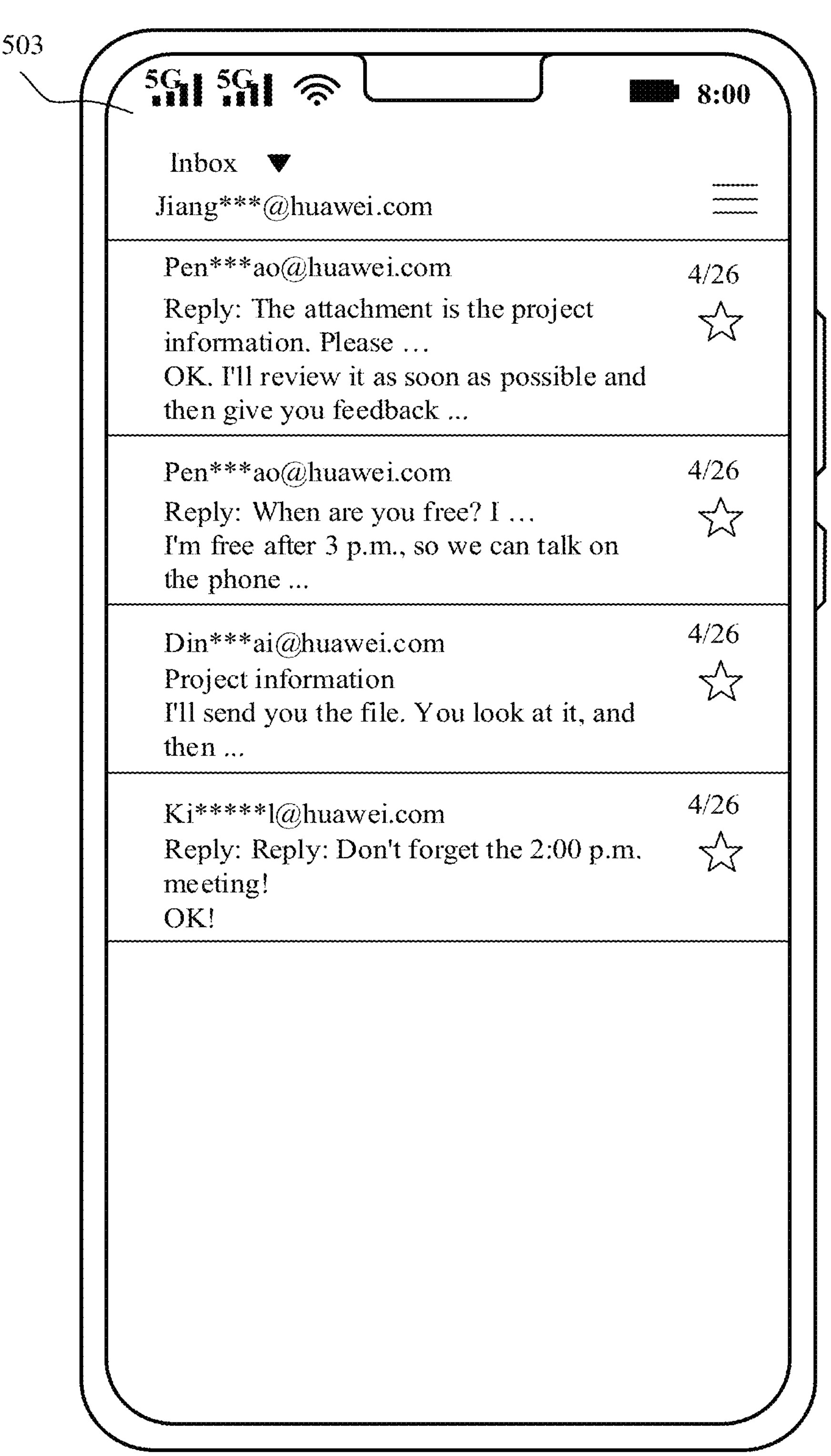
Figure 5D:
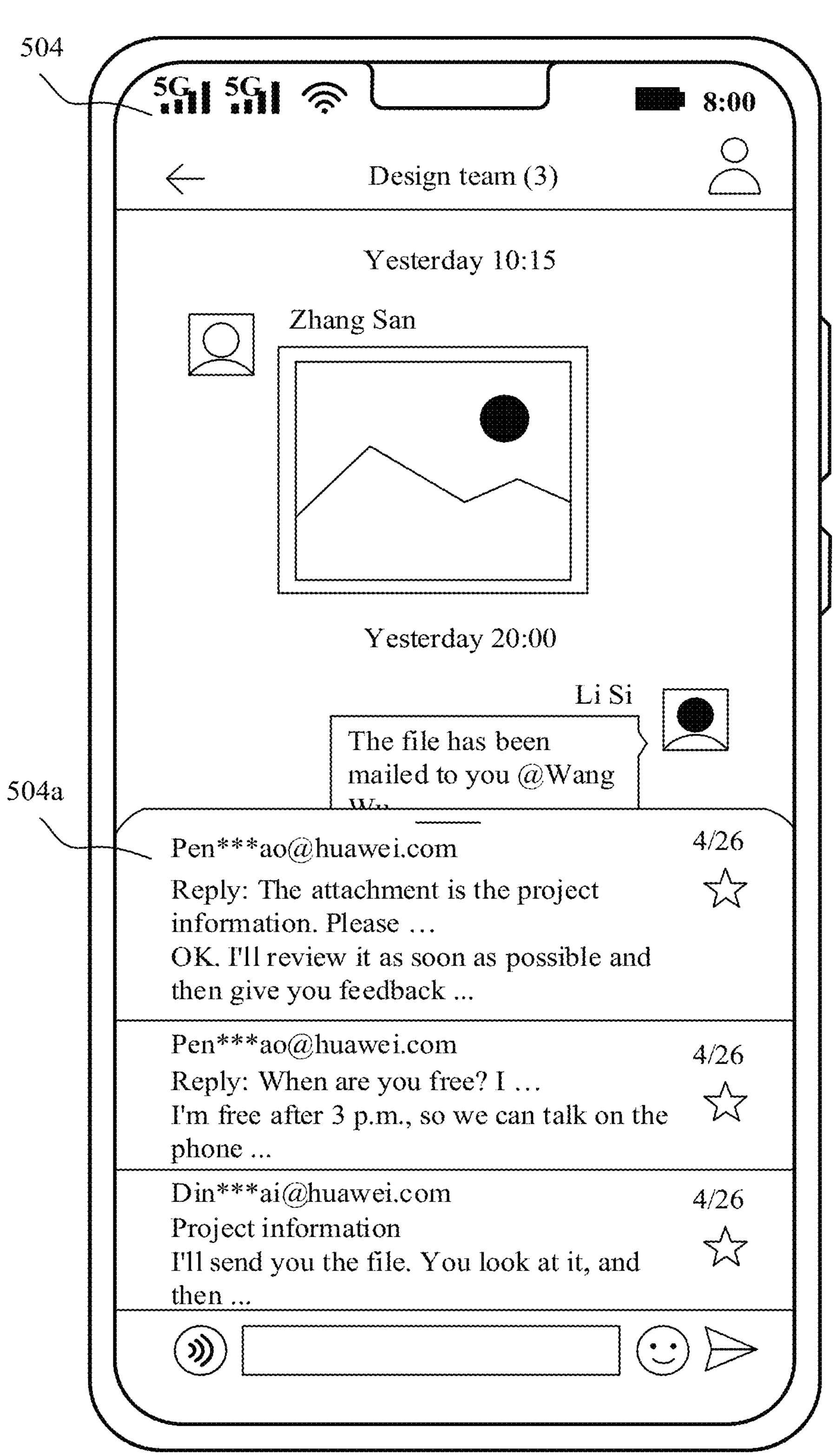

As shown in FIG. 5D, the electronic device displays a chat interface 501 (which may be understood as the first interface) of an instant messaging application (which may be understood as the first application). When the electronic device receives a tap operation (which may be understood as the first operation in this application) performed by the user on a date label "Yesterday" on the chat interface 501, as shown in FIG. 5B, the electronic device displays an operation menu 502*a* on an interface 502. Then, after the electronic device receives a tap operation (which may be understood as the second operation in this embodiment) performed by the user on a control on which displayed content is "View emails on this day" in the operation menu 502*a*, the electronic device displays, on an interface, email records on a date corresponding to the date label.

In an implementation, after the electronic device receives a tap operation performed by the user on the control on which displayed content is "View emails on this day" in the operation menu 502*a* in FIG. 5B, the electronic device may start an email application. Specifically, after receiving the second operation, the electronic device may determine, based on the displayed content "View emails on this day" on the control, that an application that needs to be started is the email application, and then start the email application. After starting the email application, the electronic device may search the email application for the email records on the date corresponding to the date label, and display, on an interface of the email application, the email records on the date corresponding to the date label. For example, after receiving a tap operation performed by the user on the control on which displayed content is "View emails on this day" in the operation menu 502*a*, as shown in FIG. 5C, the electronic device displays an interface 503 of the email application, and displays, on the interface 503, the email records on the date (assuming that the date is April 26) corresponding to the date label.

In another implementation, when the instant messaging application in the electronic device may read data in the email application through an application programming interface (API), the electronic device may not start the email application, but read the email records on the date corresponding to the date label in the email application through the API, and display the email records on the interface.

For example, after receiving a tap operation performed on the control on which displayed content is "View emails on this day", as shown in FIG. 5D, the electronic device displays a preset display unit, that is, a pop-up window 504*a*, on an interface 504. The pop-up window 504*a* includes the email records on the date corresponding to the date label. It should be noted that, in FIG. 5D, the pop-up window 504*a* is used as an example to describe an effect in which the electronic device displays the email records on the date corresponding to the date label. In a specific implementation process, the preset display unit may alternatively be a display unit in another form such as a floating window or a split-screen interface. This is not limited in this embodiment of this disclosure.

Example 3

Figure 6A:
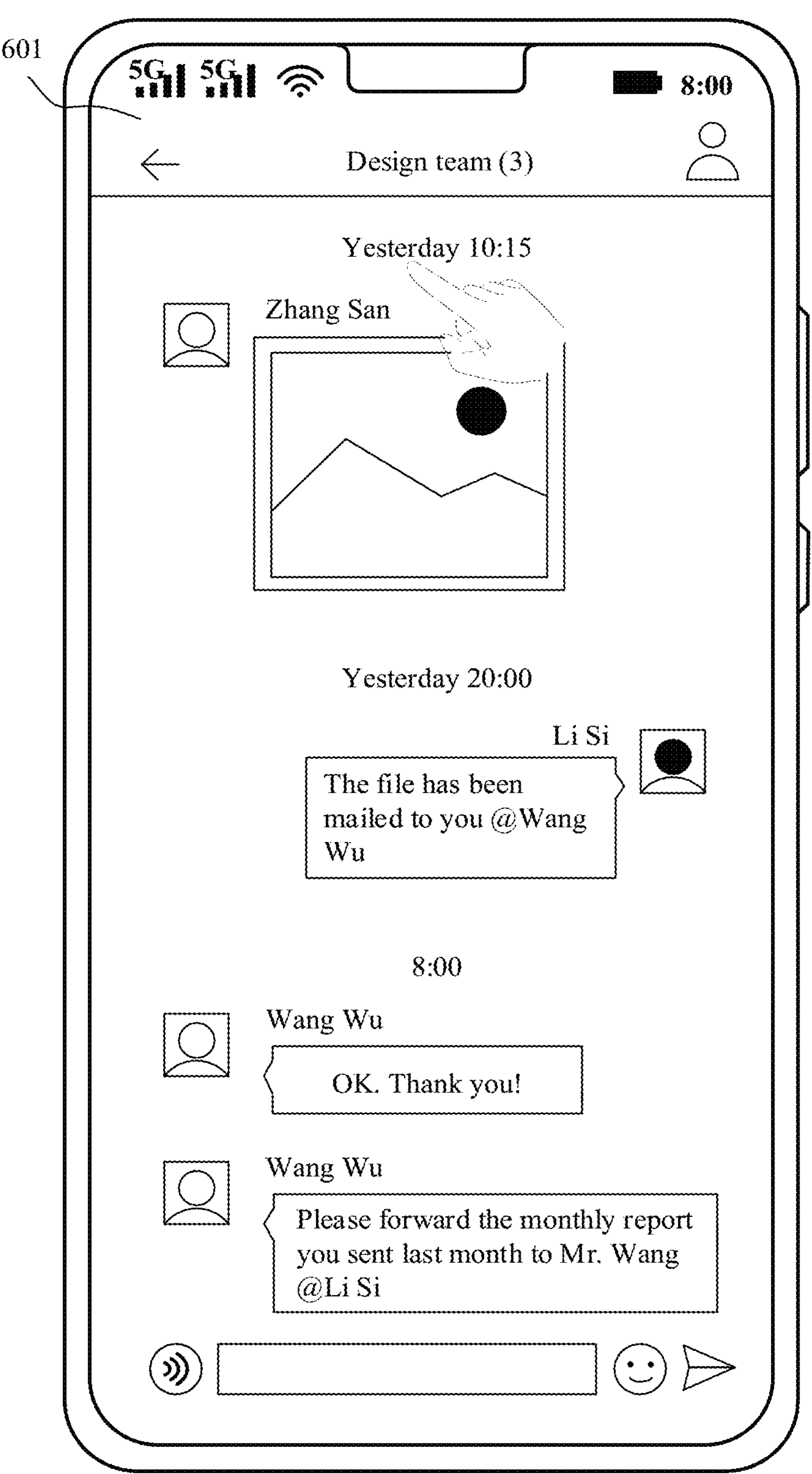
FIG. 6A to FIG. 6D are a schematic diagram 4 of an interface displayed on an electronic device according to an embodiment.
Figure 6B:
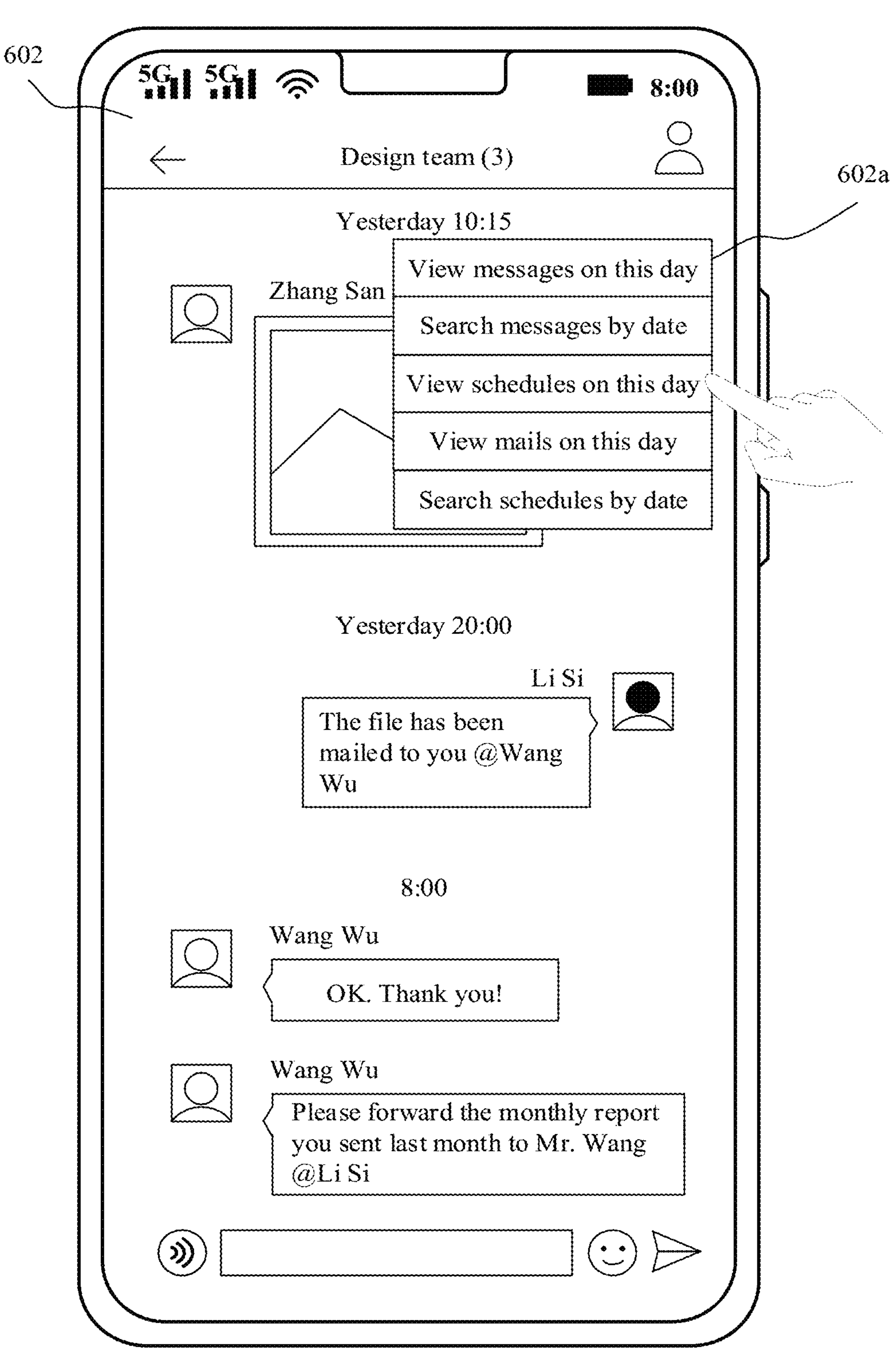

As shown in FIG. 6A, the electronic device displays a chat interface 601 (which may be understood as the first interface) of an instant messaging application (which may be understood as the first application). When the electronic device receives a tap operation (which may be understood as the first operation) performed by the user on a date label "Yesterday" on the chat interface 601, as shown in FIG. 6B, the electronic device displays an operation menu 602*a* on an interface 602. Then, after the electronic device receives a tap operation (which may be understood as the second operation) performed by the user on a control on which displayed content is "View schedules on this day" in the operation menu 602*a*, the electronic device displays, on an interface, schedule records on a date corresponding to the date label.

Similar to Example 2, there may be two implementations in which the electronic device displays, on an interface, schedule records on a date corresponding to the date label.

Figure 6C:
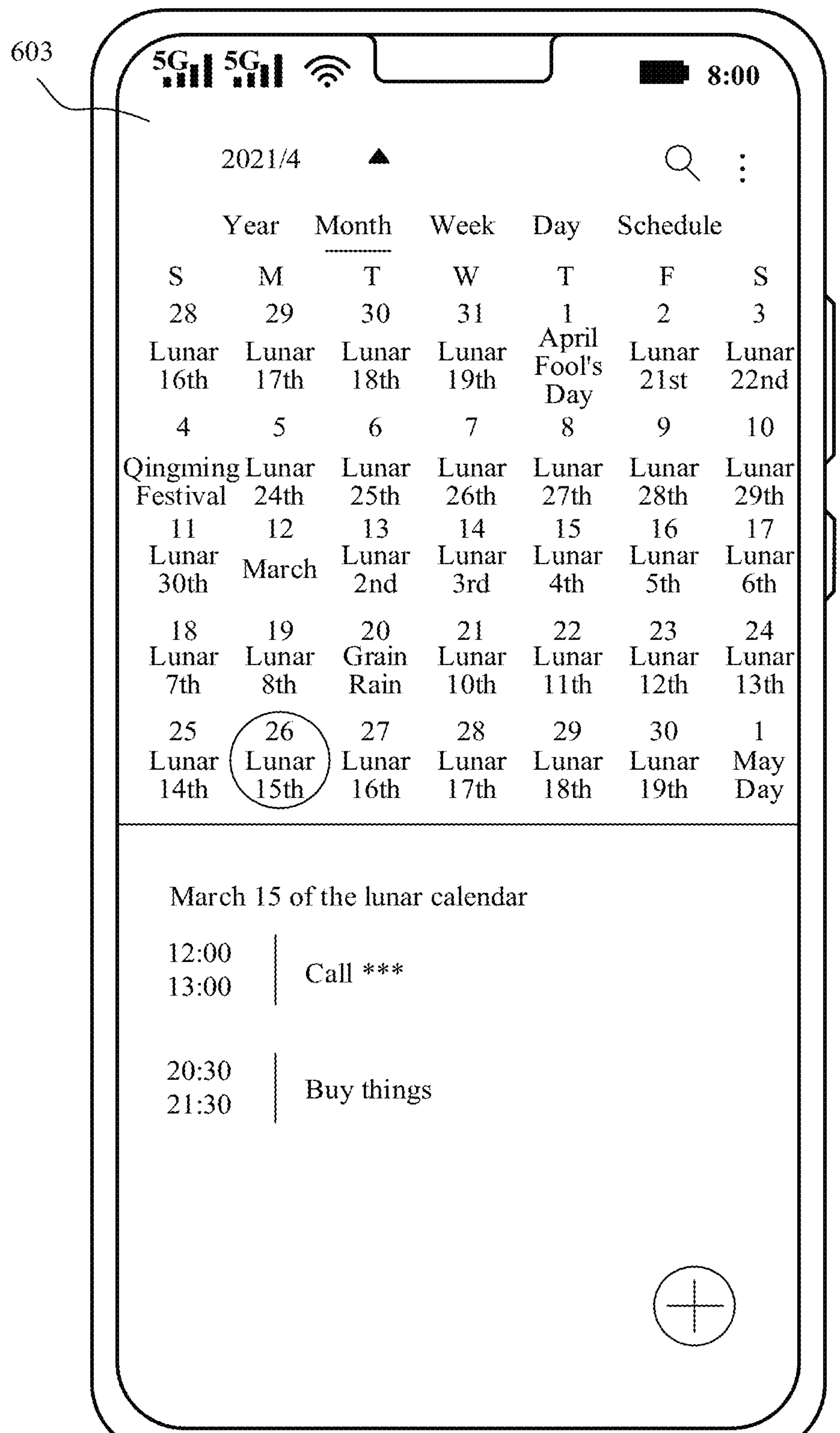

In an implementation, after receiving the second operation, the electronic device may start a schedule application, search the schedule application for the schedule records on the date corresponding to the date label, and display, on an interface of the schedule application, the schedule records on the date corresponding to the date label. In this case, after receiving a tap operation performed by the user on the control on which displayed content is "View schedules on this day" in the operation menu 602*a*, as shown in FIG. 6C, the electronic device displays an interface 603 of the schedule application, and displays, on the interface 603, the schedule records on the date (assuming that the date is April 26) corresponding to the date label.

It should be noted that, in some application scenarios, schedule information of the user may also be stored in an application other than the schedule application, such as a calendar or an alarm. When the schedule information of the user is stored in the another application, the electronic device starts the application, and performs a subsequent step for the application. In other words, in the method provided in this embodiment, an example in which the schedule information of the user is stored in the schedule application is mainly used for description. A person skilled in the art can easily understand that, when the schedule information of the user is stored in another application (for example, the calendar or the alarm), the method provided in this embodiment of this application is also applicable.

Figure 6D:
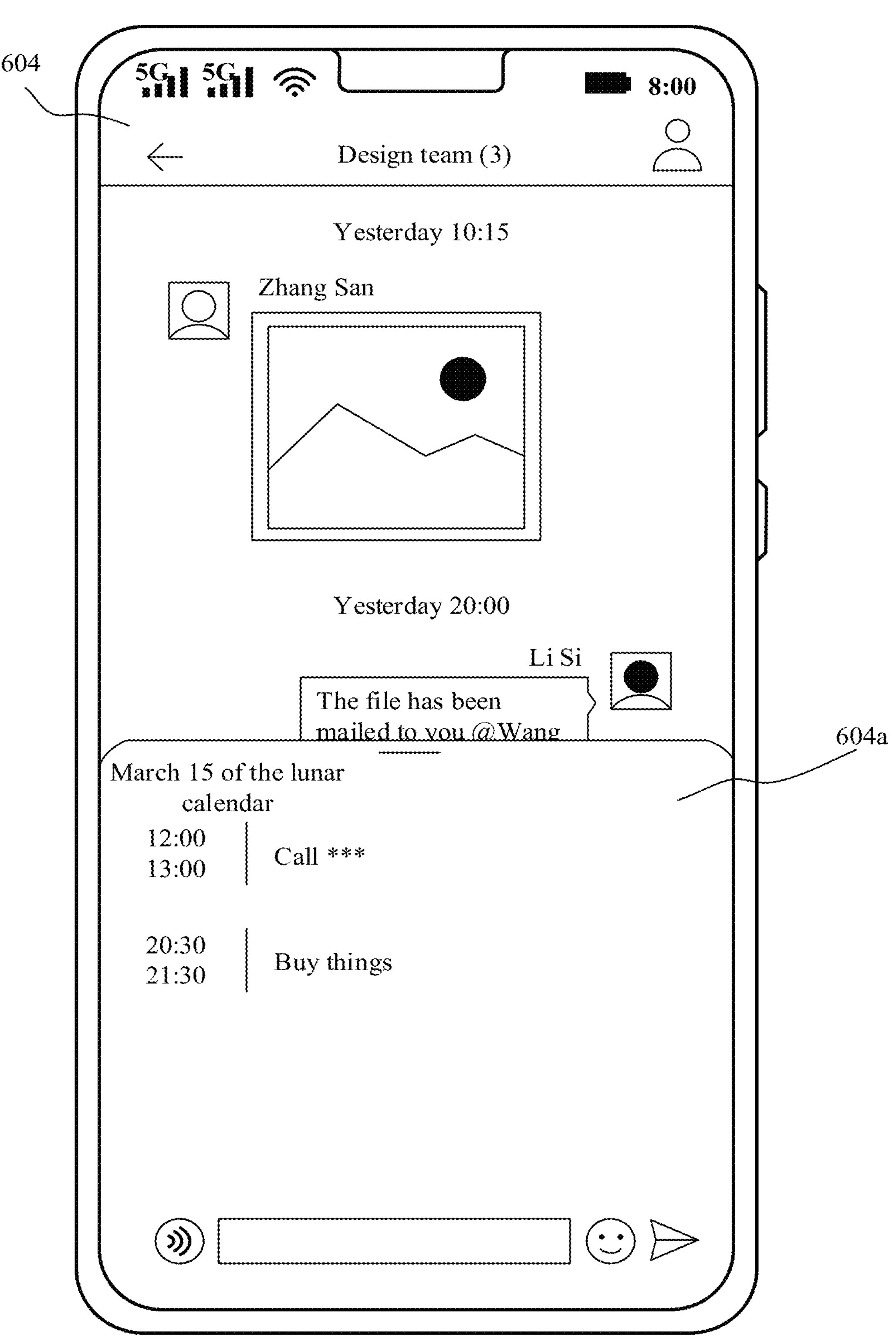

In the other implementation, when the instant messaging application in the electronic device may read data in the schedule application through an application programming interface (API), the electronic device may not start the schedule application, but read the schedule records on the date corresponding to the date label in the schedule application through the API, and display the schedule record on the interface. In this case, after receiving a tap operation performed on the control on which displayed content is "View schedules on this day", as shown in FIG. 6D, the electronic device displays a preset display unit, that is, a pop-up window 604*a*, on an interface 604. The pop-up window 604*a* includes the schedule records on the date corresponding to the date label. It should be noted that, in FIG. 6D, the pop-up window 604*a* is used as an example to describe an effect in which the electronic device displays schedule records on the date corresponding to the date label. In a specific implementation process, the preset display unit may alternatively be a display unit in another form such as a floating window or a split-screen interface. This is not limited in this embodiment of this disclosure.

It can be learned from Example 2 and Example 3 that, in this embodiment of this disclosure, after the electronic device receives the first operation performed by the user on the date label displayed on the first interface of the first application (such as the instant messaging application in Example 2 and Example 3), the operation menu displayed by the electronic device in response to the first operation may include a control (referred to as a control b). After the electronic device receives the second operation performed by the user on the control b, the electronic device displays a historical information record of a second application on a specific date and that is different from a historical information record of the first application. For example, in Example 2, the electronic device displays an email record on the date corresponding to the date label. For another example, in Example 3, the electronic device displays a schedule record on the date corresponding to the date label.

Example 4

Figure 7A:
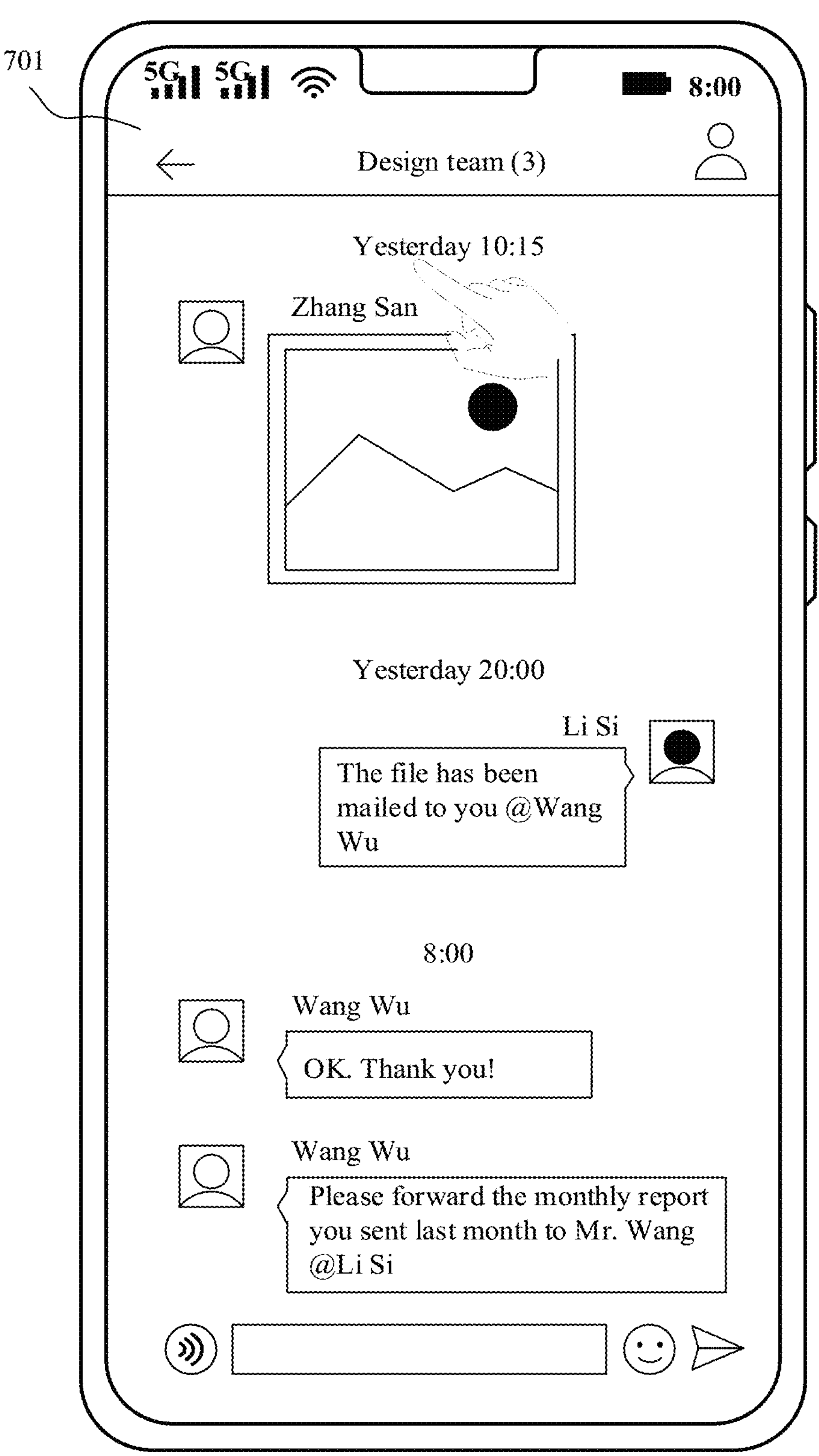
Figure 7B:
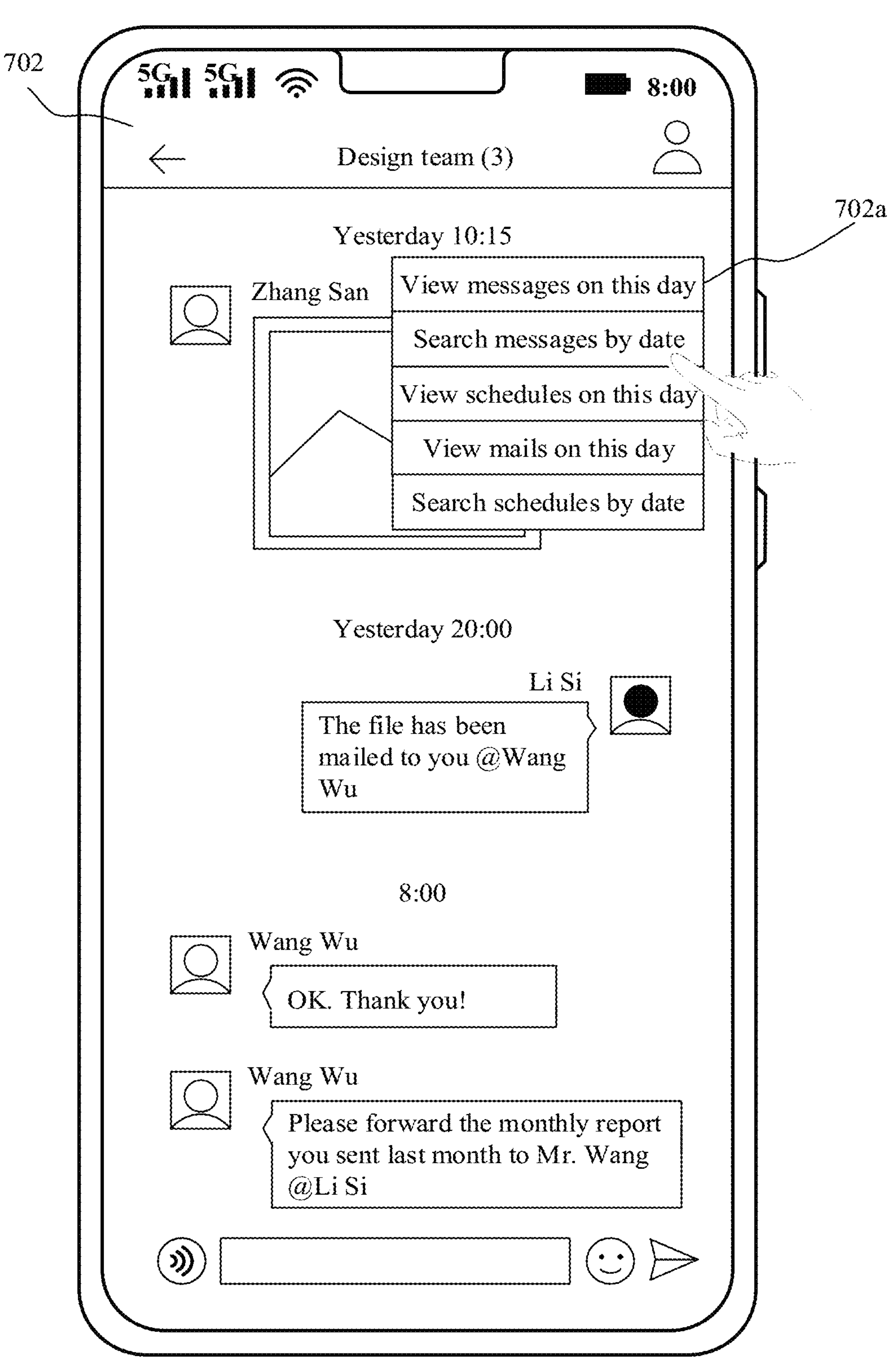
Figure 7C:
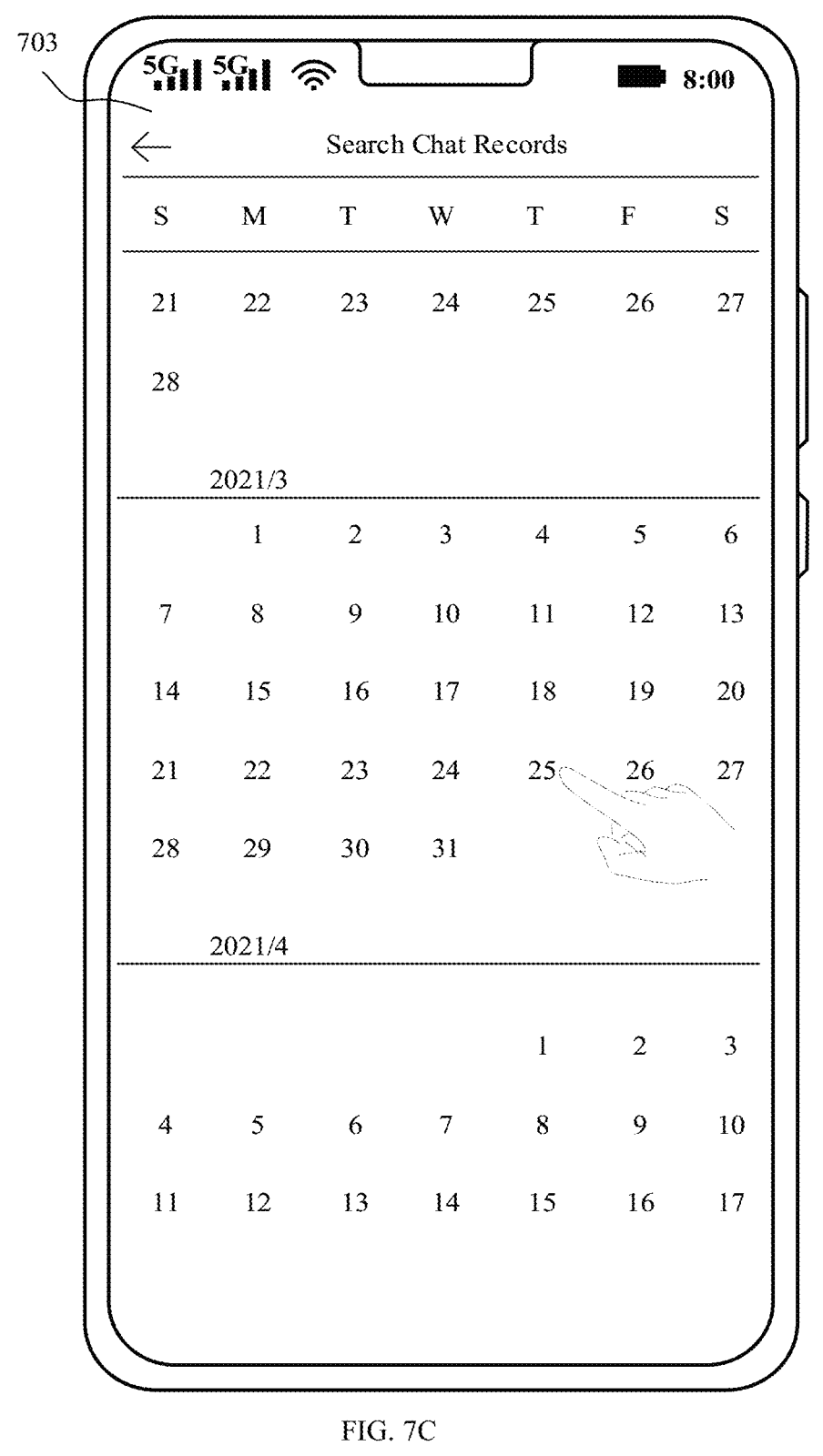
Figure 7D:
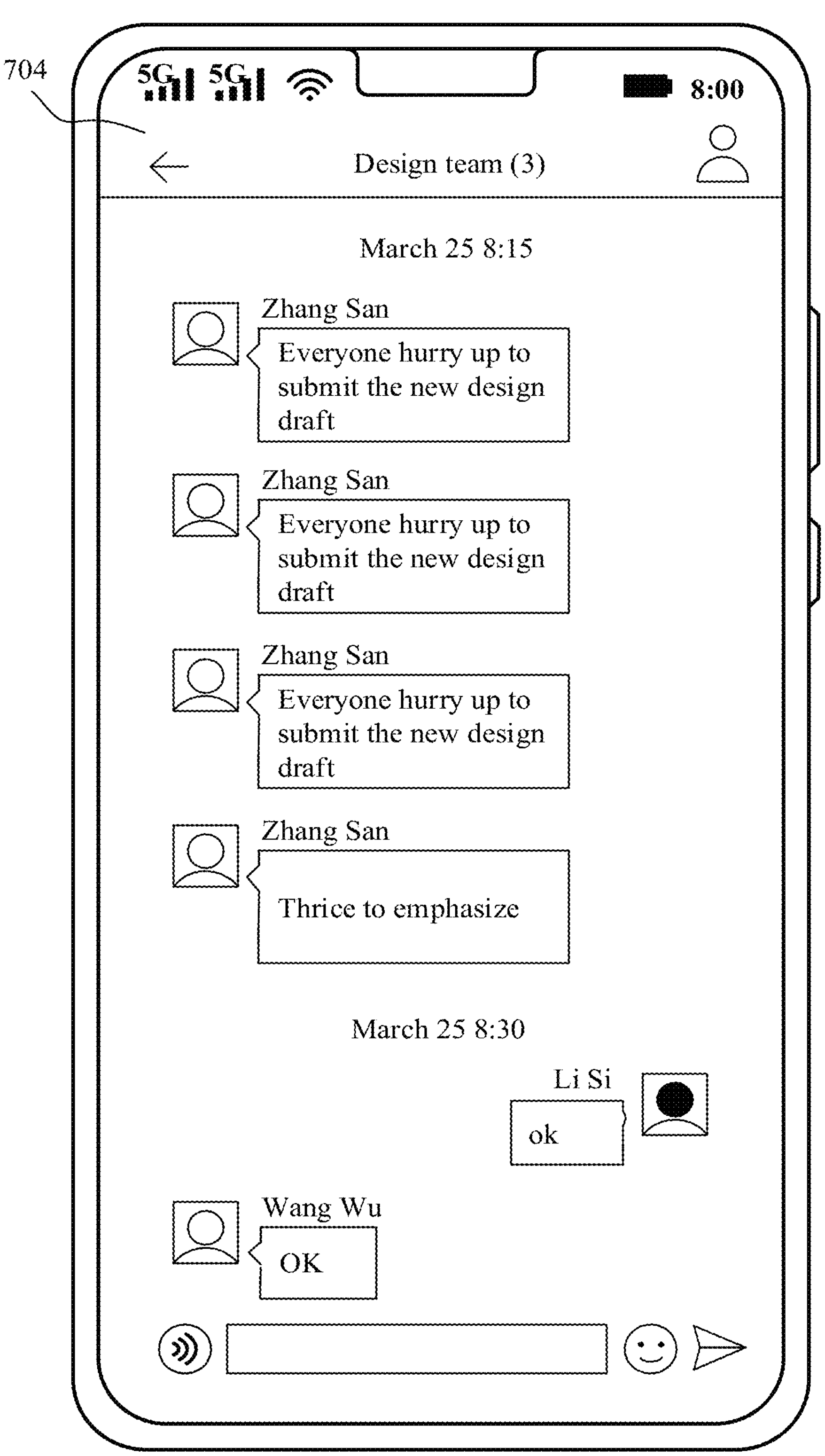

As shown in FIG. 7A, the electronic device displays a chat interface 701 (which may be understood as the first interface) of an instant messaging application (which may be understood as the first application). When the electronic device receives a tap operation (which may be understood as the first operation) performed by the user on a date label "Yesterday" on the chat interface 701, as shown in FIG. 7B, the electronic device displays an operation menu 702*a* on an interface 702. Then, after the electronic device receives a tap operation (which may be understood as the second operation) performed by the user on a control on which displayed content is "Search messages by date" in the operation menu 702*a*, as shown in FIG. 7C, the electronic device displays a calendar on an interface 703. Then, after the electronic device receives a selection operation (referred to as a third operation) performed by the user on a date (referred to as a first date) in the calendar, as shown in FIG. 7D, the electronic device displays a historical information record on the first date.

In other words, in this embodiment of this disclosure, after the electronic device receives the first operation performed by the user on the date label displayed on the first interface of the first application (such as the instant messaging application), the operation menu displayed by the electronic device in response to the first operation may include a control (referred to as a control c). After the electronic device receives the second operation performed by the user on the control c, the electronic device displays the calendar. Then, after receiving an operation that the user selects a date in the calendar, the electronic device displays a historical information record of the first application on the date, for example, chat records on the date in FIG. 7D.

Example 5

Figure 8A:
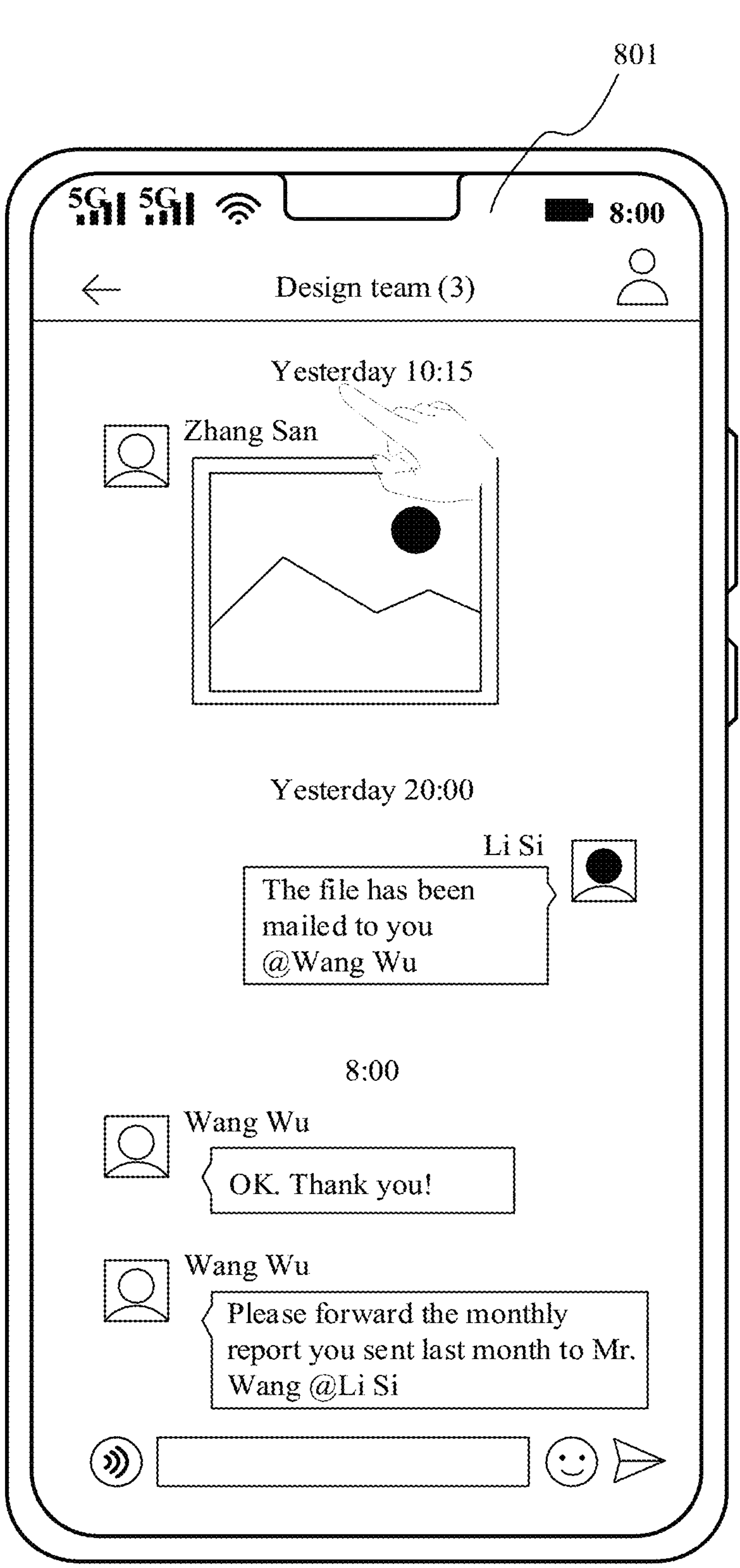
Figure 8B:
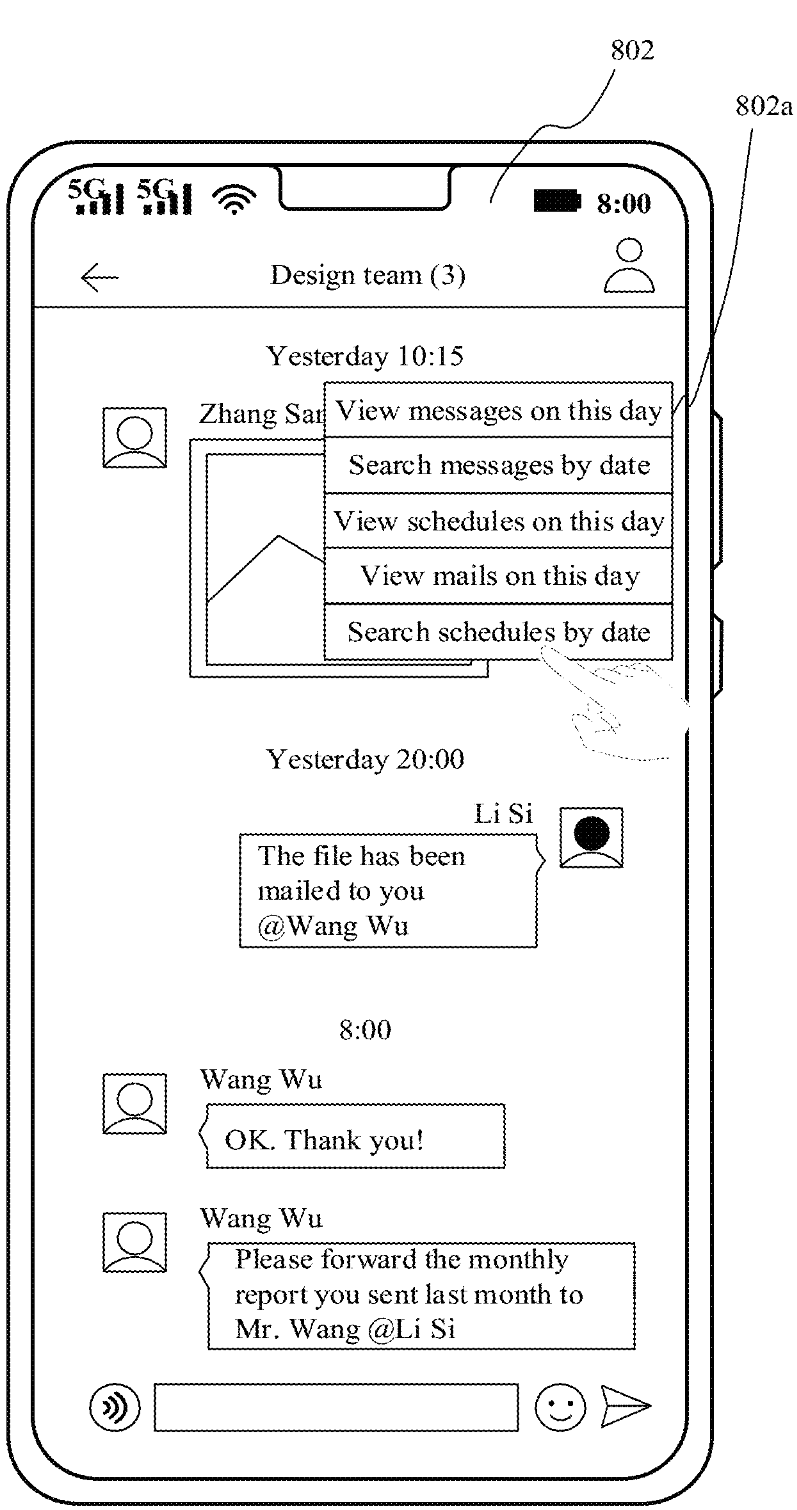
Figure 8C:
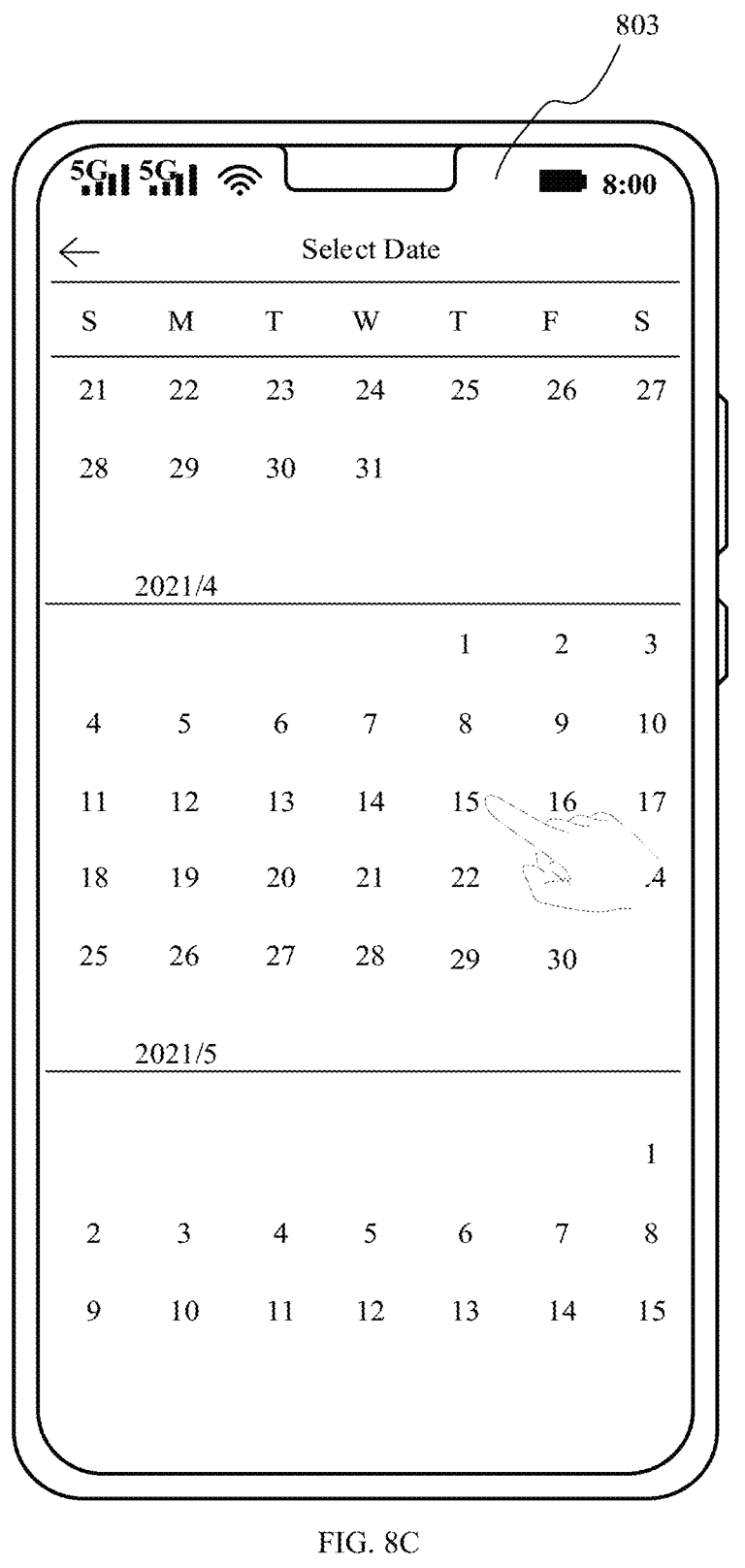

As shown in FIG. 8A, the electronic device displays a chat interface 801 (which may be understood as the first interface) of an instant messaging application (which may be understood as the first application). When the electronic device receives a tap operation (which may be understood as the first operation) performed by the user on a date label "Yesterday" on the chat interface 801, as shown in FIG. 8B, the electronic device displays an operation menu 802*a* on an interface 802. After the electronic device receives a tap operation (which may be understood as the second operation in this embodiment) performed by the user on a control on which displayed content is "Search schedules by date" in the operation menu 802*a*, as shown in FIG. 8C, the electronic device displays a calendar on an interface 803. Then, after the electronic device receives a selection operation (referred to as a third operation) performed by the user on a date (referred to as a first date) on the interface 803, the electronic device displays a schedule on the first date.

Figure 8D:
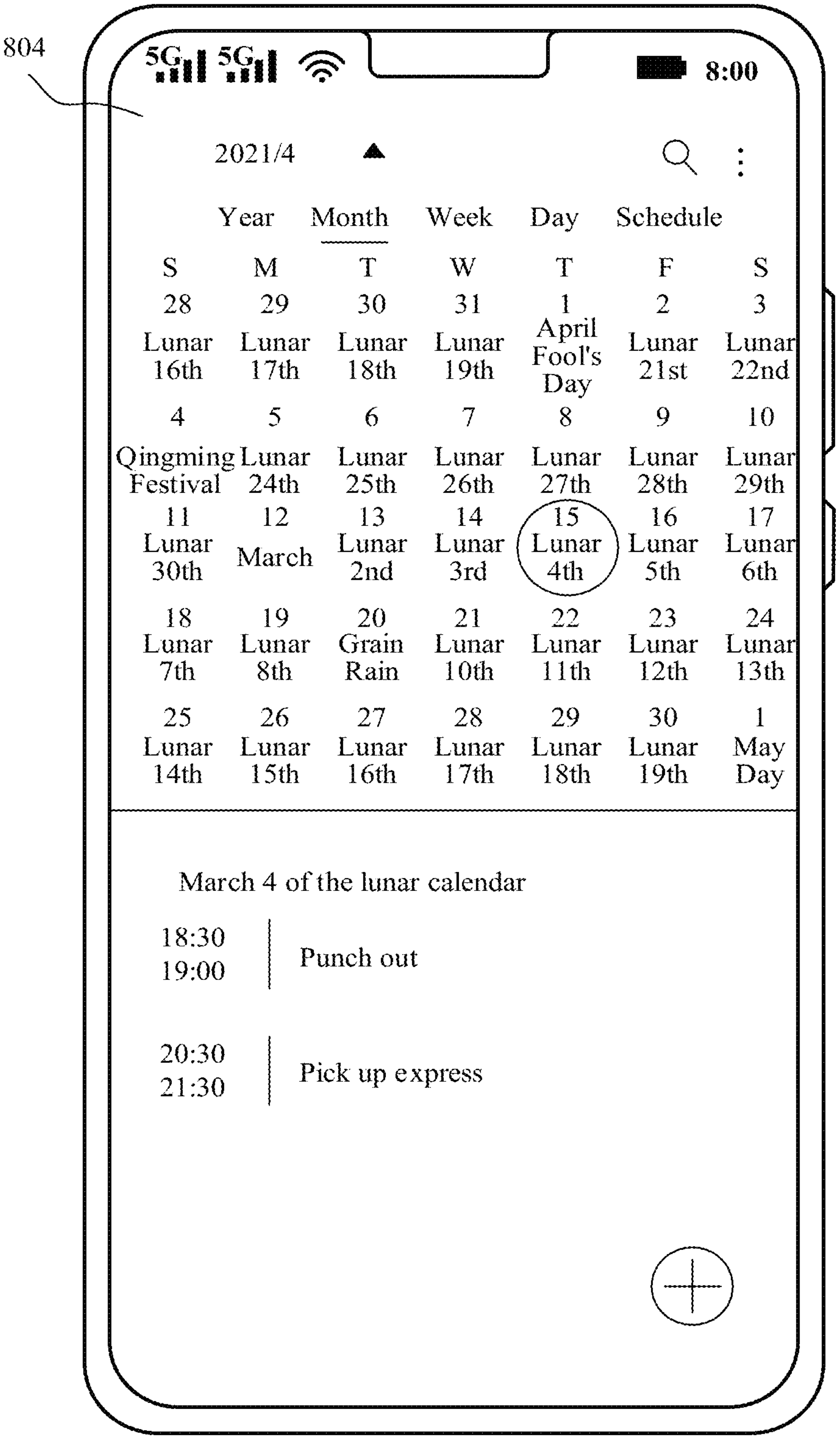

Specifically, similar to the descriptions in FIG. 6C and FIG. 6D, in this example, after receiving the selection operation performed by the user on the first date on the interface 803, the electronic device may also display the schedule on the first date in one of the following two implementations:

Implementation 1: After the electronic device receives the selection operation performed by the user on the first date (for example, Apr. 15, 2021) in FIG. 8C, as shown in FIG. 8D, the electronic device displays an interface 804 of the schedule application, and displays schedule records on the first date on the interface 804.

Figure 8E:
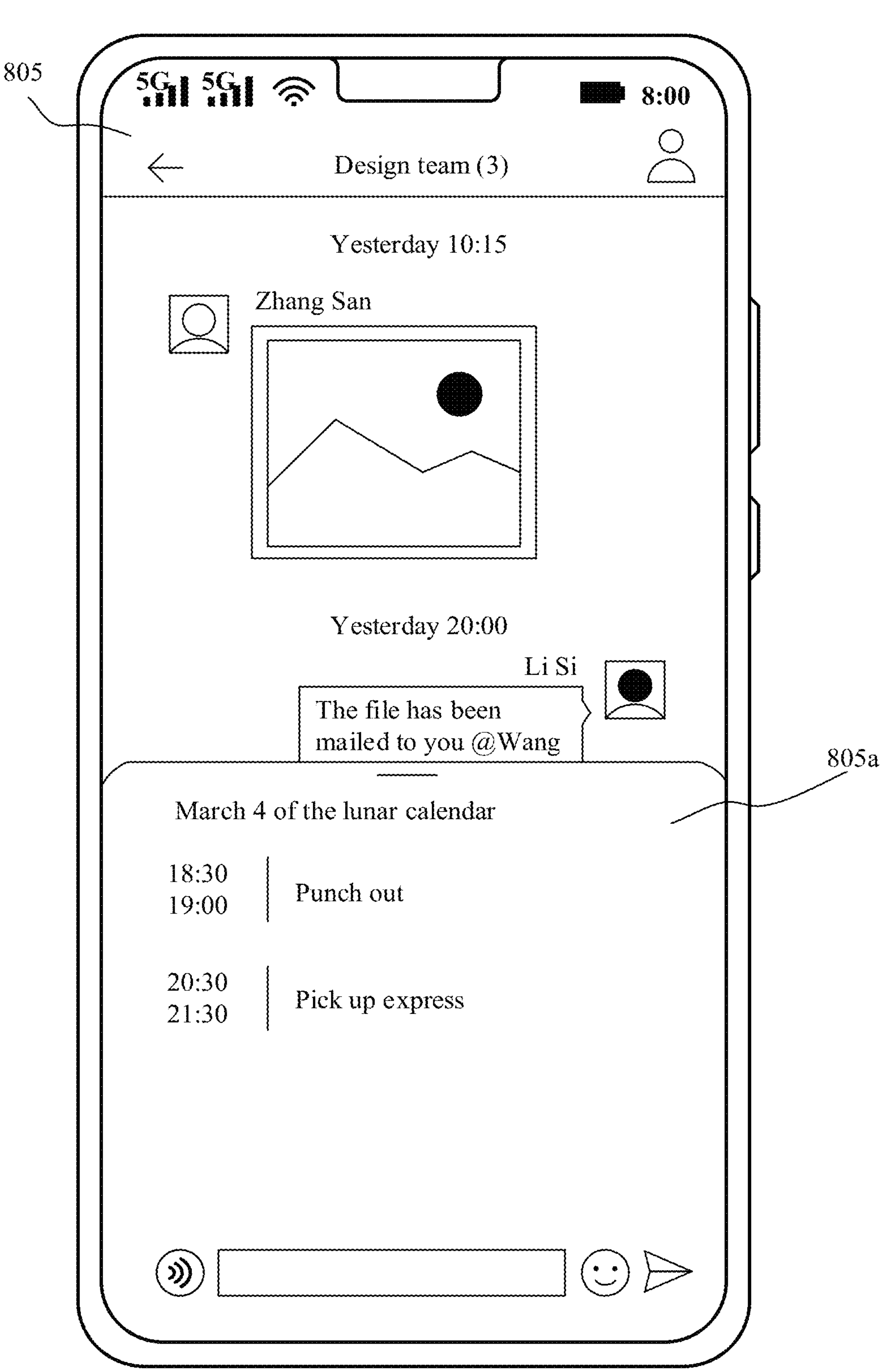

Implementation 2: After the electronic device receives the selection operation performed by the user on the first date (for example, Apr. 15, 2021) in FIG. 8C, as shown in FIG. 8E, the electronic device displays a preset display unit, that is, a pop-up window 805*a*, on an interface 805. The pop-up window 805*a* includes the schedule records on the first date. In a specific implementation process, the preset display unit may alternatively be a display unit in another form such as a floating window or a split-screen interface. This is not limited in this embodiment of this disclosure.

In other words, in this embodiment of this disclosure, after the electronic device receives the first operation performed by the user on the date label displayed on the first interface of the first application (such as the instant messaging application), the operation menu displayed by the electronic device in response to the first operation may include a control (referred to as a control d). After the electronic device receives the second operation performed by the user on the control d, the electronic device displays the calendar. Then, after receiving an operation that the user selects a date in the calendar, the electronic device displays a historical information record of a second application (that is, an application different from the first application) on the date, for example, schedule records on the date in FIG. 8D and FIG. 8E.

Example 6

Figure 9A:
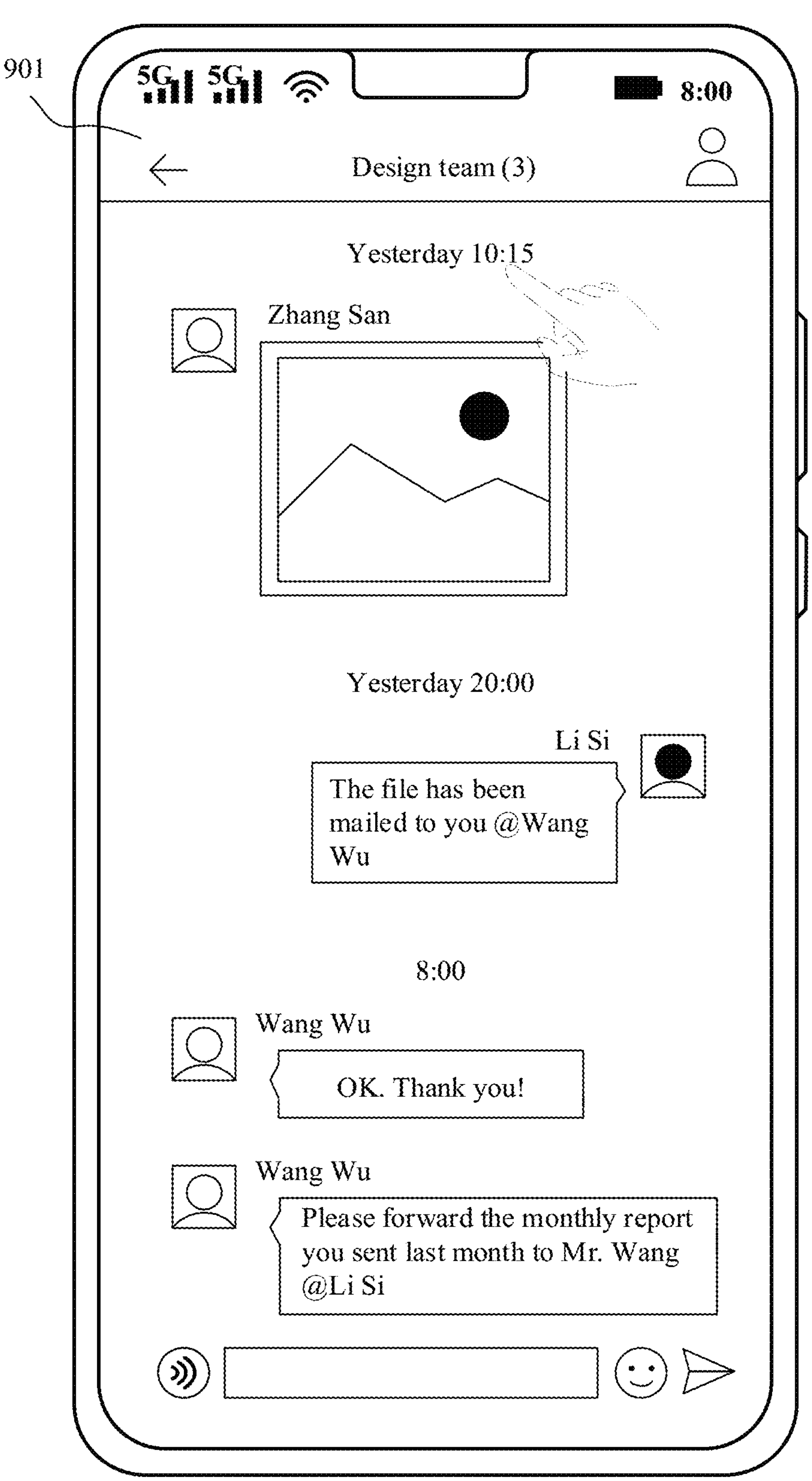
FIG. 9A to FIG. 9D are a schematic diagram 7 of an interface displayed on an electronic device according to an embodiment.
Figure 9B:
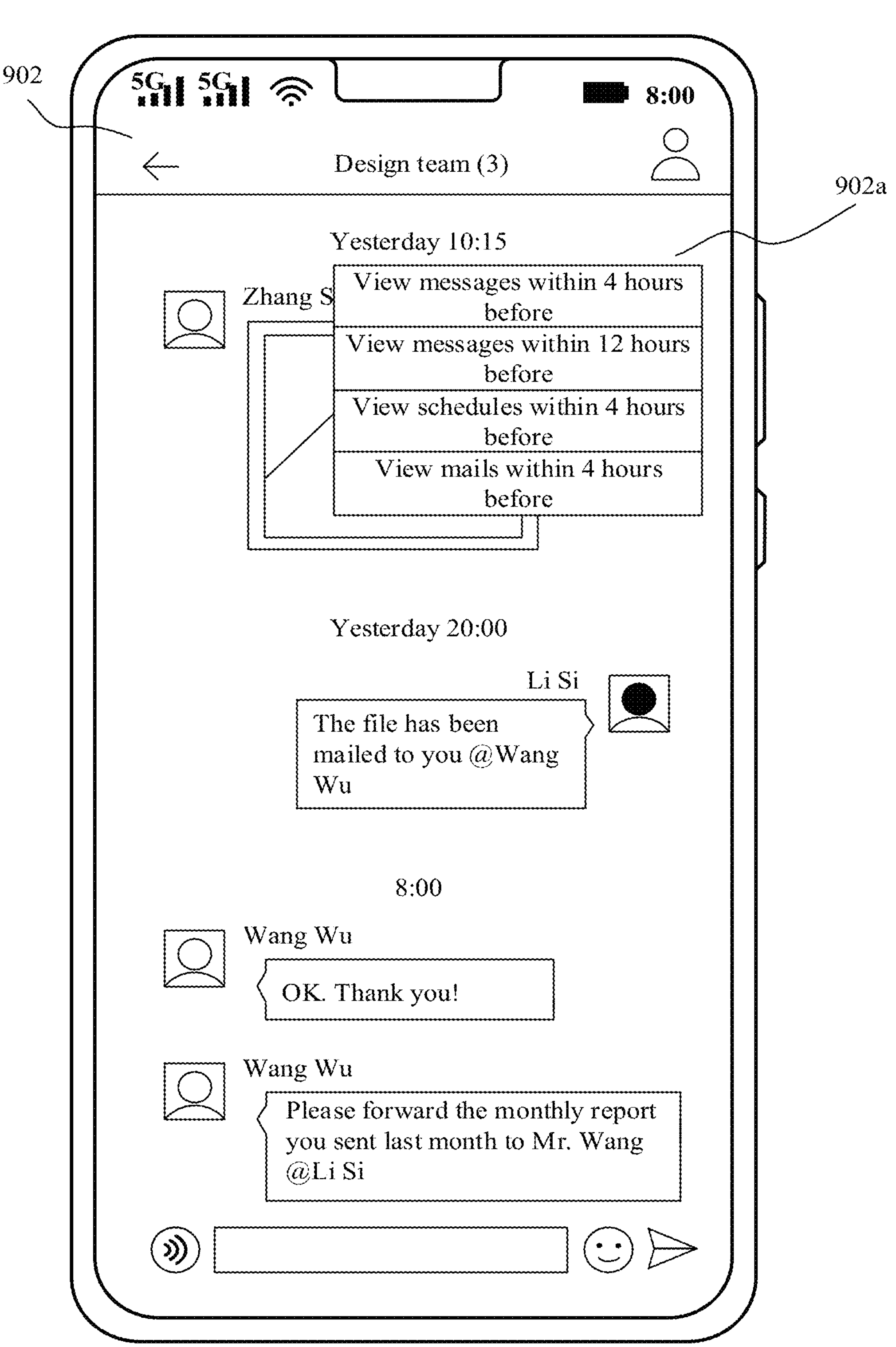

As shown in FIG. 9A, the electronic device displays a chat interface 901 (the chat interface 901 may be understood as the first interface) of an instant messaging application (in this case, the instant messaging application may be understood as the first application). When the electronic device receives a tap operation (the tap operation may be understood as the first operation) performed by the user on a time label "10:15" on the chat interface 901, as shown in FIG. 9B, the electronic device displays an operation menu 902*a* on an interface 902. After the electronic device receives a tap operation performed by the user on each of different controls in the operation menu 902*a*, the electronic device displays a historical information record in a manner corresponding to the tapped control.

It should be noted that, in the foregoing example, "10:15" on the chat interface 901 is used as a time label, to indicate that a time corresponding to the chat information is 10:15 yesterday. It is easy to understand that the time label in this embodiment of this disclosure may be any text or pattern that can indicate a time corresponding to displayed information on an interface. For example, "Yesterday 10:15" displayed on the chat interface 901 may be understood as one label, and the label can also indicate that a time corresponding to the displayed information is "Yesterday 10:15". Therefore, "Yesterday 10:15" may be used as a time label. Further, after receiving a tap operation performed by the user on any place on "Yesterday 10:15", the electronic device displays an image in FIG. 9B to perform a subsequent step. In addition, for ease of description, in this embodiment of this disclosure, minutes are usually used as a granularity of a time information indicated by the time label. It may be understood that, during actual application, the granularity of the time information indicated by the time label in this application may alternatively be set based on an actual requirement. For example, the time information indicated by the time label may be accurate to hours or seconds, or may be accurate to morning or afternoon, or may be accurate to month, year, or the like. In other words, a specific form of the time label and the granularity of the time information indicated by the time label may not be limited in this embodiment of this disclosure.

Figure 9C:
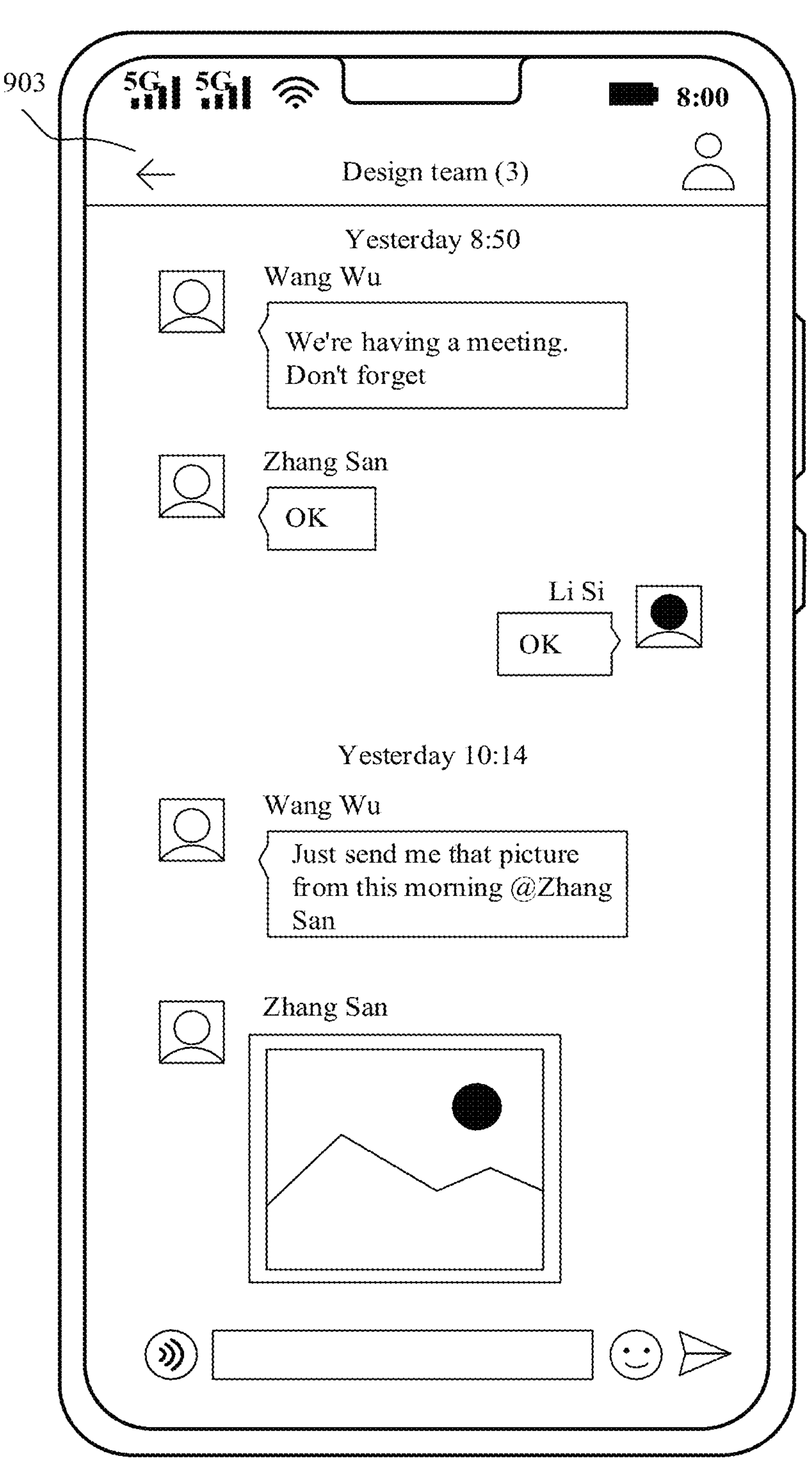

For example, after the electronic device receives a tap operation performed by the user on a control on which displayed content is "View messages within 4 hours before" in the operation menu 902*a*, as shown in FIG. 9C, the electronic device displays chat records within 4 hours from 6:15 to 10:15 yesterday on an interface 903.

Figure 9D:
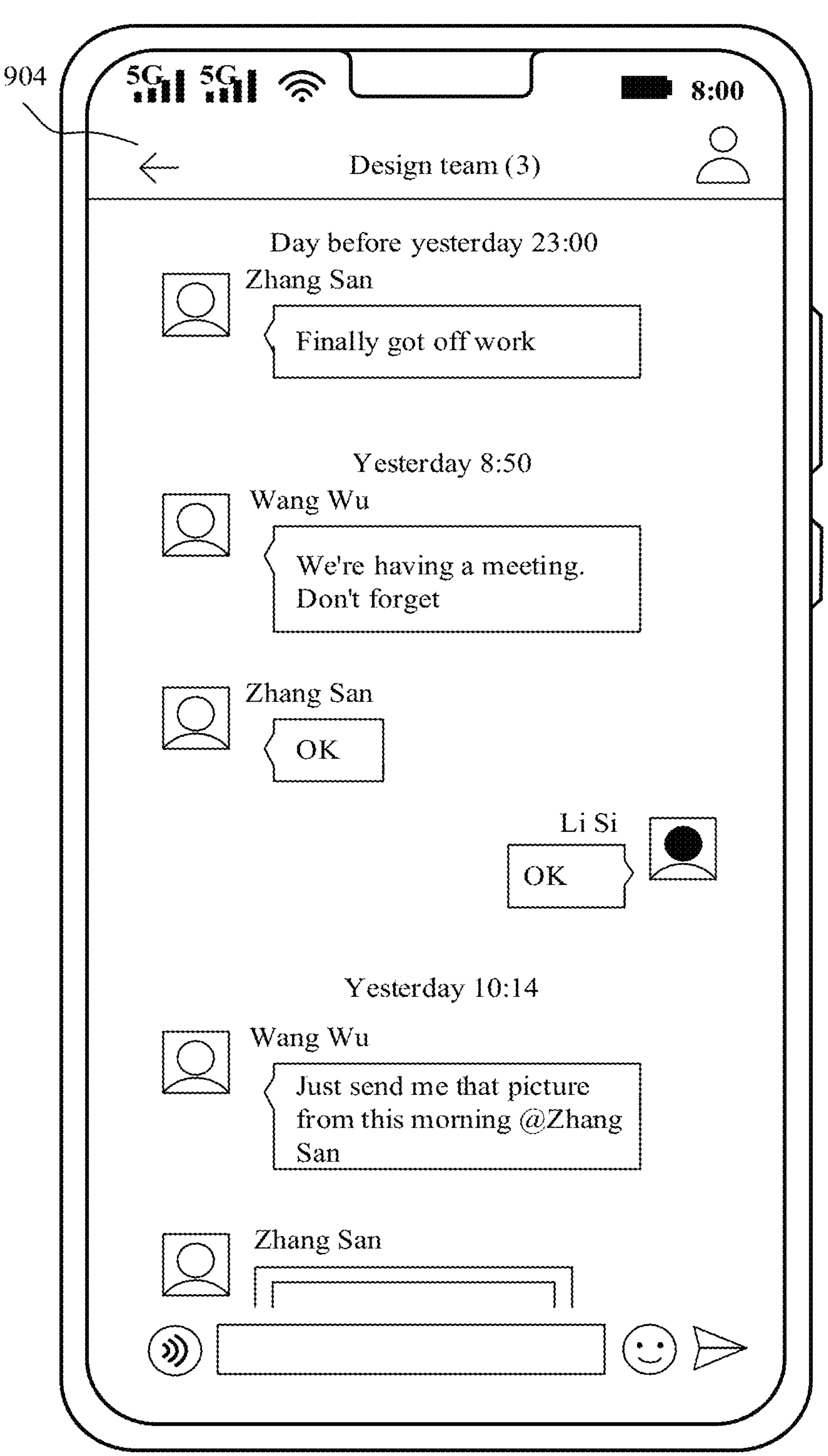

For another example, after the electronic device receives a tap operation performed by the user on a control on which displayed content is "View messages within 12 hours before" in the operation menu 902*a*, as shown in FIG. 9D, the electronic device displays chat records within 12 hours from 22:15 the day before yesterday to 10:15 yesterday on an interface 904.

Figure 9E:
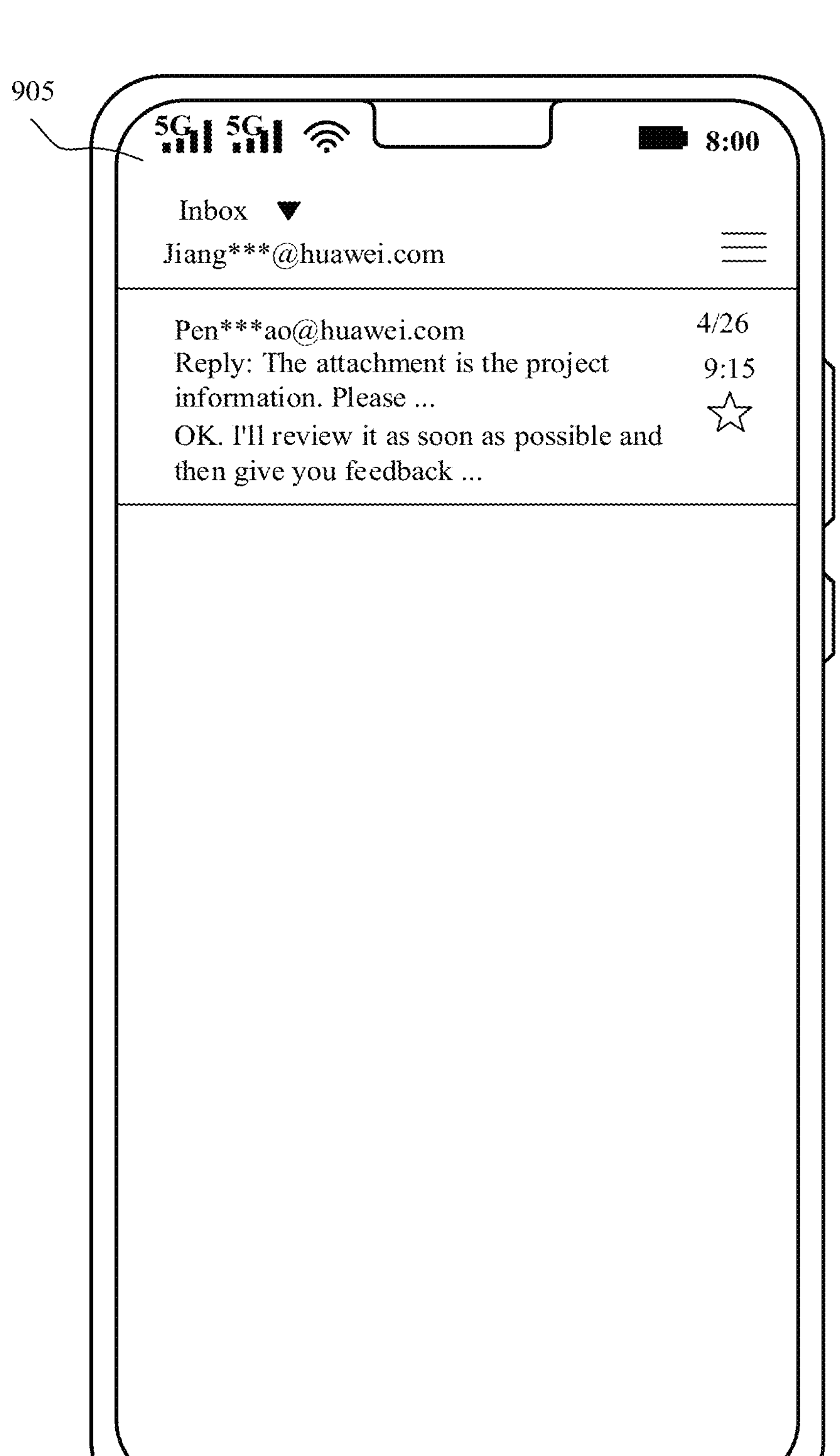
FIG. 9E and FIG. 9F are a schematic diagram 8 of an interface displayed on an electronic device according to an embodiment.
Figure 9F:
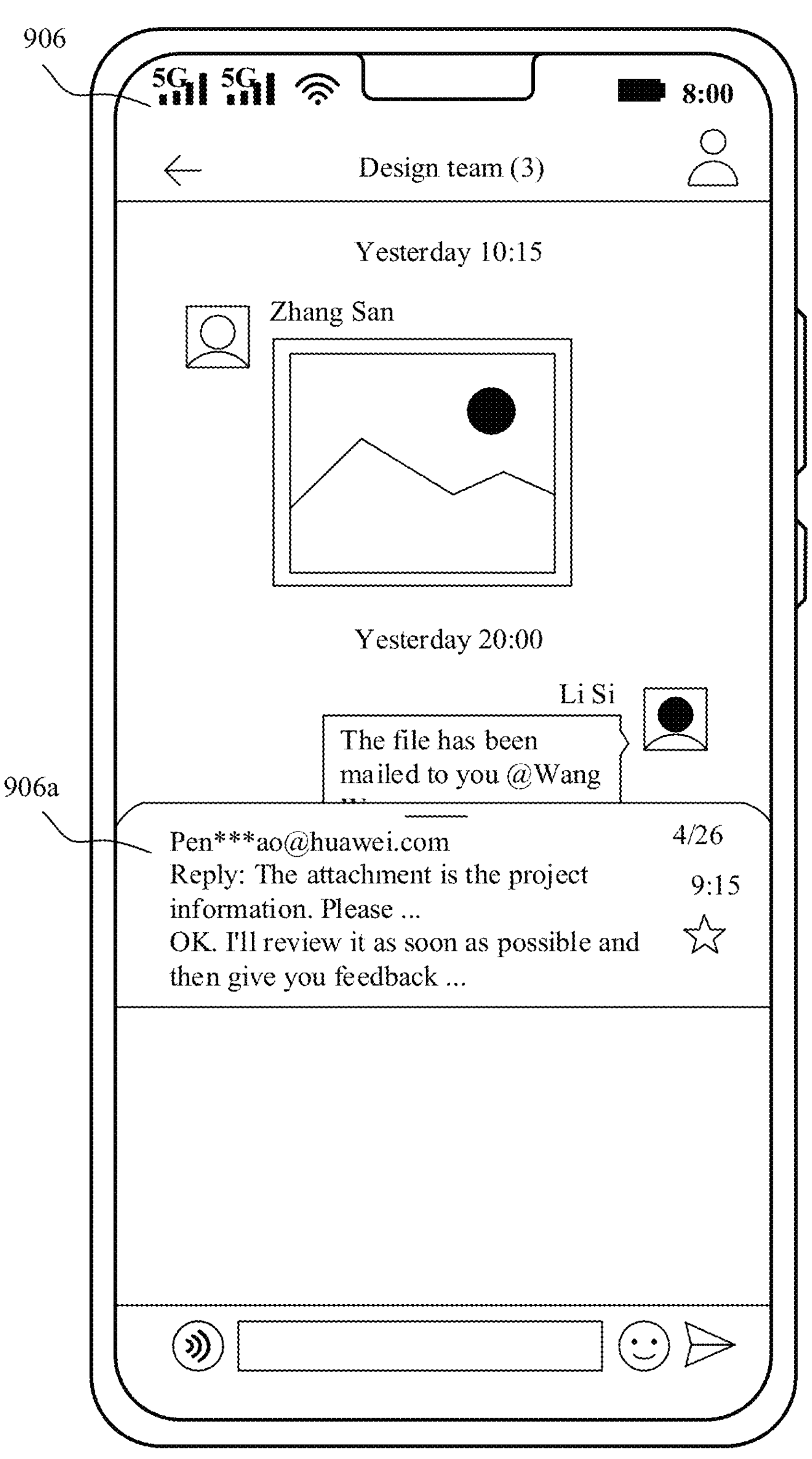

For another example, after the electronic device receives a tap operation performed by the user on a control on which displayed content is "View emails within 4 hours before" in the operation menu 902*a*, similar to FIG. 5C and FIG. 5D, the electronic device may display email records within 4 hours before in two manners. Specifically, assuming that "Yesterday" in FIG. 9A to FIG. 9D is Apr. 26, 2021, as shown in FIG. 9E, the electronic device displays an interface 905 of the email application, and displays an email record within 4 hours before on the interface 905. For another example, as shown in FIG. 9F, the electronic device displays a preset display unit, that is, a pop-up window 906*a*. The pop-up window 906*a* displays the email record within 4 hours before. In a specific implementation process, the preset display unit may alternatively be a display unit in another form such as a floating window or a split-screen interface. This is not limited in this embodiment of this disclosure.

Figure 9G:
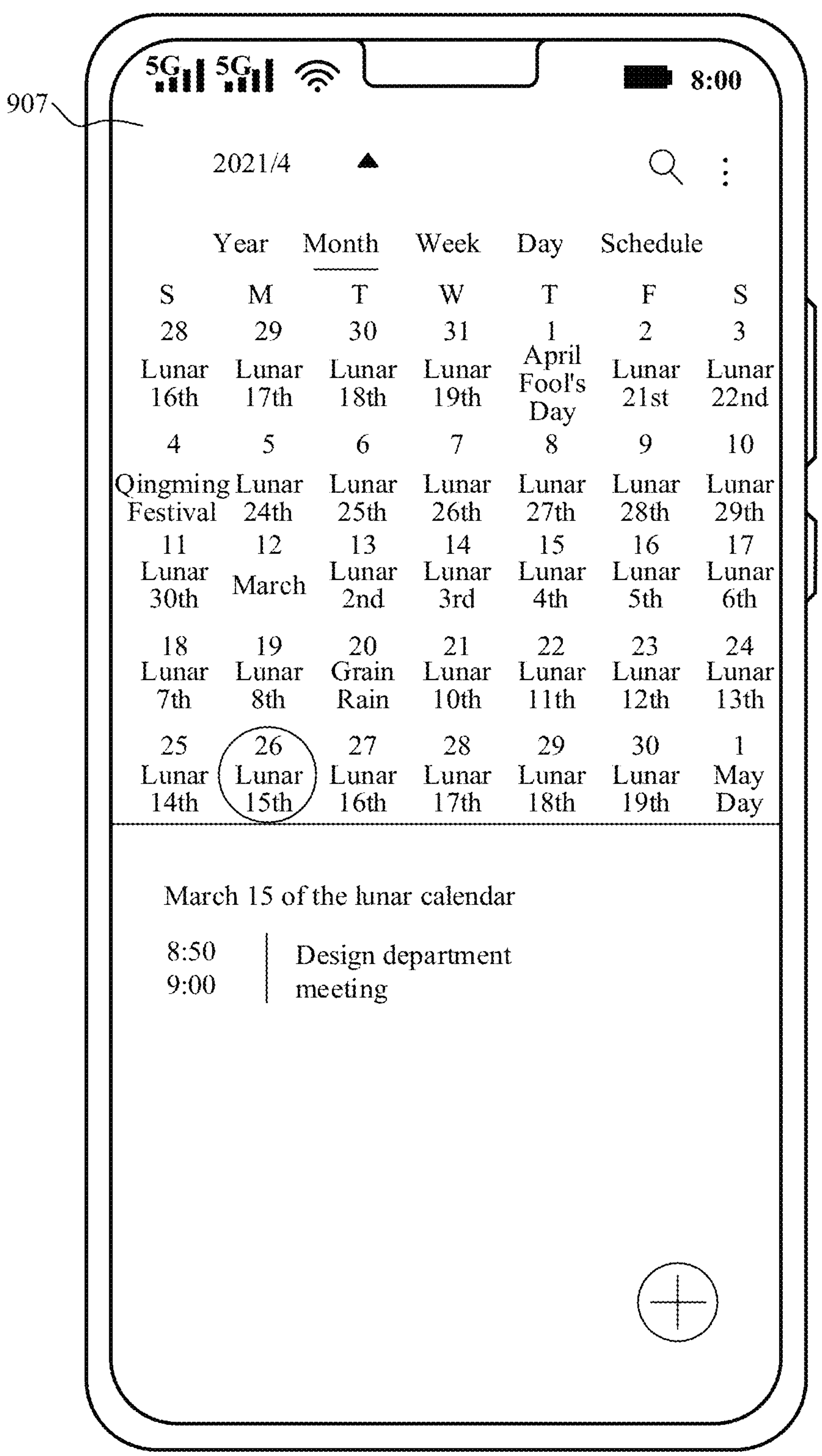
FIG. 9G and FIG. 9H are a schematic diagram 9 of an interface displayed on an electronic device according to an embodiment.
Figure 9H:
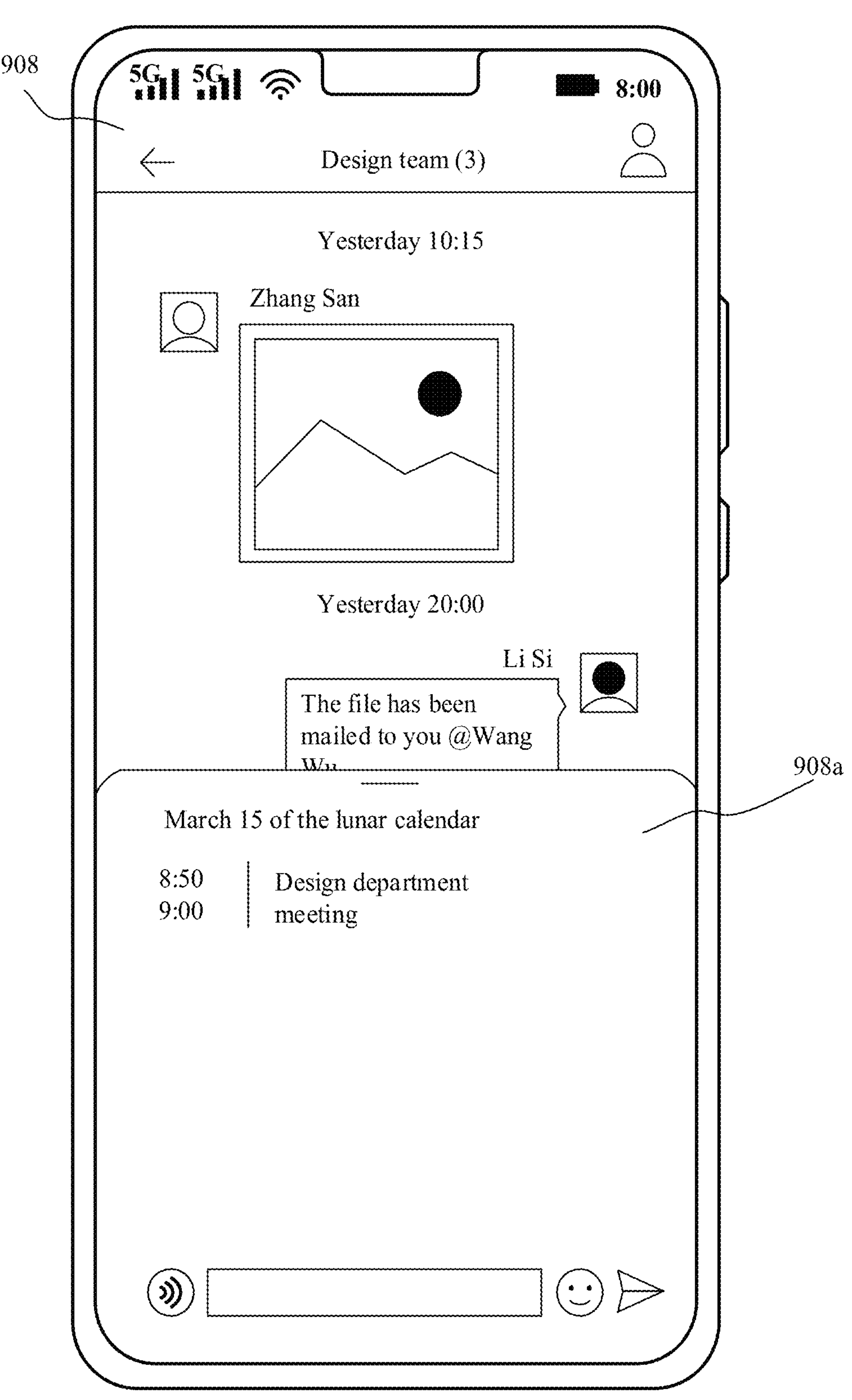

For still another example, after the electronic device receives a tap operation performed by the user on a control on which displayed content is "View schedules within 4 hours before" in the operation menu 902*a*, similar to FIG. 6C and FIG. 6D, the electronic device may display schedule records within 4 hours before in two manners. Specifically, for example, as shown in FIG. 9G, the electronic device displays an interface 907 of the schedule application, and displays a schedule record within 4 hours before on the interface 907. For another example, as shown in FIG. 9H, the electronic device displays a preset display unit, that is, a pop-up window 908*a*. The pop-up window 908*a* displays the schedule record within 4 hours before. In a specific implementation process, the preset display unit may alternatively be a display unit in another form such as a floating window or a split-screen interface. This is not limited in this embodiment of this disclosure.

In other words, in this embodiment of this disclosure, after the electronic device receives the first operation performed by the user on the time label displayed on the first interface of the first application (such as the instant messaging application in Example 2 and Example 3), the operation menu displayed by the electronic device in response to the first operation may include a control (referred to as a control e). After receiving the second operation performed by the user on the control e, the electronic device displays a historical information record of the first application within a specific time period, or displays a historical information record of a second application (that is, an application other than the first application) within a specific time period.

Solution 2:

Different from the examples in Solution 1, in Solution 2, when the user performs an operation (which may be referred to as a first operation) on a date label or a time label corresponding to information displayed on an interface (which may be referred to as a first interface) of an application (which may be referred to as a first operation), the electronic device does not need to display an operation menu for the user to select, but displays a historical information record in response to the first operation.

The following describes a specific implementation process of Solution 2 by using an example.

Example 7

Figure 10A:
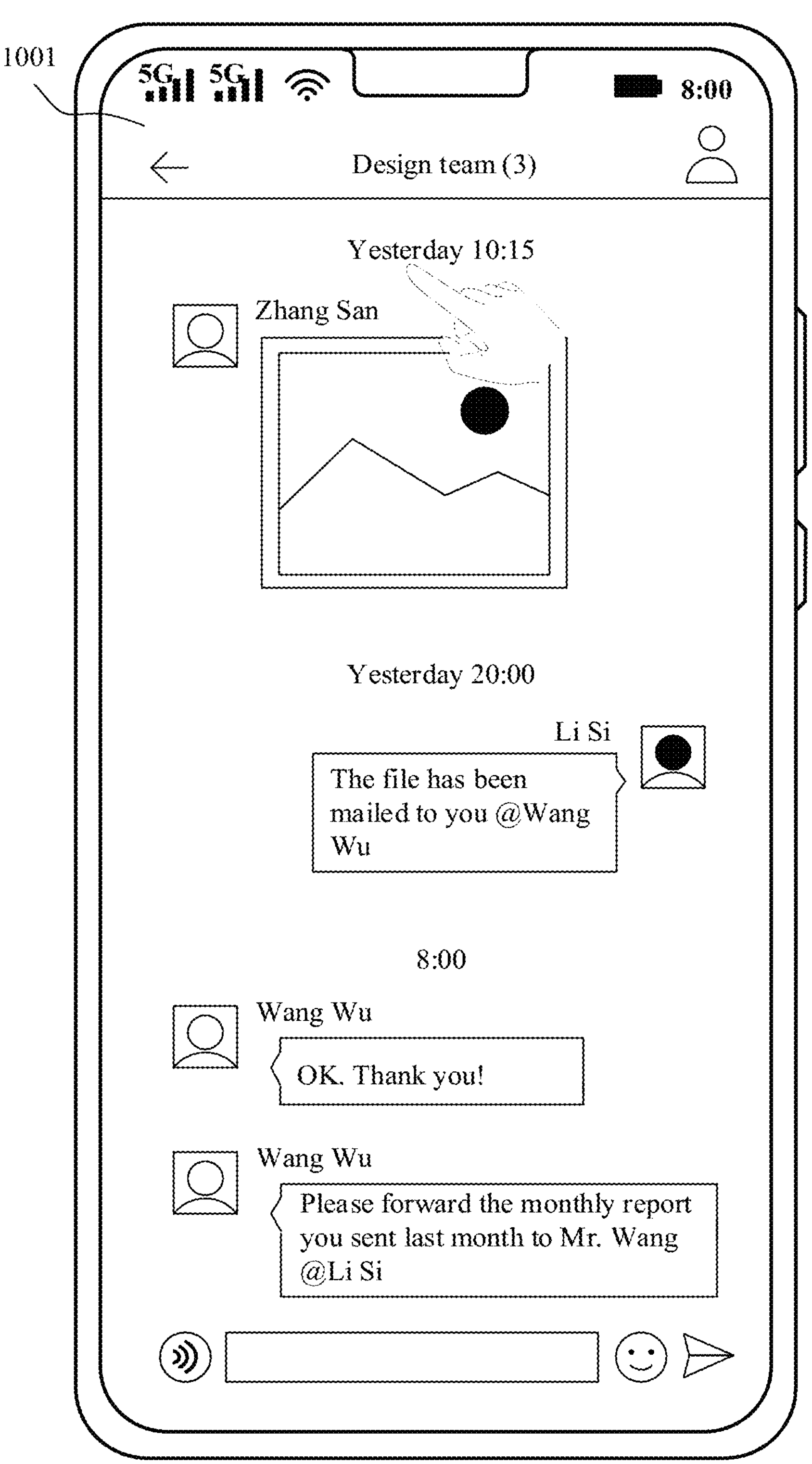
FIG. 10A to FIG. 10C are a schematic diagram 10 of an interface displayed on an electronic device according to an embodiment.

As shown in FIG. 10A, the electronic device displays a chat interface 1001 (the chat interface 1001 may be understood as the first interface in this application) of an instant messaging application (in this case, the instant messaging application may be understood as the first application).

Figure 10B:
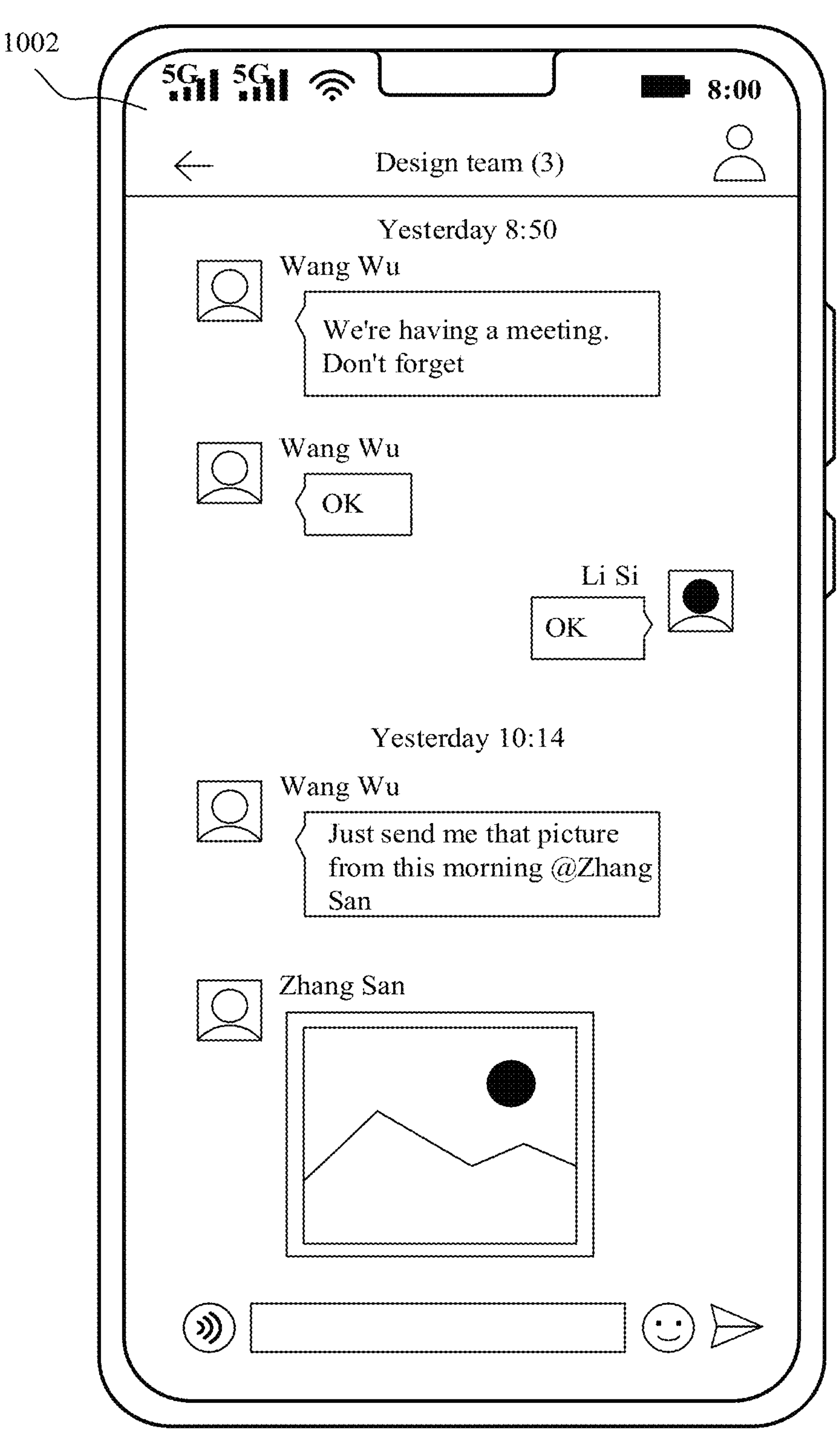

When the electronic device receives a tap operation (the tap operation may be understood as the first operation) performed by the user on a date label "Yesterday" on the chat interface 1001, as shown in FIG. 10B, the electronic device displays, on an interface 1002, chat records on a date (that is, "Yesterday") corresponding to the date label.

Figure 10C:
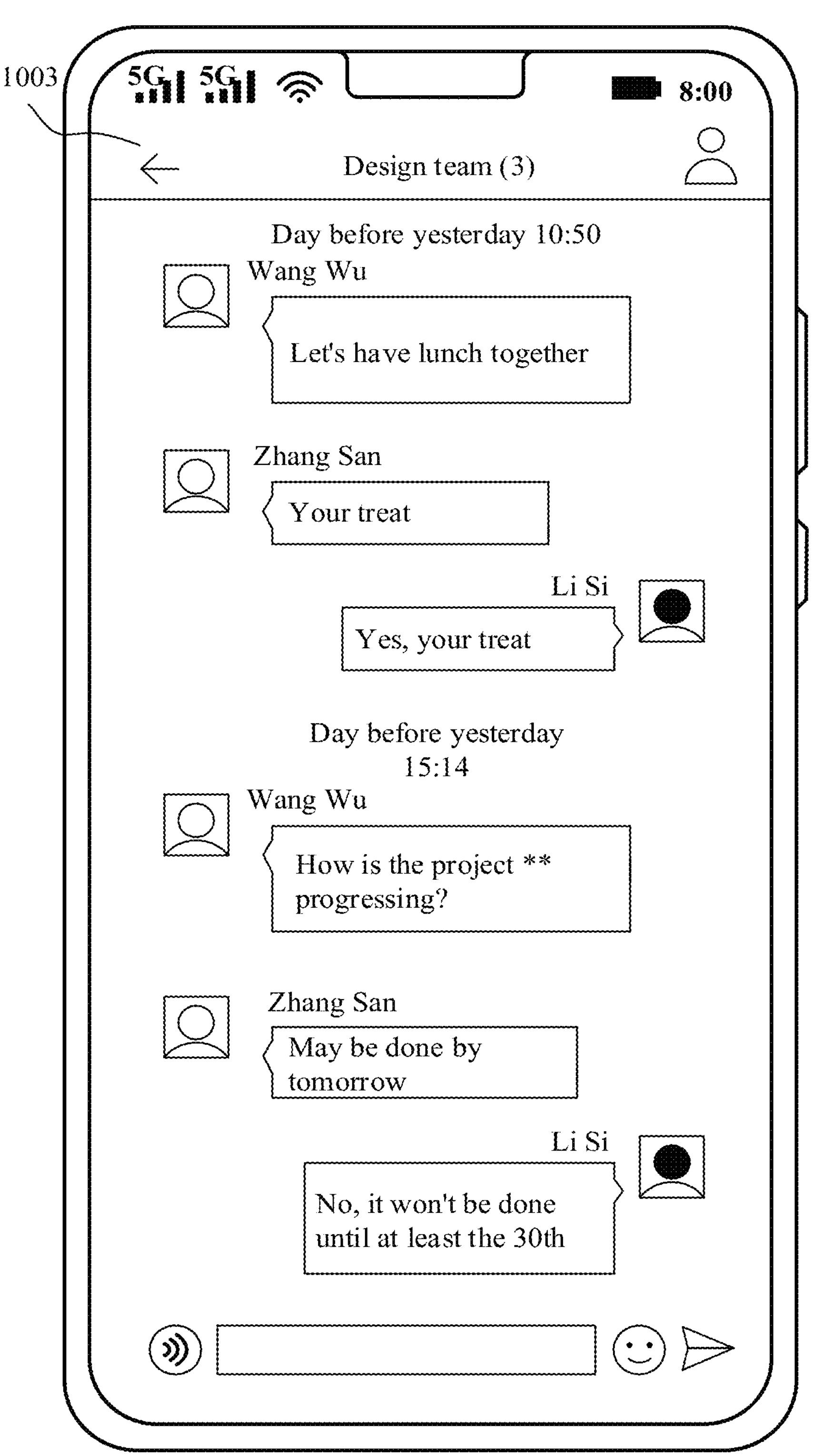

Alternatively, when the electronic device receives a tap operation (the tap operation may be understood as the first operation) performed by the user on a date label "Yesterday" on the chat interface 1001, as shown in FIG. 10C, the electronic device displays, on an interface 1003, chat records on a previous day of the date corresponding to the date label.

In other words, in this embodiment of this disclosure, after the electronic device receives the first operation performed by the user on the date label displayed on the first interface of the first application (such as the instant messaging application in the foregoing example), in response to the first operation, the electronic device may display a historical information record of the first application on a specific date. For example, in the foregoing example, the electronic device displays a chat record of the instant messaging application on a date corresponding to a date label, or displays a chat record of the instant messaging application on a previous day of the date corresponding to the date label.

Example 8

Figure 11A:
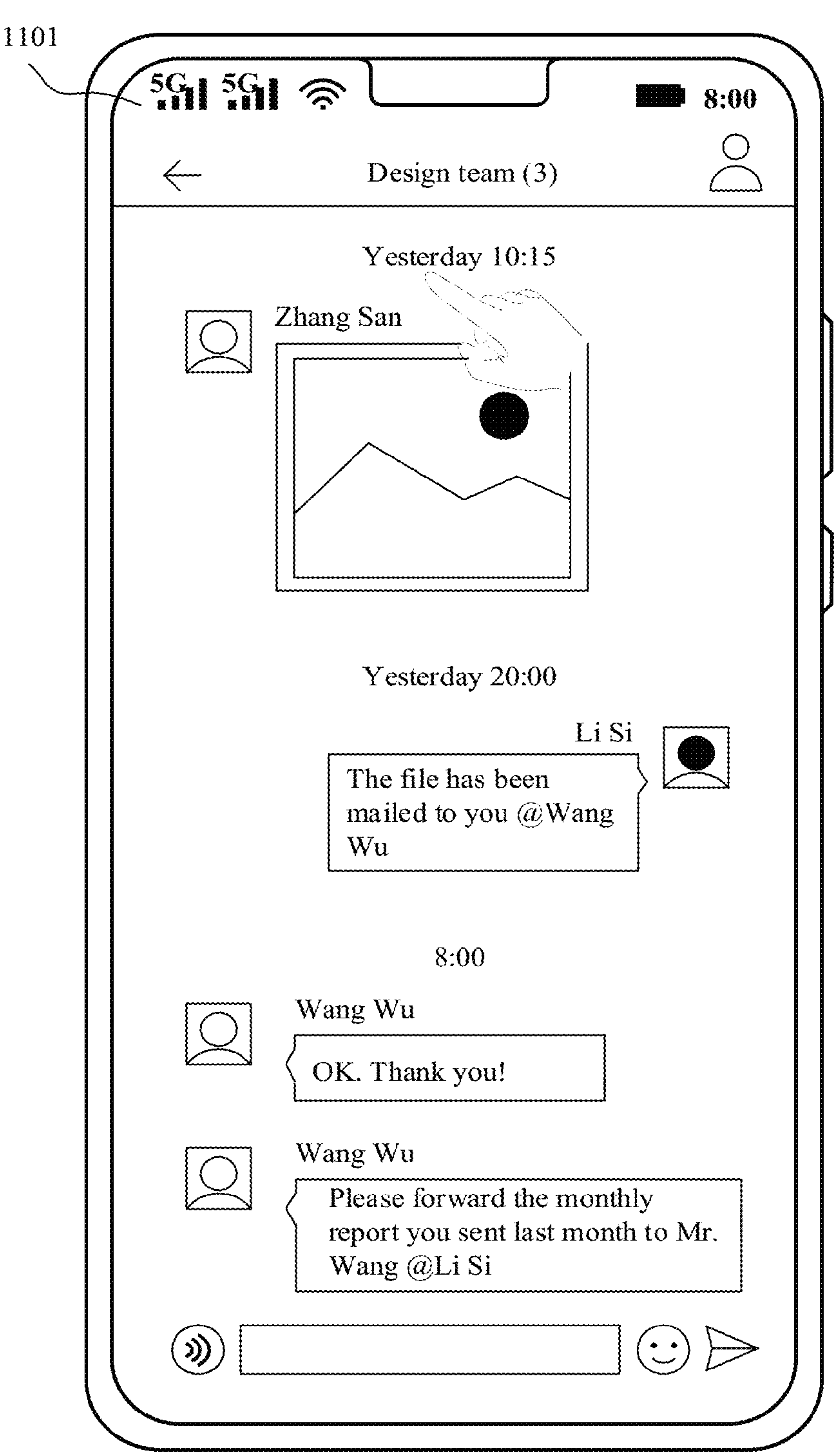
FIG. 11A to FIG. 11C are a schematic diagram 11 of an interface displayed on an electronic device according to an embodiment.

As shown in FIG. 11A, the electronic device displays a chat interface 1101 (which may be understood as the first interface) of an instant messaging application (which may be understood as the first application). When the electronic device receives a tap operation (which may be understood as the first operation) performed by the user on a date label "Yesterday" on the chat interface 1101, the electronic device displays, on an interface, email records on a date corresponding to the date label.

Similar to Example 2, there may be two implementations in which the electronic device displays, on an interface, email records on a date corresponding to the date label.

Figure 11B:
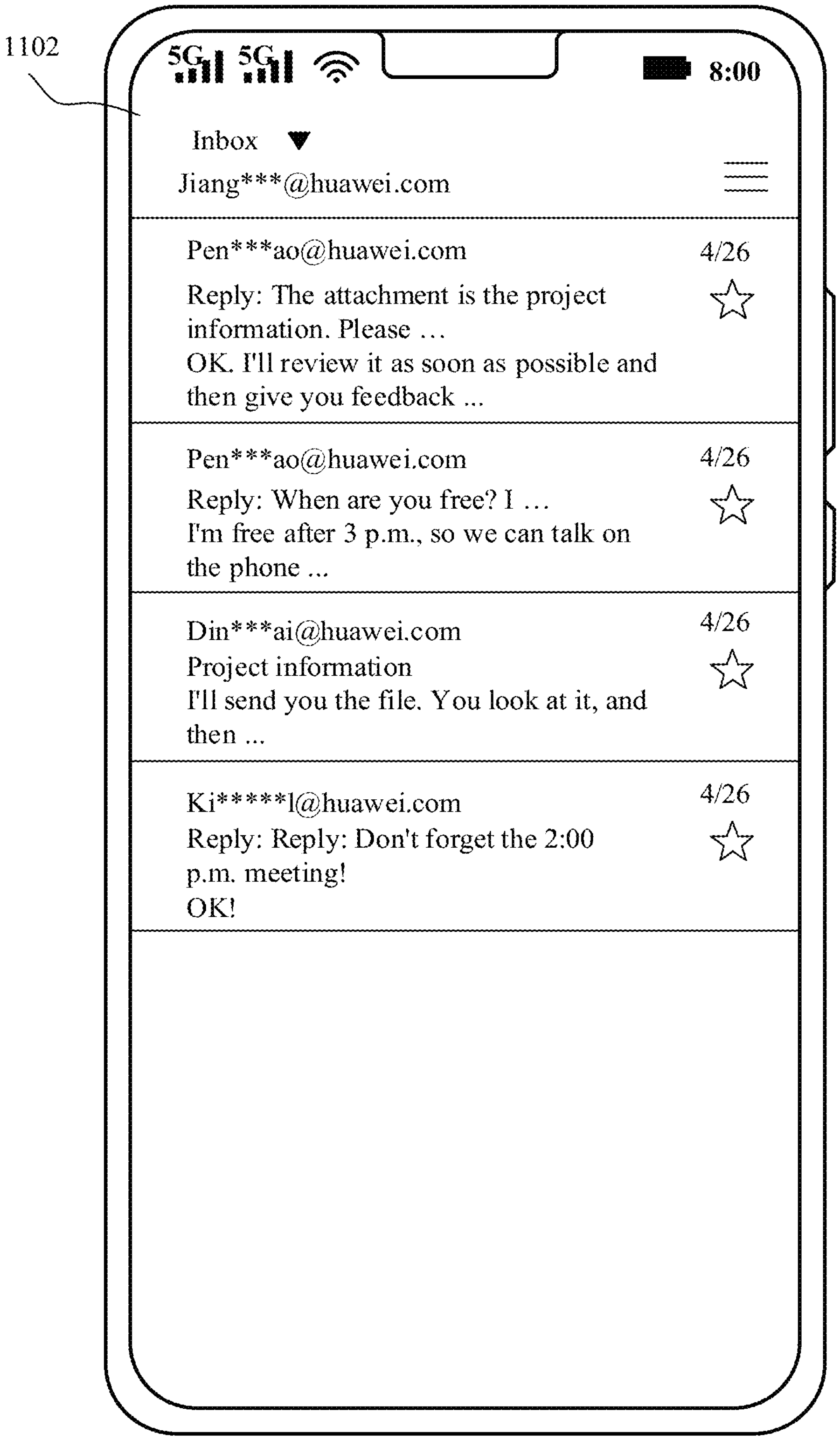

In an implementation, when the electronic device receives a tap operation performed by the user on the date label "Yesterday" on the chat interface 1101, the electronic device may start an email application. After starting the email application, the electronic device may search the email application for the email records on the date corresponding to the date label, and display, on an interface of the email application, the email records on the date corresponding to the date label. For example, as shown in FIG. 11B, the electronic device displays an interface 1102 of the email application, and displays, on the interface 1102, the email records on the date (assuming that the date is April 26) corresponding to the date label.

Figure 11C:
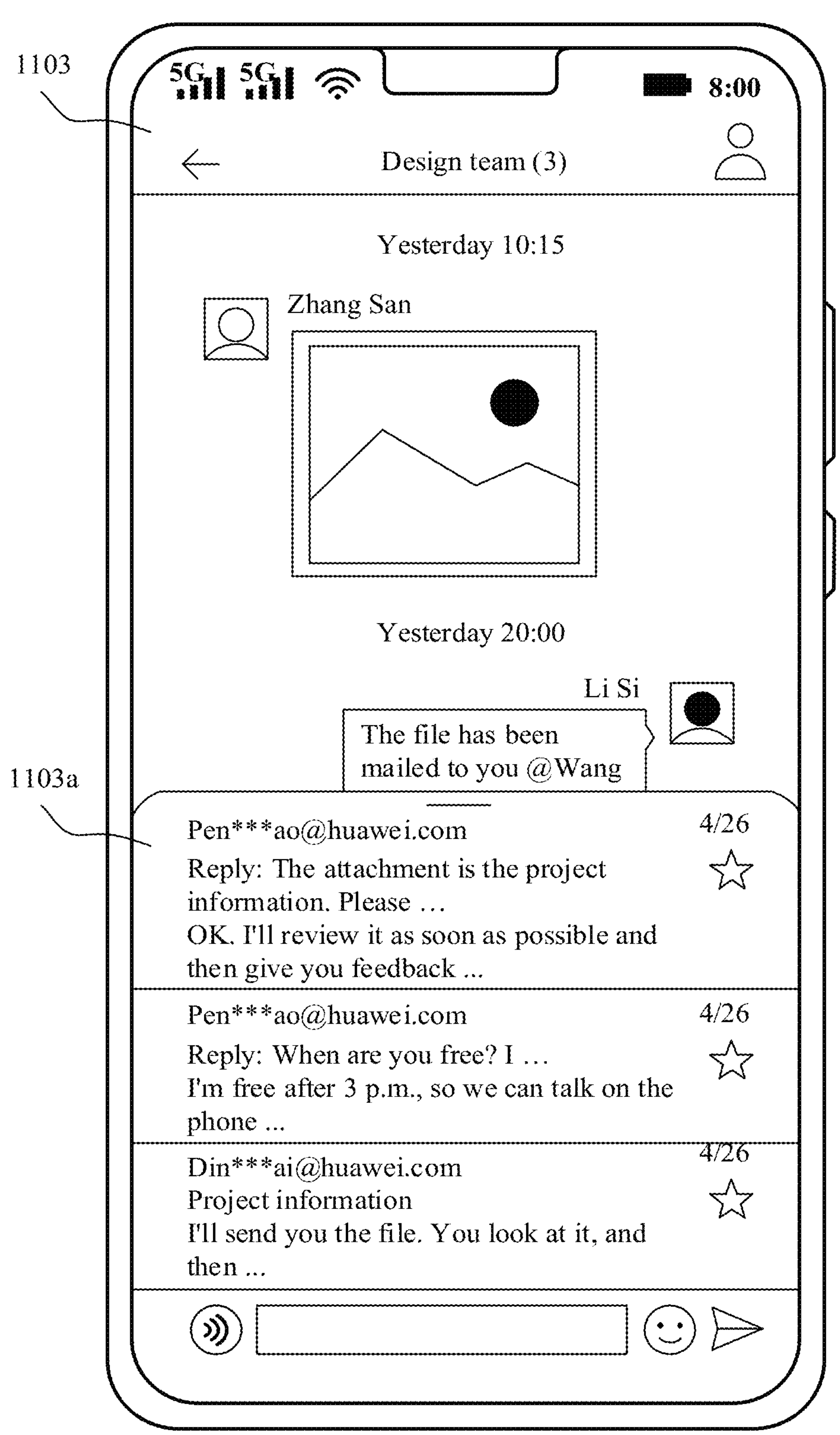

In the other implementation, when the electronic device receives a tap operation performed by the user on the date label "Yesterday" on the chat interface 1101, the electronic device may read, by invoking an API, the email records on the date corresponding to the date label in the email application, and display the email records on the interface. For example, as shown in FIG. 11C, the electronic device displays a preset display unit, that is, a pop-up window 1103*a*, on an interface 1103. The pop-up window 1103*a* includes the email records on the date corresponding to the date label. In a specific implementation process, the preset display unit may alternatively be a display unit in another form such as a floating window or a split-screen interface. This is not limited in this embodiment of this disclosure.

Example 9

Figure 12A:
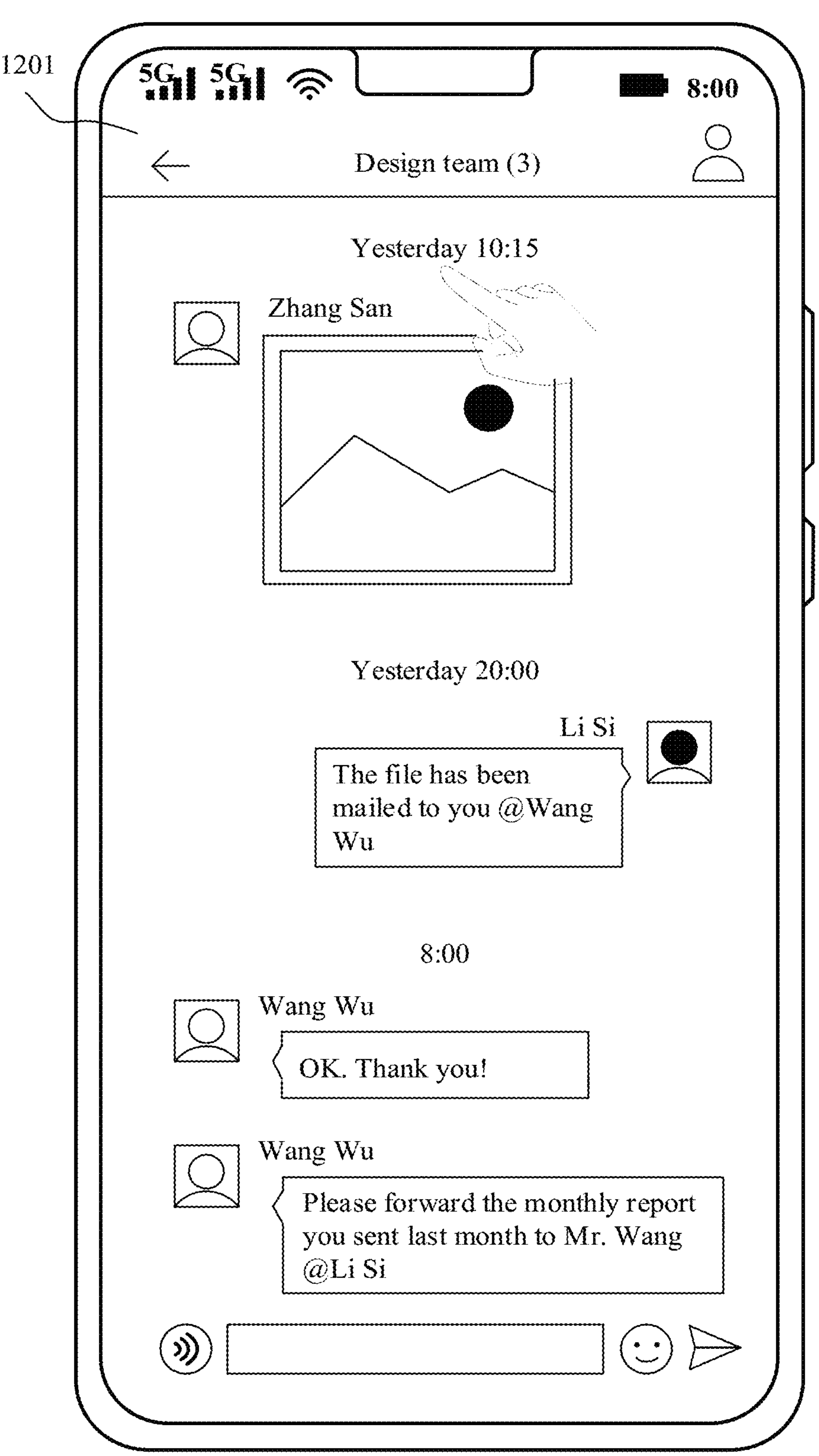
FIG. 12A to FIG. 12C are a schematic diagram 12 of an interface displayed on an electronic device according to an embodiment.

As shown in FIG. 12A, the electronic device displays a chat interface 1201 (which may be understood as the first interface in this application) of an instant messaging application (which may be understood as the first application). When the electronic device receives a tap operation (which may be understood as the first operation) performed by the user on a date label "Yesterday" on the chat interface 1201, the electronic device displays, on an interface, schedule records on a date corresponding to the date label.

Similar to Example 3, there may be two implementations in which the electronic device displays, on an interface, schedule records on a date corresponding to the date label.

Figure 12B:
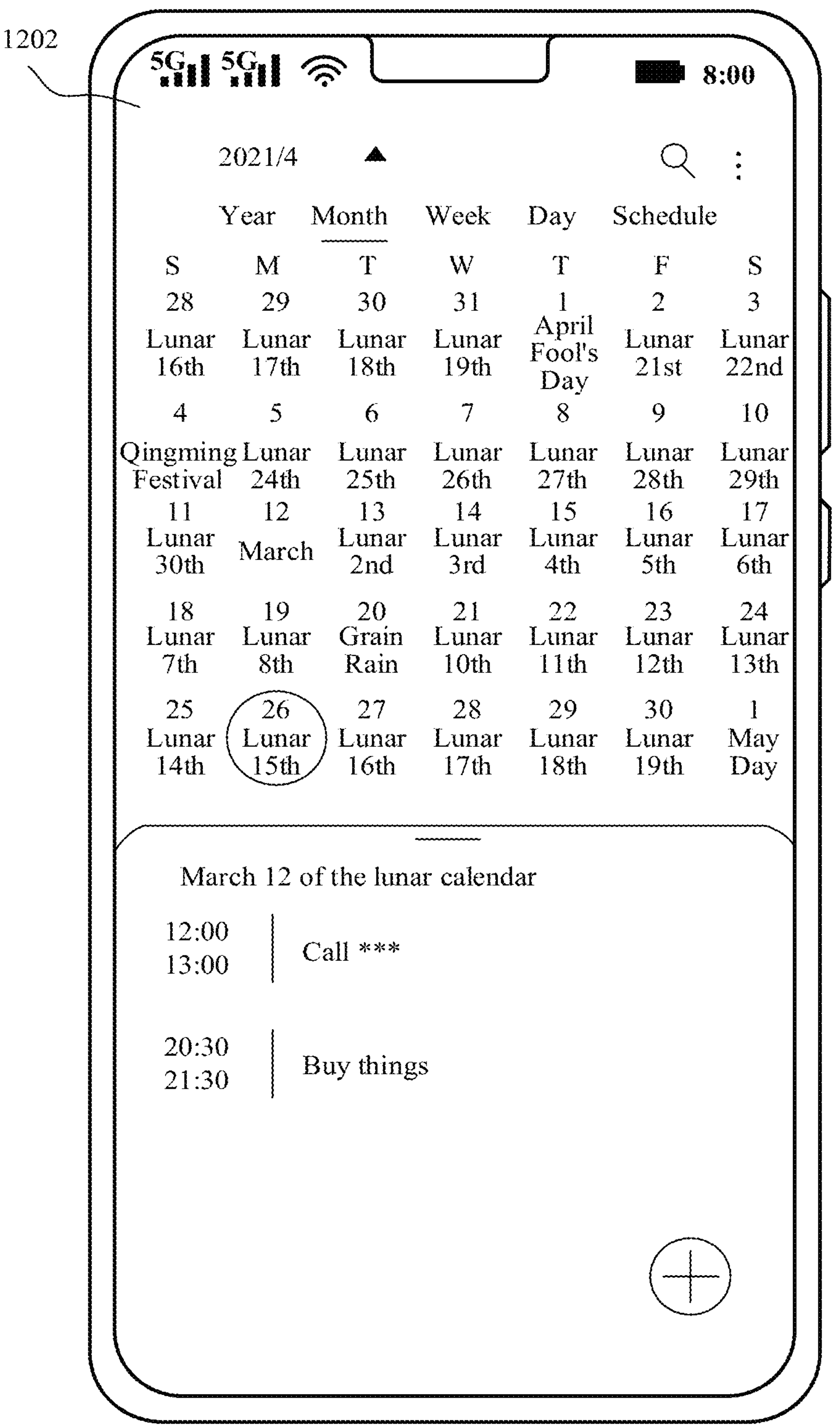

In an implementation, when the electronic device receives a tap operation performed by the user on the date label "Yesterday" on the chat interface 1201, the electronic device may start a schedule application. After starting the schedule application, the electronic device may search the schedule application for the schedule records on the date corresponding to the date label, and display, on an interface of the schedule application, the schedule records on the date corresponding to the date label. For example, as shown in FIG. 12B, the electronic device displays an interface 1202 of the schedule application, and displays, on the interface 1202, the schedule records on the date (assuming that the date is April 26) corresponding to the date label.

Figure 12C:
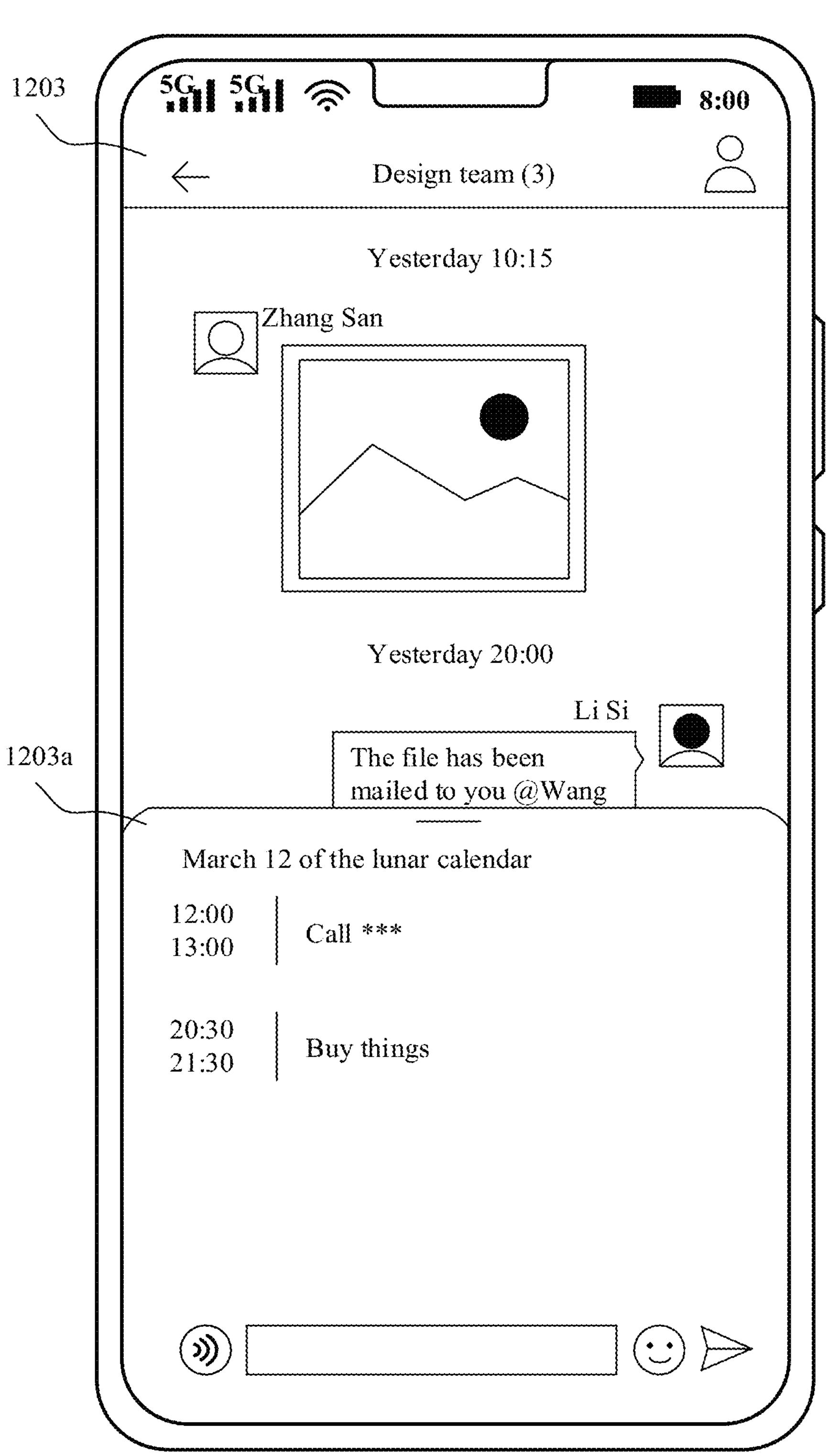

In the other implementation, when the electronic device receives a tap operation performed by the user on the date label "Yesterday" on the chat interface 1201, the electronic device may read, by invoking an API, the schedule records on the date corresponding to the date label in the schedule application, and display the schedule records on the interface. For example, as shown in FIG. 12C, the electronic device displays a preset display unit, that is, a pop-up window 1203*a*, on an interface 1203. The pop-up window 1203*a* includes schedule records on the date corresponding to the date label. In a specific implementation process, the preset display unit may alternatively be a display unit in another form such as a floating window or a split-screen interface. This is not limited in this embodiment of this disclosure.

It can be learned from Example 8 and Example 9 that, in this embodiment of this disclosure, after the electronic device receives the first operation performed by the user on the date label displayed on the first interface of the first application (such as the instant messaging application in Example 2 and Example 3), in response to the first operation, the electronic device may display a historical information record, on a specific data, of a second application different from the first application. For example, in Example 8, the electronic device displays an email record on the date corresponding to the date label. For another example, in Example 9, the electronic device displays a schedule record on the date corresponding to the date label.

Example 10

Figure 13A:
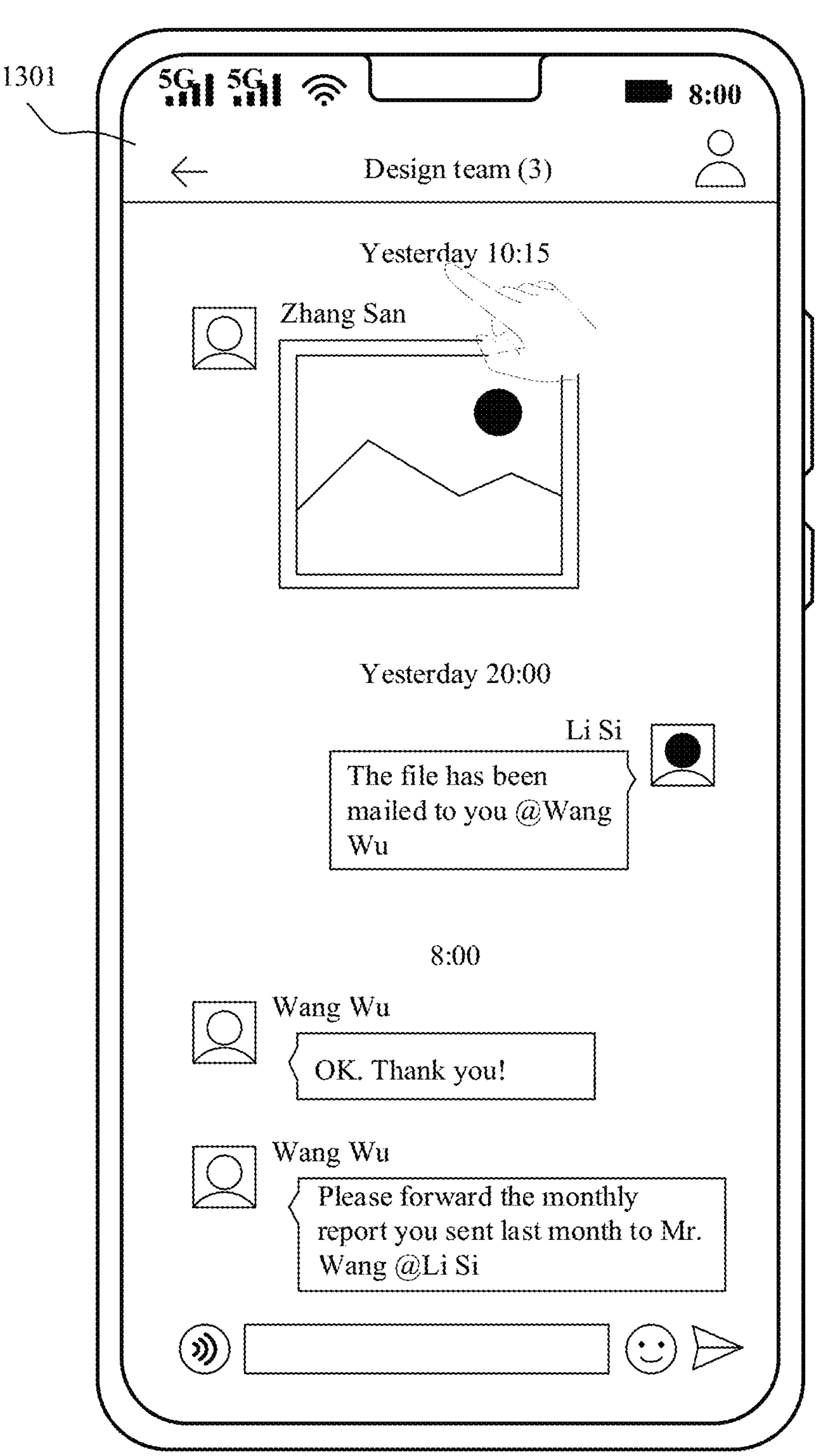
Figure 13B:
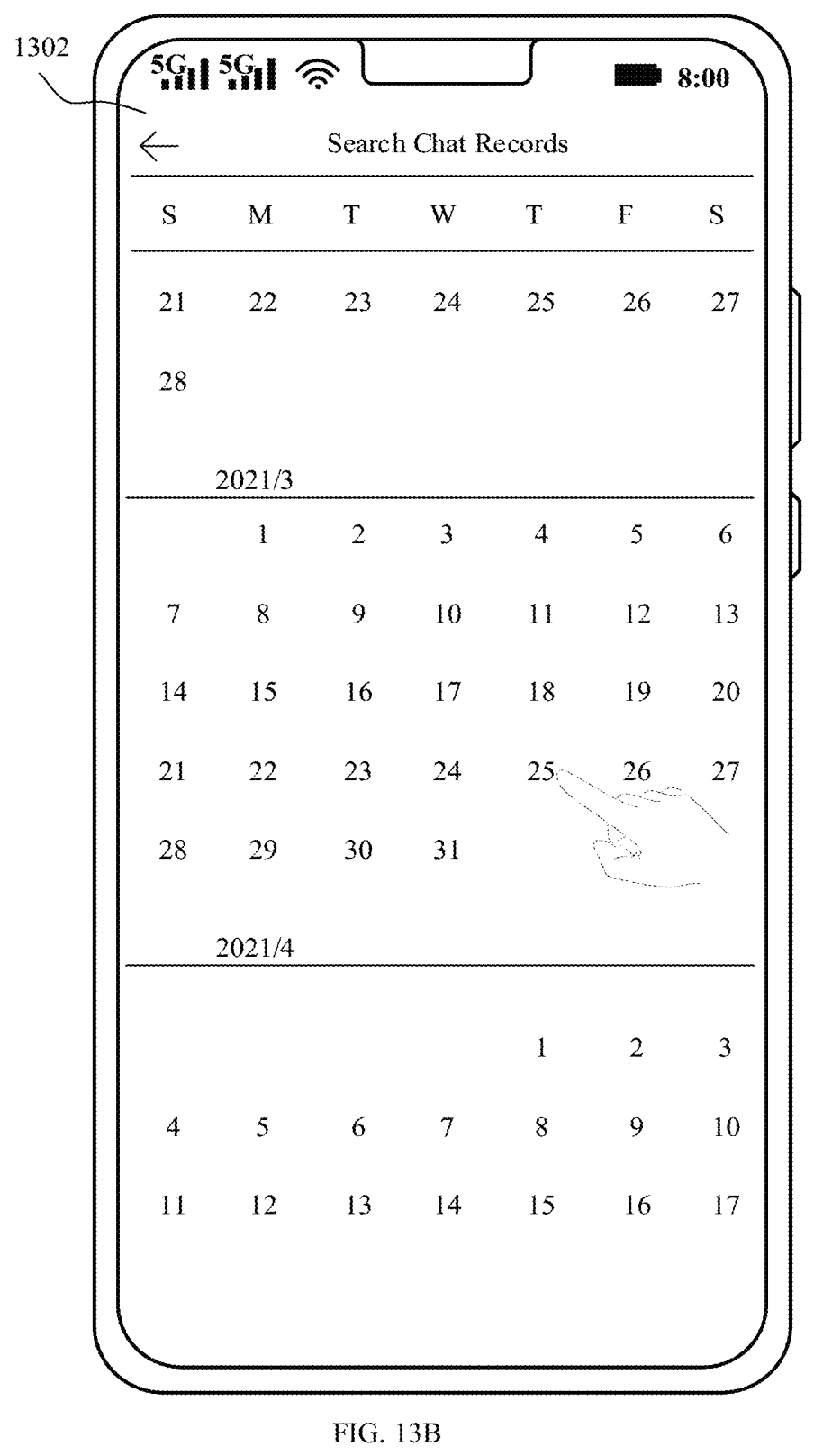
Figure 13C:
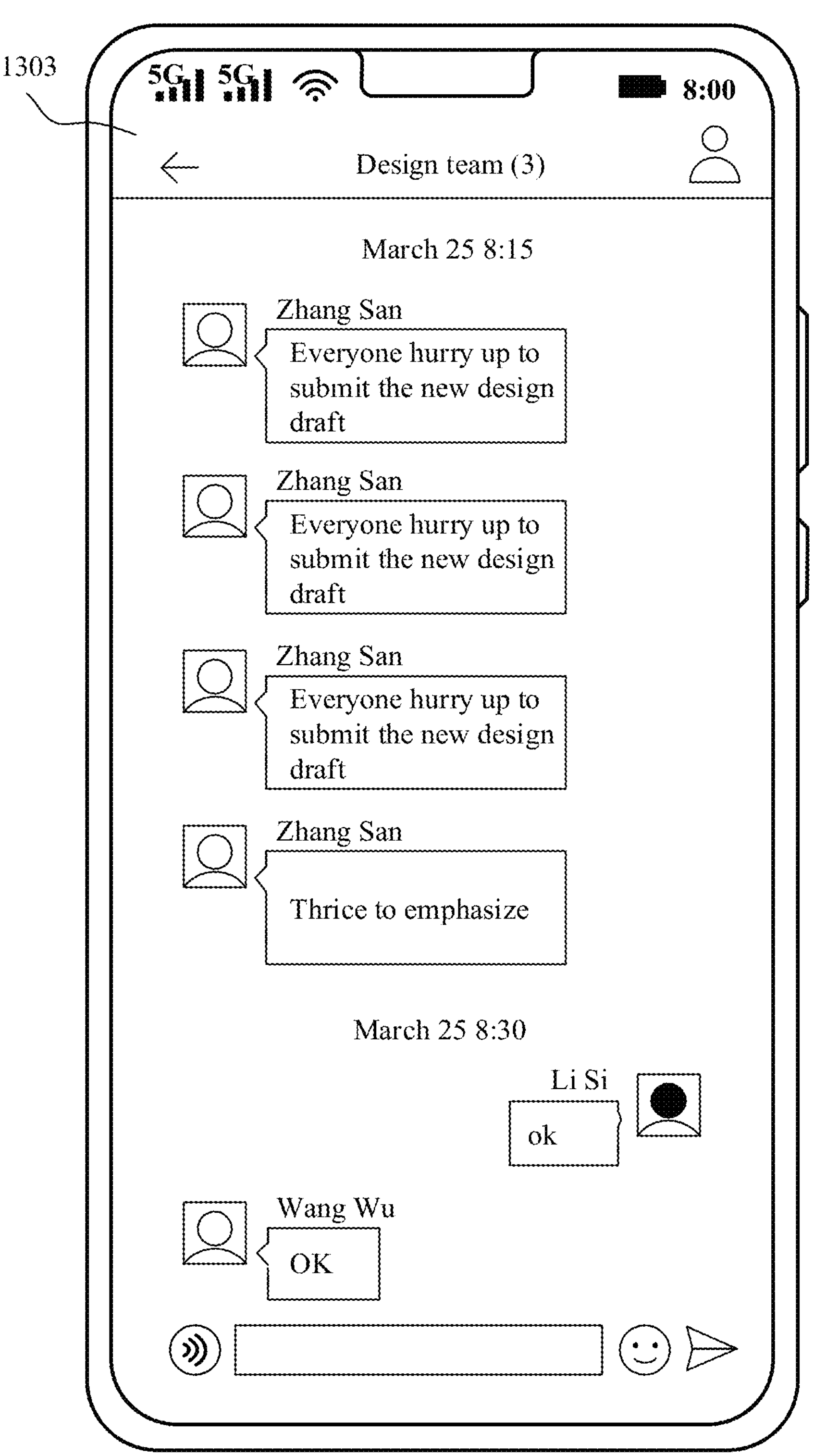

As shown in FIG. 13A, the electronic device displays a chat interface 1301 (which may be understood as the first interface) of an instant messaging application (which may be understood as the first application). When the electronic device receives a tap operation (which may be understood as the first operation) performed by the user on a date label "Yesterday" on the chat interface 1301, as shown in FIG. 13B, the electronic device displays a calendar on an interface 1302. Then, after the electronic device receives a selection operation (referred to as a third operation) performed by the user on a date (referred to as a first date) in the calendar, as shown in FIG. 13C, the electronic device displays a historical information record on the first date.

In other words, in this embodiment of this disclosure, after the electronic device receives the first operation performed by the user on the date label displayed on the first interface of the first application (such as the instant messaging application), the electronic device may display the calendar in response to the first operation. Then, after receiving an operation that the user selects a date in the calendar, the electronic device displays a historical information record of the first application on the date.

Example 11

Figure 14A:
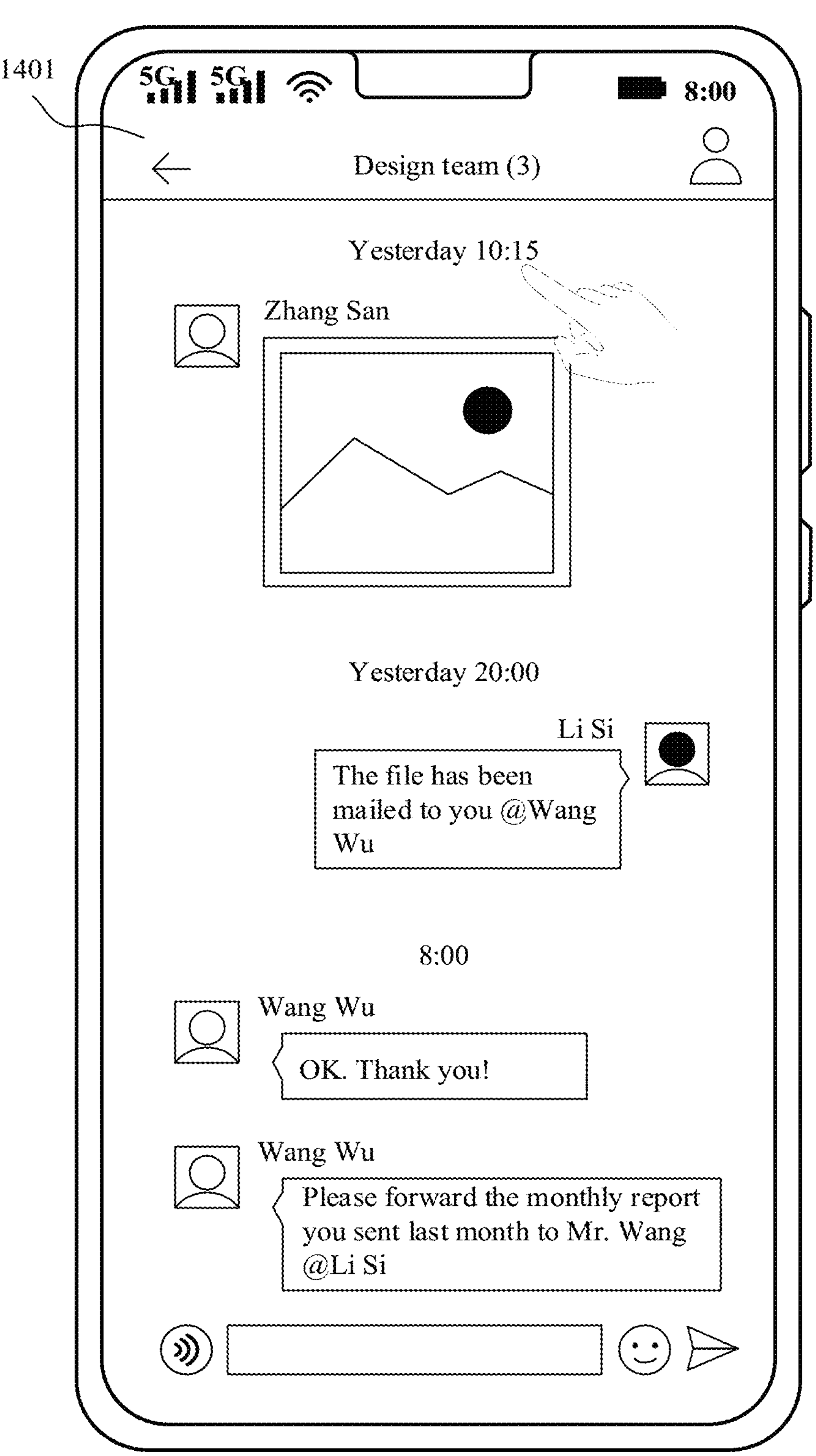
FIG. 14A to FIG. 14C are a schematic diagram 14 of an interface displayed on an electronic device according to an embodiment.

As shown in FIG. 14A, the electronic device displays a chat interface 1401 (the chat interface 1401 may be understood as the first interface) of an instant messaging application (in this case, the instant messaging application may be understood as the first application).

Figure 14B:
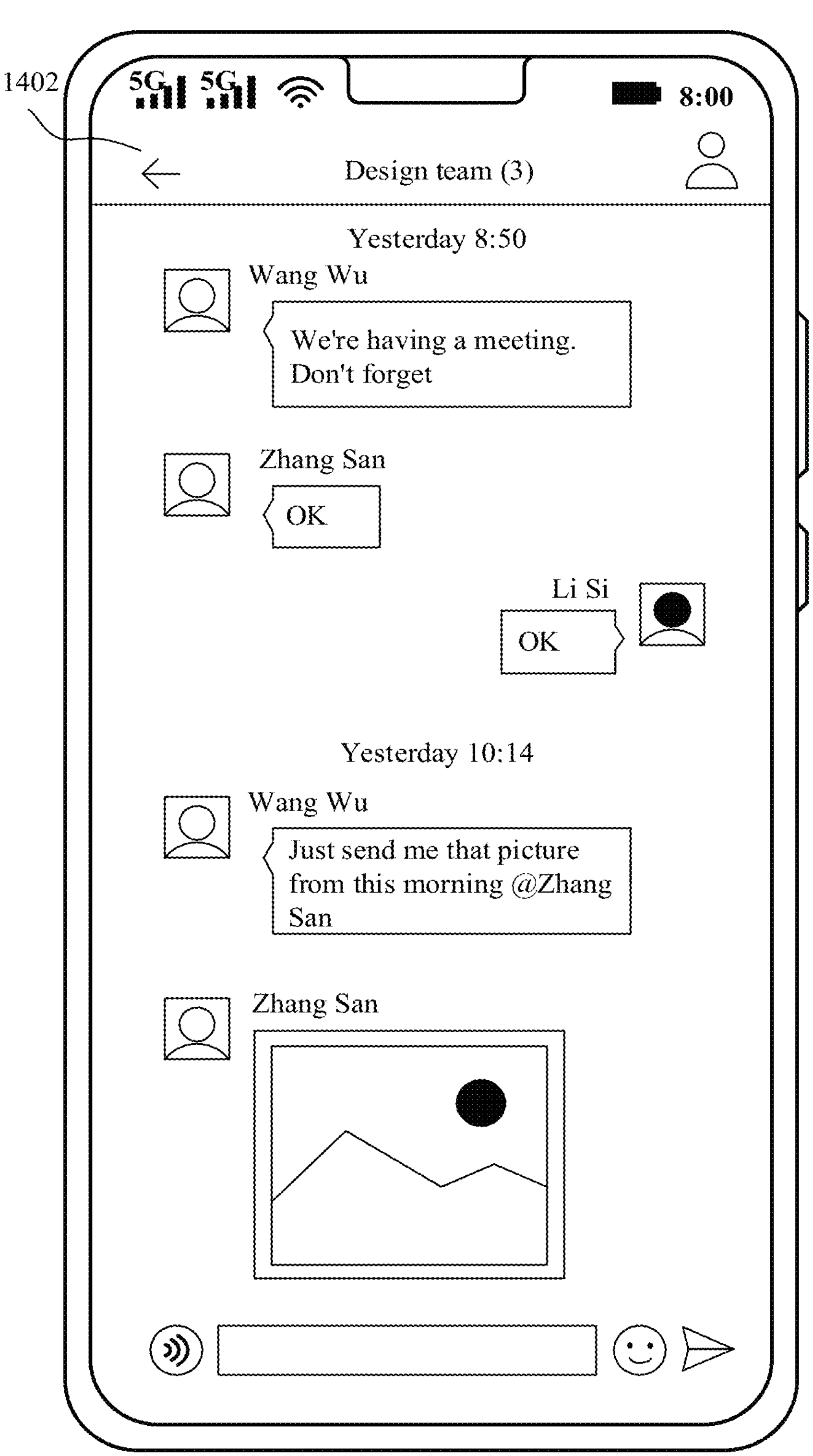

When the electronic device receives a tap operation (the tap operation may be understood as the first operation) performed by the user on a time label "10:15" on the chat interface 1401, the electronic device displays a historical information record within a time period (referred to as a first time period). During actual application, the first time period may be set based on an actual requirement. In addition, the historical information record displayed by the electronic device may be a historical information record in the instant messaging application, or may be a historical information record in an application other than the instant messaging application. Details are as follows:

For example, if the first time period is 4 hours before a time information indicated by the time label, when the electronic device receives a tap operation performed by the user on the time label "10:15" on the chat interface 1401, as shown in FIG. 14B, the electronic device displays chat records within 4 hours from 6:15 to 10:15 yesterday on an interface 1402.

Figure 14C:
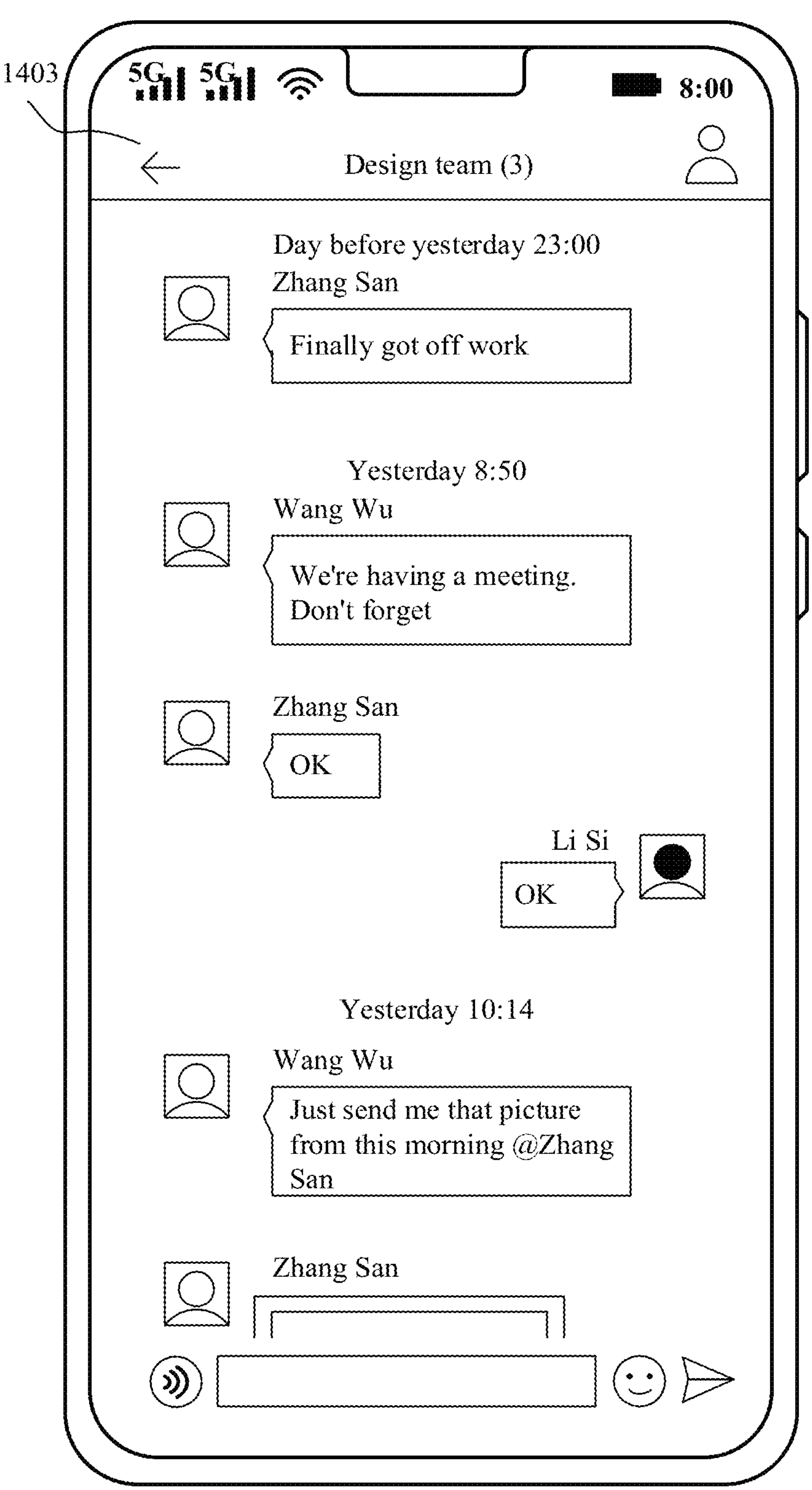

For another example, if the first time period is 12 hours before a time information indicated by the time label, when the electronic device receives a tap operation performed by the user on the time label "10:15" on the chat interface 1401, as shown in FIG. 14C, the electronic device displays chat records within 12 hours from 22:15 the day before yesterday to 10:15 yesterday on an interface 1403.

For another example, it is assumed that the first time period is 4 hours before a time information indicated by the time label, the historical information record displayed by the electronic device may be an email record, and "Yesterday" in FIG. 14A to FIG. 14C is Apr. 26, 2021. In this case, when the electronic device receives a tap operation performed by the user on the time label "10:15" on the chat interface 1401, for content performed by the electronic device in response to the tap operation, refer to the foregoing descriptions of FIG. 9E and FIG. 9F. To be specific, in response to the tap operation, the electronic device displays the interface 905 of the email application shown in FIG. 9E, and displays the email records within 4 hours before on the interface 905. Alternatively, in response to the tap operation, the electronic device displays the pop-up window 906*a* shown in FIG. 9F, and displays the email records within 4 hours before in the pop-up window 906*a*.

For another example, it is assumed that the first time period is 4 hours before a time information indicated by the time label, the historical information record displayed by the electronic device may be a schedule record, and "Yesterday" in FIG. 14A to FIG. 14C is Apr. 26, 2021. In this case, when the electronic device receives a tap operation performed by the user on the time label "10:15" on the chat interface 1401, for content performed by the electronic device in response to the tap operation, refer to the foregoing descriptions of FIG. 9G and FIG. 9H. To be specific, in response to the tap operation, the electronic device displays the interface 907 of the schedule application shown in FIG. 9G, and displays the schedule records within 4 hours before on the interface 907. Alternatively, in response to the tap operation, the electronic device displays the pop-up window 908*a* shown in FIG. 9H, and displays schedule records within 4 hours before in the pop-up window 908*a*.

In other words, in this embodiment of this disclosure, after the electronic device receives the first operation performed by the user on the time label displayed on the first interface of the first application (such as the instant messaging application in Example 2 and Example 3), in response to the first operation, the electronic device may display a historical information record of the first application on a specific date, or display a historical information record of a second application (that is, an application other than the first application) within a specific time period.

In addition, in some embodiments of this disclosure, to prevent the user from performing cumbersome operations during information searching, a user identifier displayed on the interface of the electronic device may be further used to trigger the historical information record displayed by the electronic device.

The user identifier may include various texts or patterns indicating a target user. For example, the user identifier may be a user avatar pattern, a nickname text, or the like on the chat interface of the instant messaging application. For another example, the user identifier may be a user email address in the email application. For another example, the user identifier may be a contact name, a phone number, or the like in the SMS application.

Figure 15A:
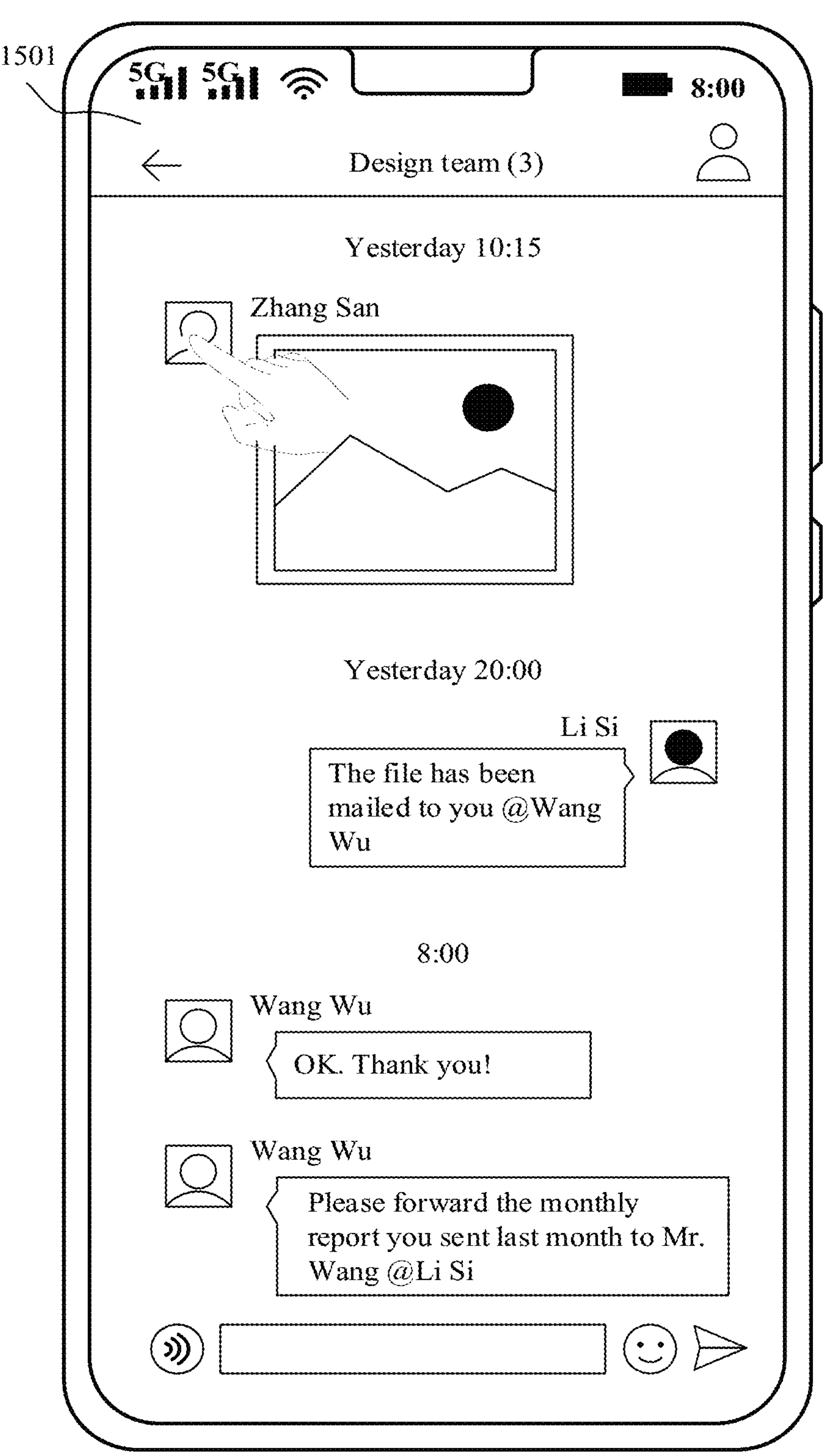
FIG. 15A to FIG. 15C are a schematic diagram 15 of an interface displayed on an electronic device according to an embodiment.
Figure 15B:
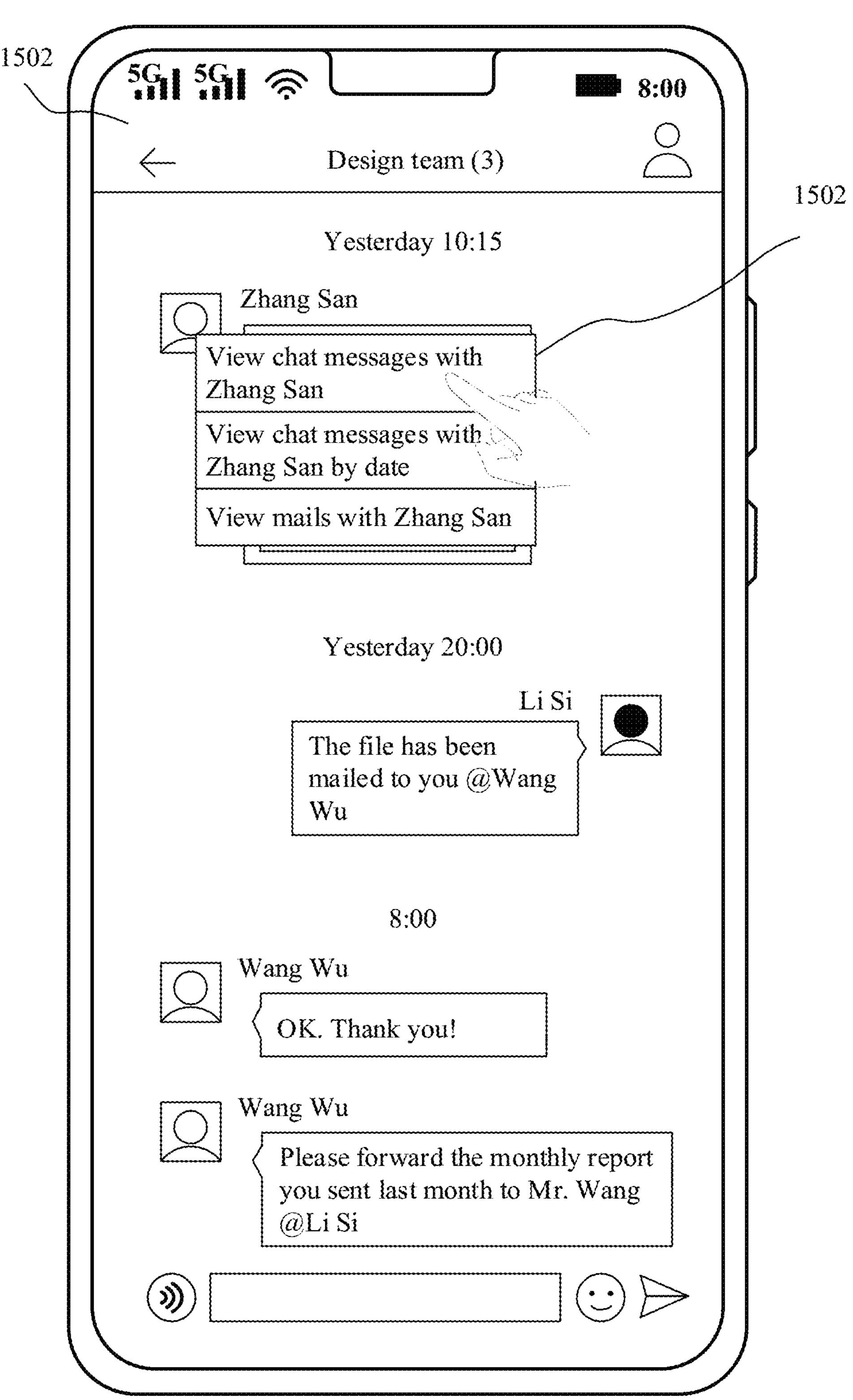

Specifically, in a first implementation, for example, as shown in FIG. 15A, the electronic device displays a chat interface 1501 (the chat interface 1501 may be understood as the first interface) of an instant messaging application (in this case, the instant messaging application may be understood as the first application). After the electronic device receives a tap operation performed by the user on a user avatar of Zhang San on the chat interface 1501, as shown in FIG. 15B, the electronic device displays an operation menu 1502*a* on an interface 1502. Then, when receiving an operation performed by the user on a control in the operation menu 1502*a*, the electronic device displays a historical information record in a manner corresponding to the control.

Figure 15C:
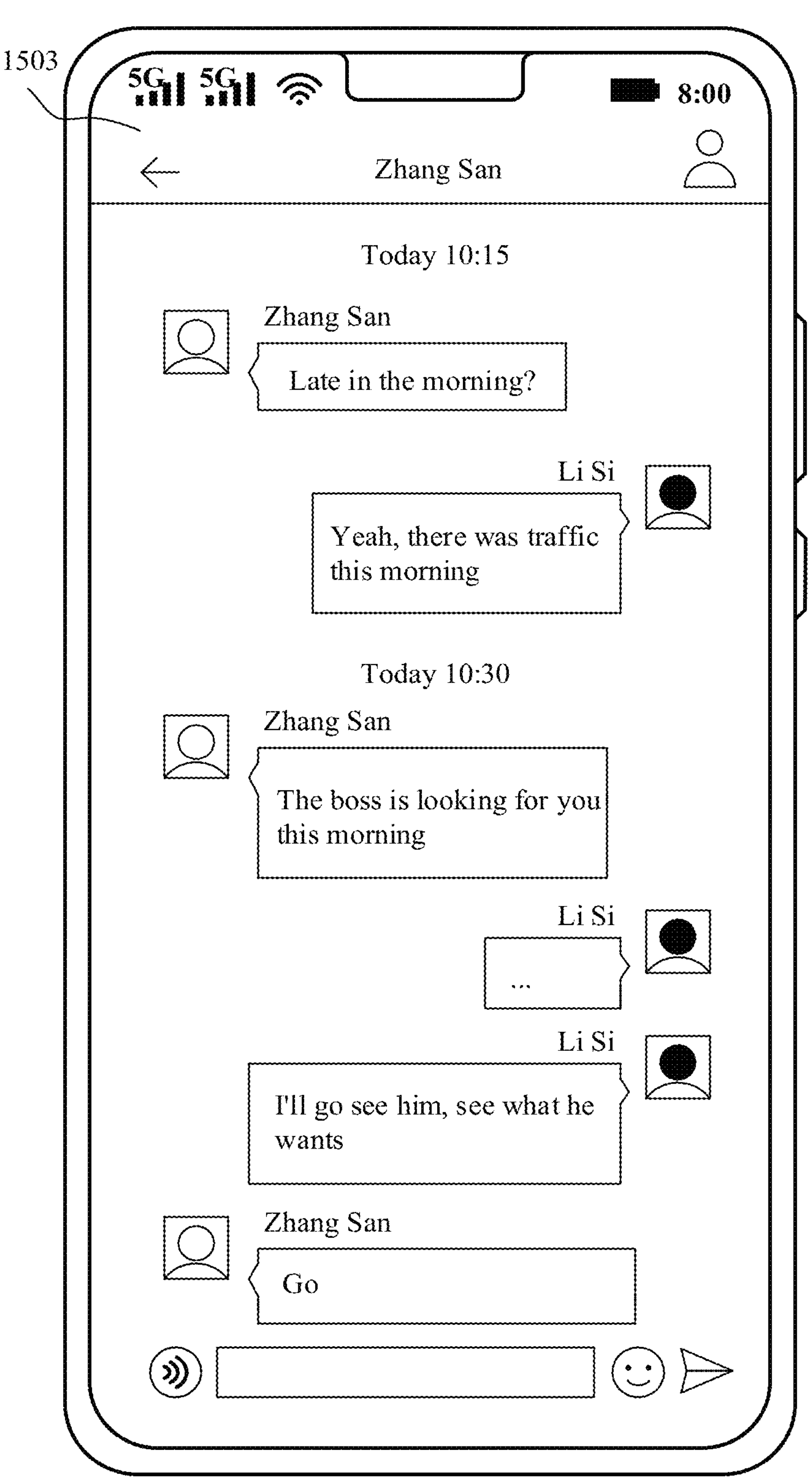

For example, after the electronic device receives a tap operation performed by the user on a control on which displayed content is "View chat messages with Zhang San" in the operation menu 1502*a*, as shown in FIG. 15C, the electronic device displays chat records with Zhang San on an interface 1503.

Figure 15D:
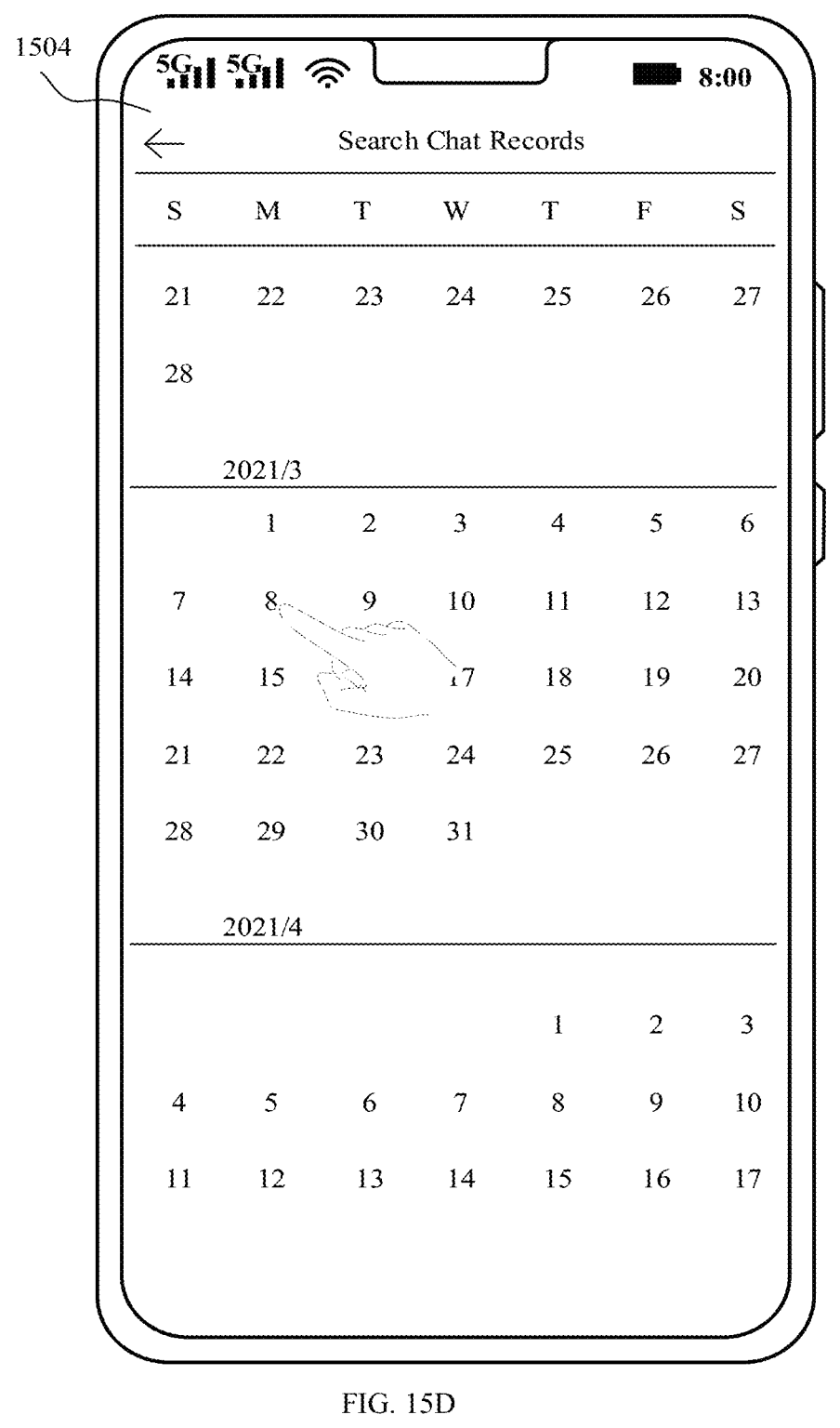
Figure 15E:
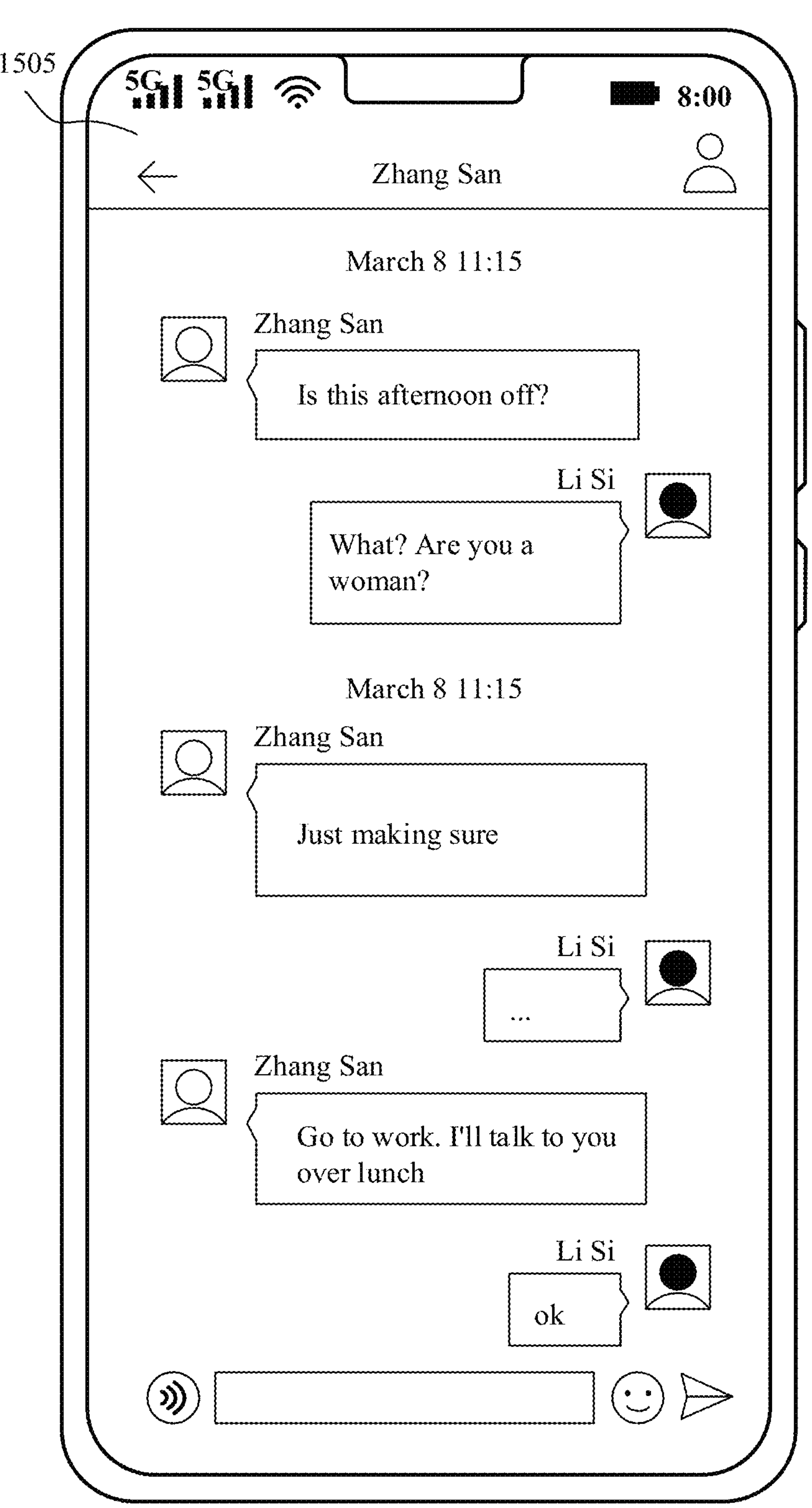

For another example, after the electronic device receives a tap operation performed by the user on a control on which displayed content is "View chat messages with Zhang San by date" in the operation menu 1502*a*, as shown in FIG. 15D, the electronic device displays an interface 1504, and displays a calendar on the interface 1504. Then, after receiving an operation that the user selects a date in the calendar, as shown in FIG. 15E, the electronic device displays chat records with Zhang San on the date.

Figure 15F:
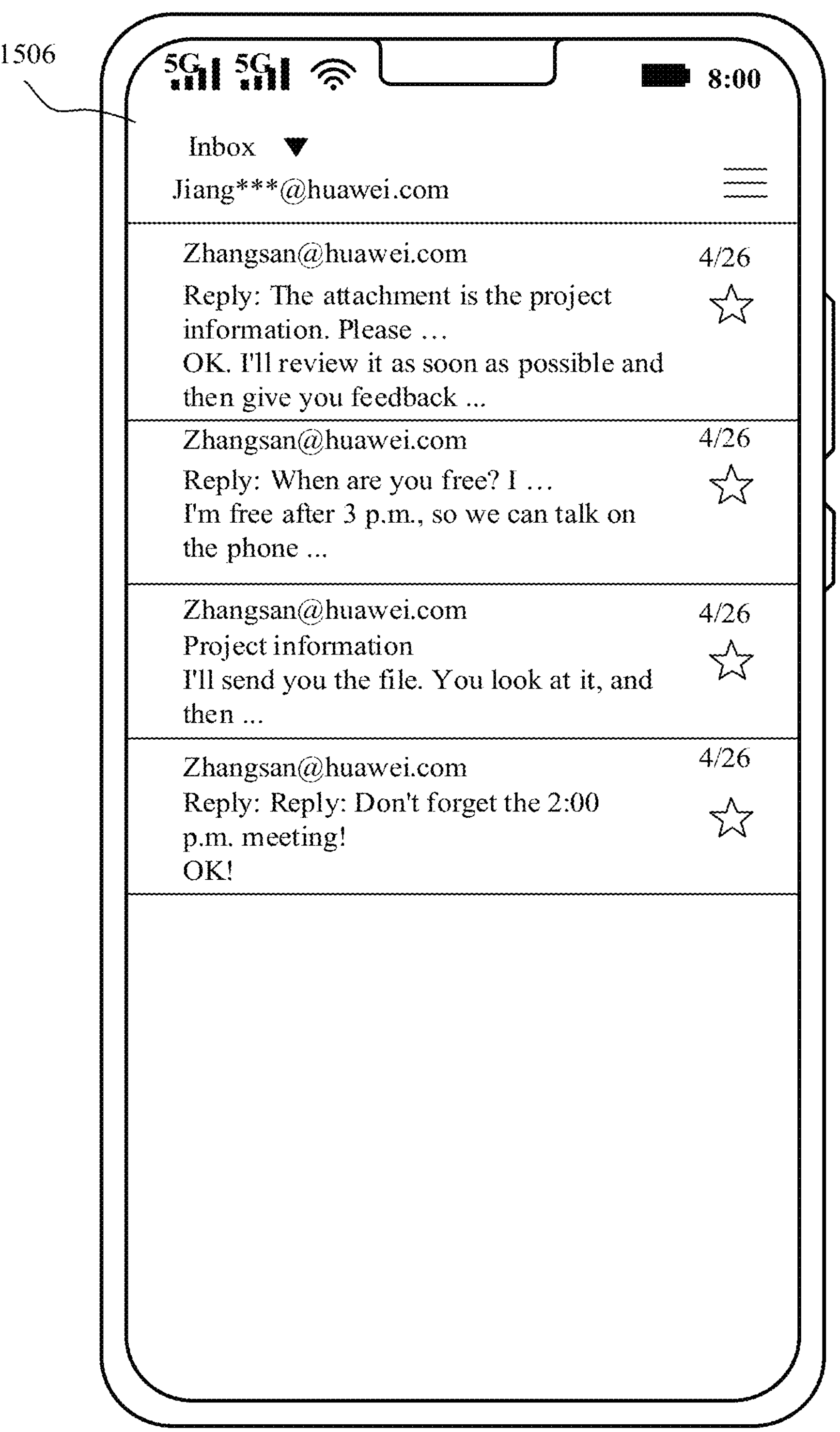
FIG. 15F and FIG. 15G are a schematic diagram 17 of an interface displayed on an electronic device according to an embodiment.
Figure 15G:
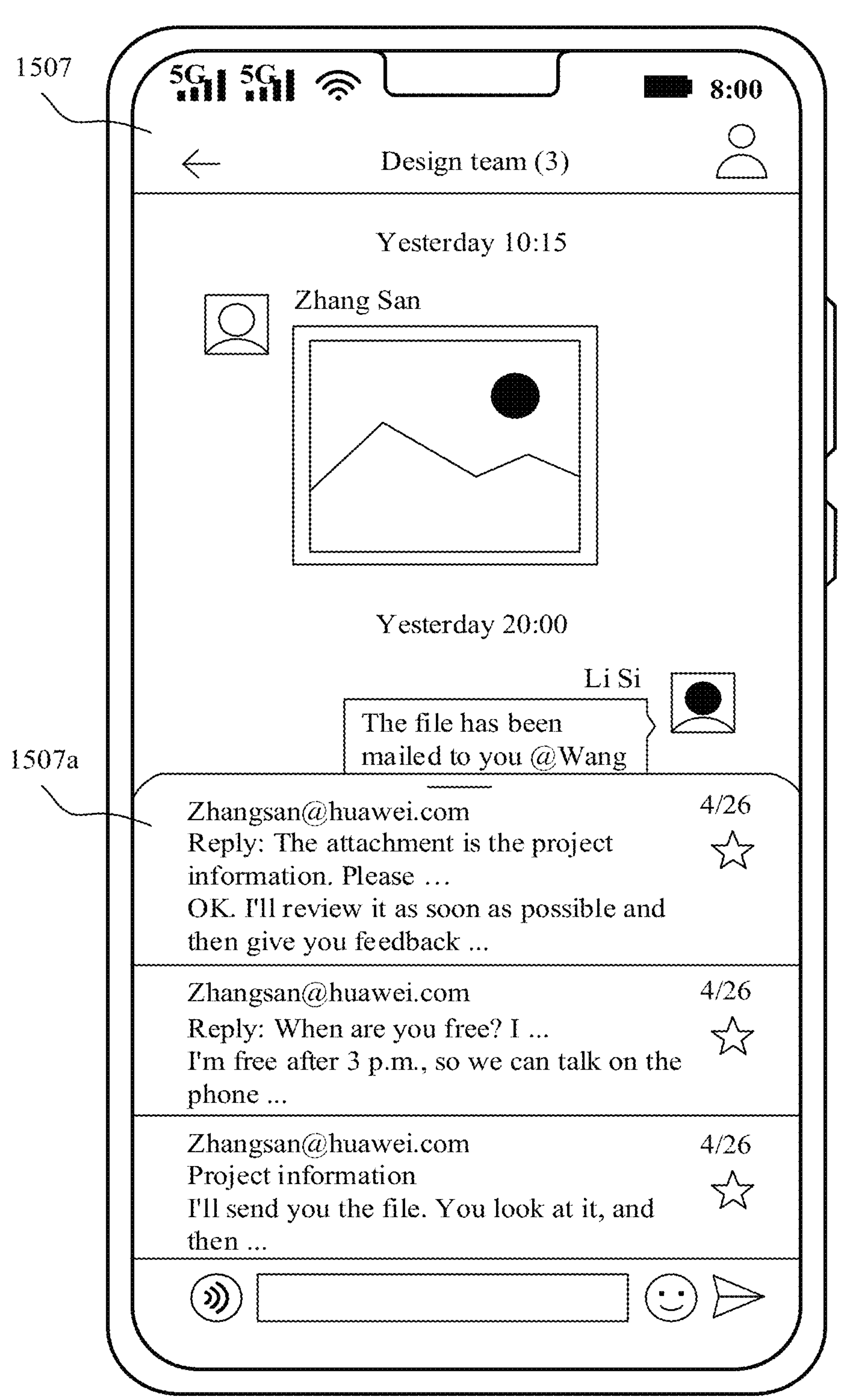

For another example, when the electronic device determines a mailbox of the user in the instant messaging application, after the electronic device receives a tap operation performed by the user on a space in which displayed content is "View emails with Zhang San" in the operation menu 1502*a*, as shown in FIG. 15F, the electronic device may display an interface 1506 of an email application, and display email records with Zhang San (mail address "zhangsan@huawei.com") on the interface 1506. Alternatively, after the electronic device receives a tap operation performed by the user on a space in which displayed content is "View emails with Zhang San" in the operation menu 1502*a*, as shown in FIG. 15G, the electronic device displays a preset display unit, that is, a pop-up window 1507*a*, on an interface 1507. The pop-up window 1507*a* includes email records with Zhang San (mail address "zhangsan@huawei.com"). In a specific implementation process, the preset display unit may alternatively be a display unit in another form such as a floating window or a split-screen interface. This is not limited in this embodiment of this disclosure.

Figure 16A:
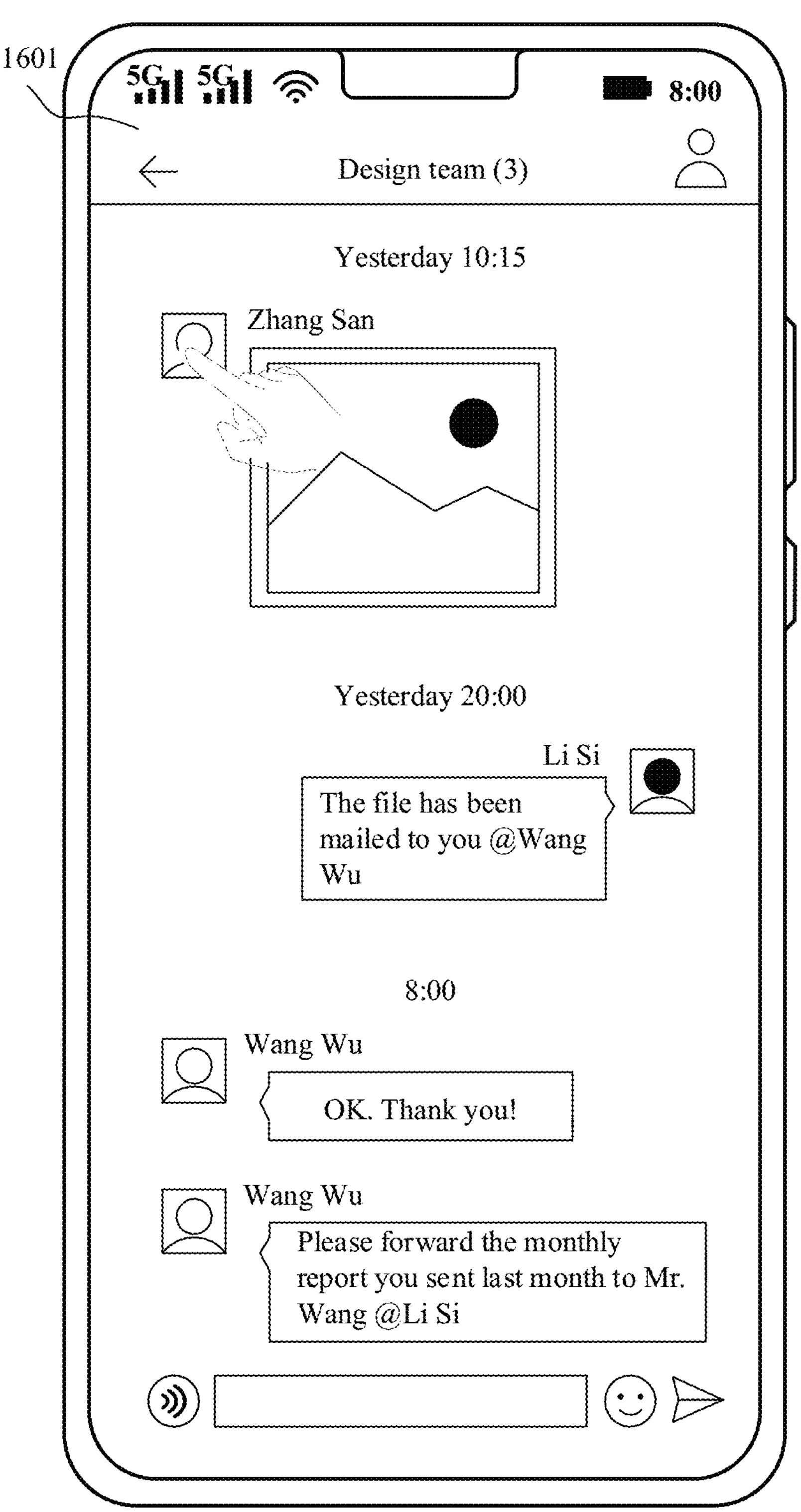
FIG. 16A to FIG. 16D are a schematic diagram 18 of an interface displayed on an electronic device according to an embodiment.

In a second implementation, for example, as shown in FIG. 16A, the electronic device displays a chat interface 1601 (the chat interface 1601 may be understood as the first interface) of an instant messaging application (in this case, the instant messaging application may be understood as the first application). After the electronic device receives a tap operation performed by the user on a user avatar of Zhang San on the chat interface 1601, different from the foregoing first implementation, in this implementation, the electronic device may not display an operation menu, but display a historical information record in response to the first operation.

Figure 16B:
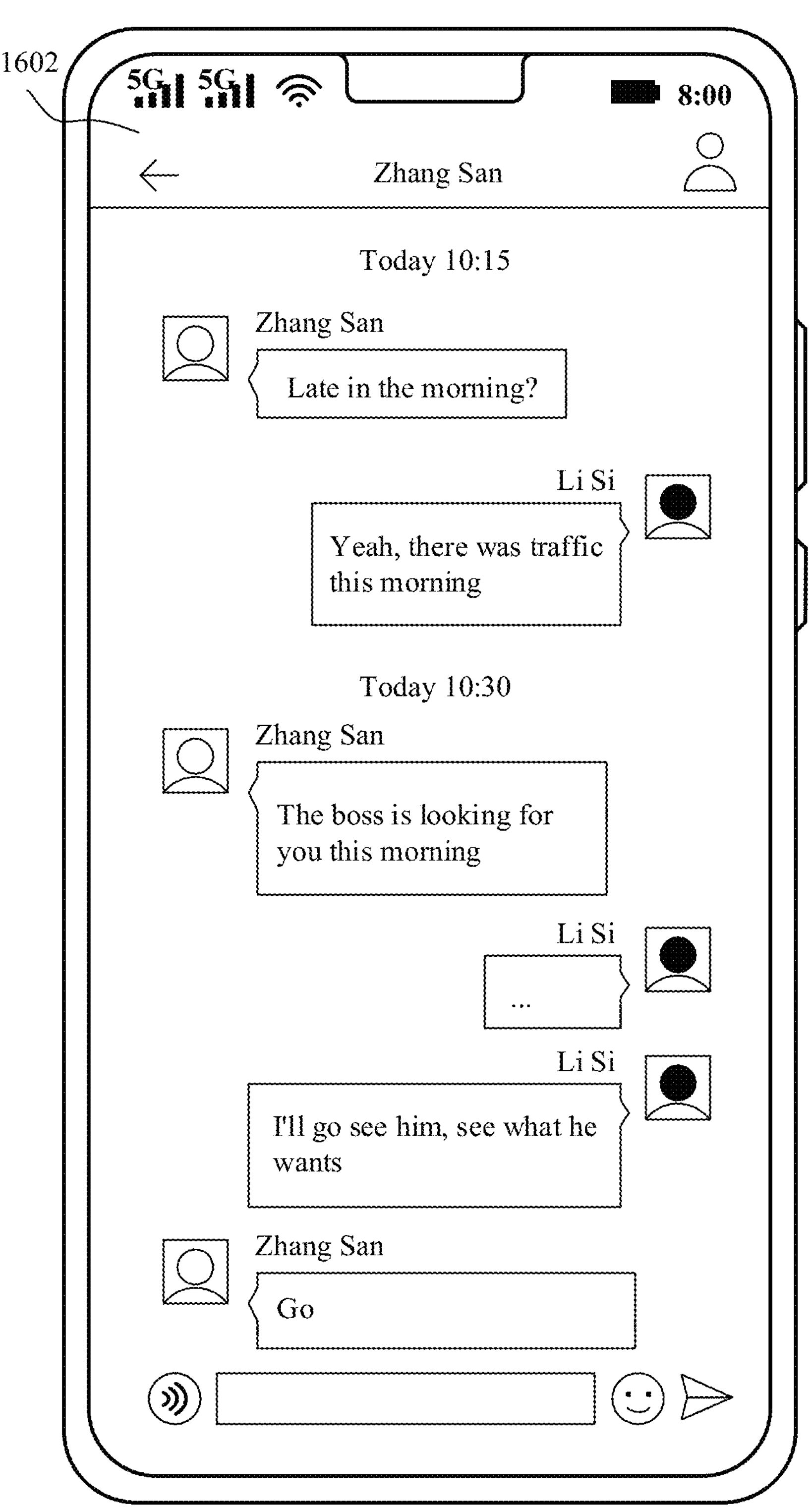

For example, after the electronic device receives a tap operation performed by the user on the user avatar of Zhang San on the chat interface 1601, as shown in FIG. 16B, the electronic device displays chat records with Zhang San on an interface 1602 in response to the tap operation.

Figure 16C:
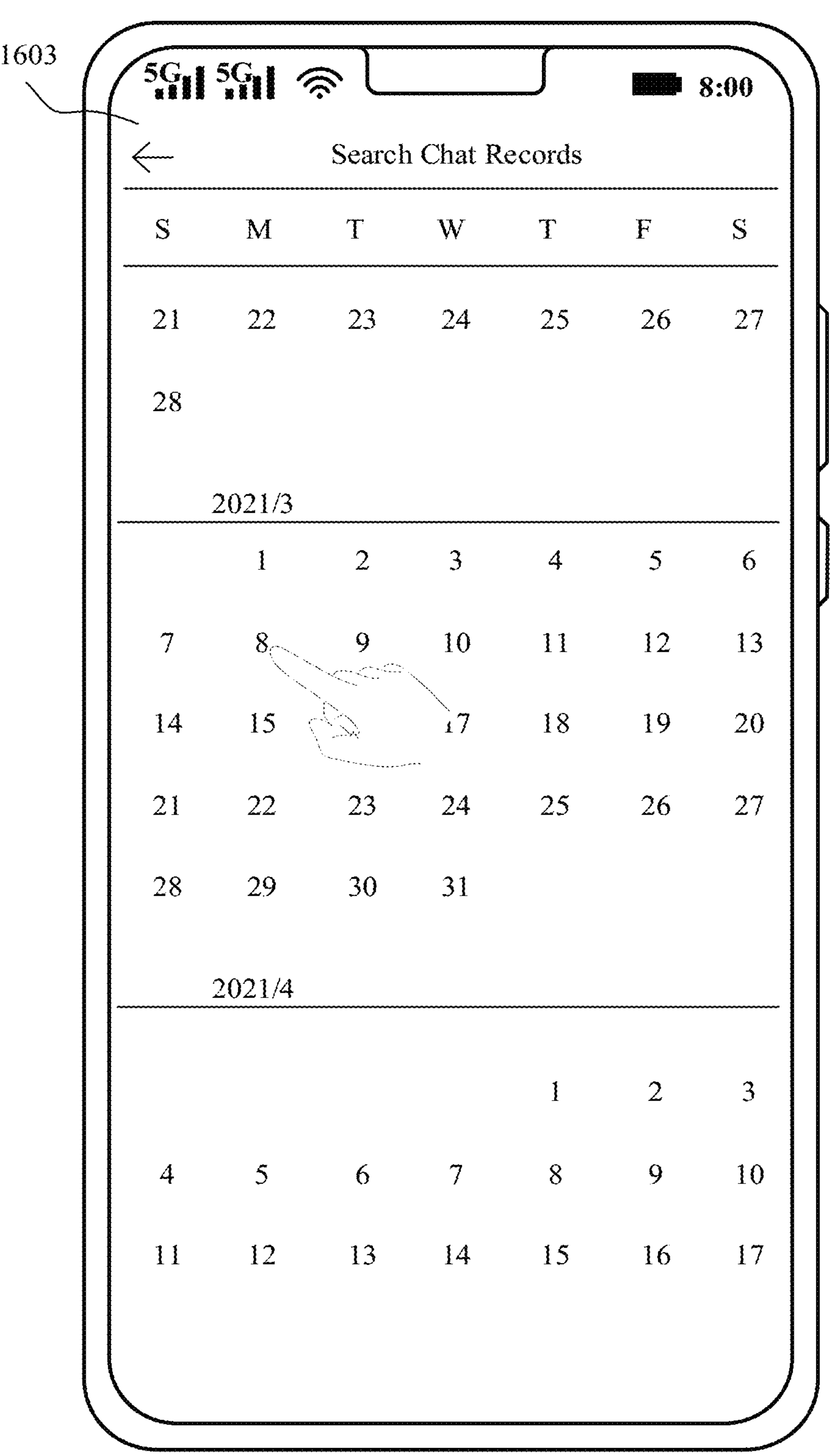
Figure 16D:
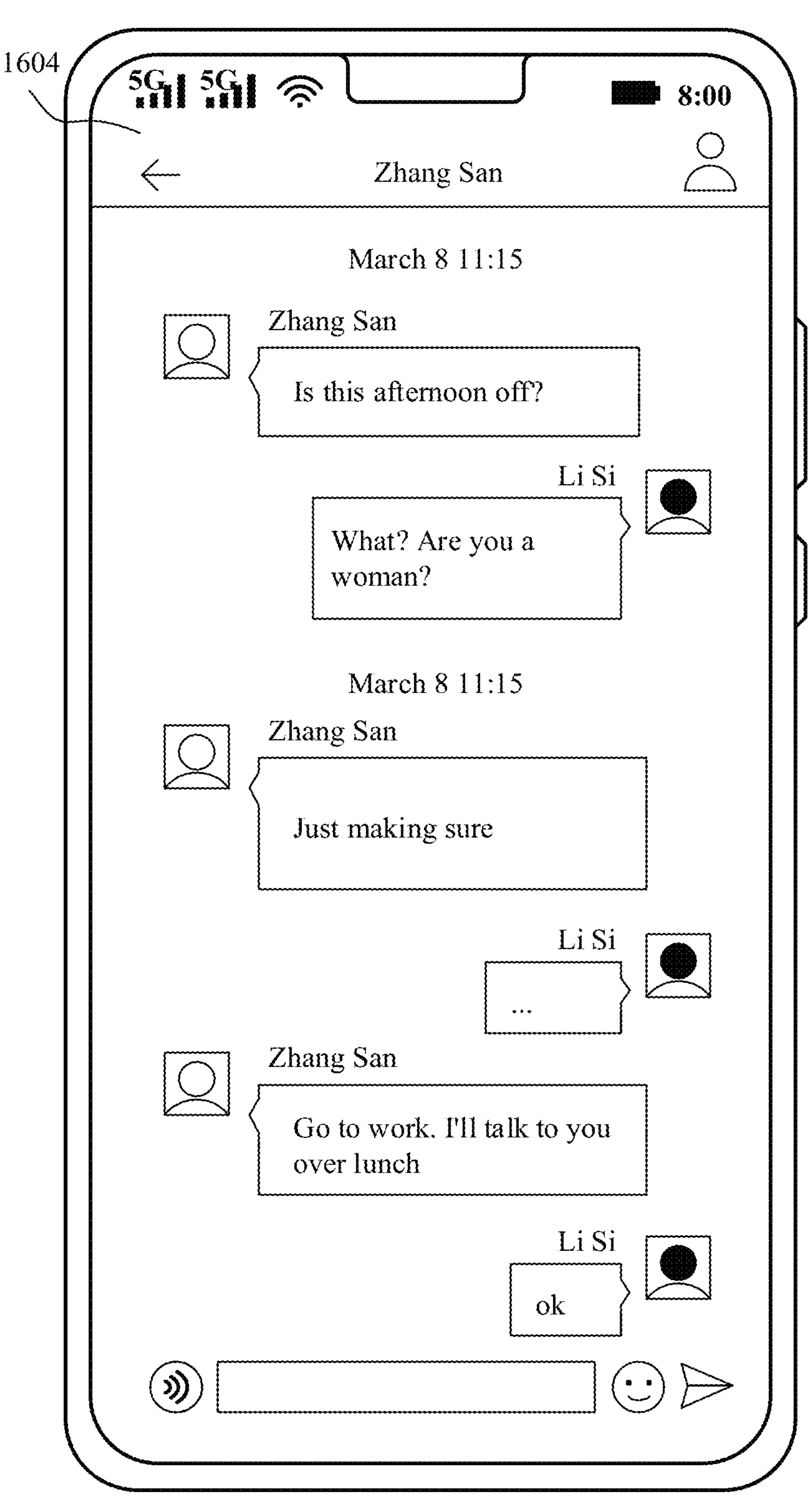

For another example, after the electronic device receives a tap operation performed by the user on the user avatar of Zhang San on the chat interface 1601, as shown in FIG. 16C, the electronic device displays an interface 1603 in response to the tap operation, and displays a calendar on the interface 1603. Then, after receiving an operation that the user selects a date in the calendar, as shown in FIG. 16D, the electronic device displays chat records with Zhang San on the date.

For another example, after the electronic device receives a tap operation performed by the user on the user avatar of Zhang San on the chat interface 1601, as shown in FIG. 15F, the electronic device may display an interface 1506 of an email application, and display email records with Zhang San (mail address "zhangsan@huawei.com") on the interface 1506. Alternatively, after the electronic device receives a tap operation performed by the user on the user avatar of Zhang San on the chat interface 1601, as shown in FIG. 15G, the electronic device displays a preset display unit, that is, a pop-up window 1507*a*, on an interface 1507. The pop-up window 1507*a* includes email records with Zhang San (mail address "zhangsan@huawei.com"). In a specific implementation process, the preset display unit may alternatively be a display unit in another form such as a floating window or a split-screen interface. This is not limited in this embodiment of this disclosure.

Figure 17:
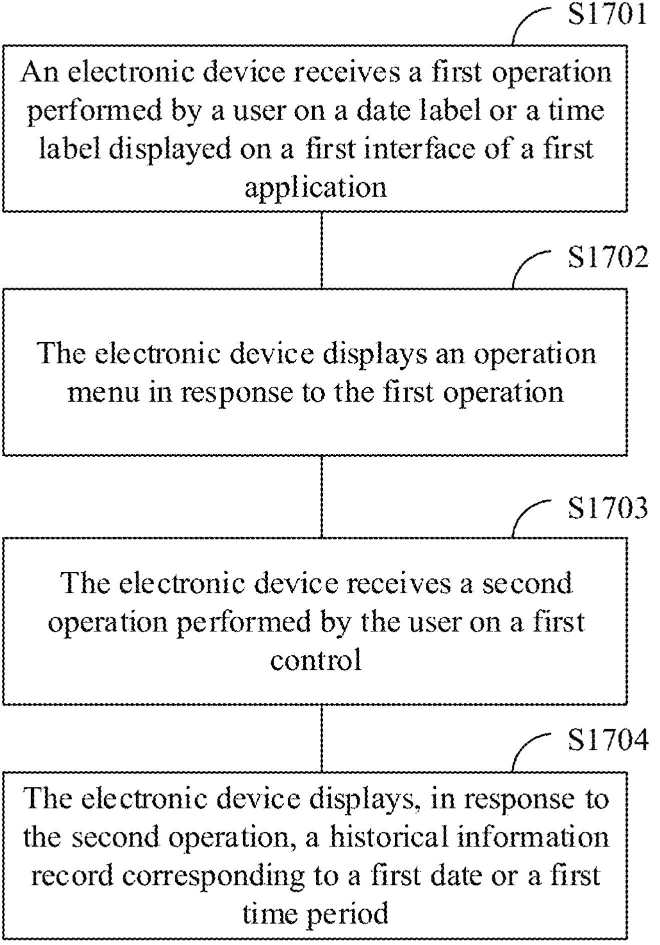
FIG. 17 is a schematic flowchart 1 of an information display method according to an embodiment.

Based on the foregoing examples, an embodiment of this disclosure provides an information display method. Refer to FIG. 17. The method may include the following steps.

S1701: An electronic device receives a first operation performed by a user on a date label or a time label displayed on a first interface of a first application.

The date label indicates a date corresponding to information displayed on the first interface, and the time label indicates time information corresponding to the information displayed on the first interface.

For example, the first operation may be a tap operation performed by the user on the date label or the time label on the chat interface (that is, the interface 401, the interface 501, the interface 601, the interface 701, the interface 801, or the interface 901) of the instant messaging application in the foregoing example.

It should be noted that, in a specific implementation process, the first interface of the first application may be various interfaces that display information having a corresponding time or date. For example, the first application may be the instant messaging application, an email application, an SMS application, a call application, a schedule application, or a calendar application. The first interface of the first application may be a chat interface of the instant messaging application, an email list interface of the email application, an SMS list interface of the SMS application, a call record list interface of the call application, a schedule list interface of the schedule application or the calendar application, or the like. In other words, in this embodiment of this application, specific types of the first application and the first interface may not be limited.

S1702: The electronic device displays an operation menu in response to the first operation.

The operation menu includes a first control.

For example, the operation menu may be the operation menu 402*a*, 502*a*, 602*a*, 702*a*, 802*a*, or 902*a* in the foregoing example, and the first control may be a control in the operation menu in the foregoing example. It should be noted that, in the foregoing example, the operation menu is mainly described in a form of a floating window. In some scenarios, the operation menu may alternatively be displayed in another form such as a sliding window or a split-screen interface. This may not be limited in this disclosure.

S1703: The electronic device receives a second operation performed by the user on the first control.

For example, the second operation may be a tap operation performed by the user on a control in the operation menu in the foregoing example. In addition, the second operation may alternatively be a double-tap operation, a touch and hold operation, a press operation, or the like. This may not be limited in this disclosure.

S1704: The electronic device displays, in response to the second operation, a historical information record corresponding to a first date or a first time period.

For example, in the foregoing example, the electronic device displays a chat record on a corresponding date or within a corresponding time period in response to the tap operation performed by the user on the control in the operation menu.

That the electronic device displays a historical information record corresponding to a first date or a first time period may be understood as follows: The electronic device displays all or some historical information records on the date or within the time period on an interface. In addition, to help the user view all the historical information records on the date or within the time period, when the electronic device displays some historical information records on the date or within the time period on the interface, the electronic device may display other historical information records on the interface after receiving a user operation.

In an implementation, content displayed on the first control includes information indicating the first date or information indicating the first time period.

For example, the first control may be the control on which displayed content is "View messages on this day" or "View messages on the previous day" in the operation menu 402*a* in FIG. 4B. Alternatively, the first control may be the control on which displayed content is "View messages within 4 hours before", "View messages within 12 hours before", "View schedules within 4 hours before", "View emails within 4 hours before", or the like in the operation menu 902*a* in FIG. 9B.

In a possible design, the first date is consistent with a date indicated by the date label; or the first time period corresponds to a time indicated by the time information indicated by the time label.

In other words, in this design, the electronic device may display, in response to the second operation, a historical information record on the date indicated by the date label. For example, in the foregoing example, in FIG. 4C, the electronic device displays the chat records on the date (that is, "Yesterday") indicated by the date label. For another example, in FIG. 5C or FIG. 5D, the electronic device displays the email records on the date (that is, "Yesterday") indicated by the date label. For another example, in FIG. 6C or FIG. 6D, the electronic device displays the schedule records on the date (that is, "Yesterday") indicated by the date label.

Alternatively, the electronic device may display, in response to the second operation, a historical information record within a time period corresponding to the time information indicated by the time label. For example, in the foregoing example, in FIG. 9C, the electronic device displays the chat records within 4 hours before the time (that is, 10:15) indicated by the time label. For another example, in FIG. 9D, the electronic device displays the chat records within 12 hours before the time (that is, 10:15) indicated by the time label. For another example, in FIG. 9E or FIG. 9F, the electronic device displays the email record within 4 hours before the time (that is, 10:15) indicated by the time label. For another example, in FIG. 9G or FIG. 9H, the electronic device displays the schedule record within 4 hours before the time (that is, 10:15) indicated by the time label.

In an implementation, S1704 may include the following steps.

S1704*a*: The electronic device displays a second interface in response to the second operation.

The second interface includes a calendar.

For example, the second interface may be the interface 703 shown in FIG. 7C or the interface 803 shown in FIG. 8C.

S1704*b*: After receiving a third operation that the user selects the first date in the calendar, the electronic device displays the historical information record corresponding to the first date.

In an implementation, the displaying a historical information record corresponding to a first date or a first time period includes: displaying a historical information record of the first application on the first date or within the first time period.

For example, in the examples shown in FIG. 4A to FIG. 4D, FIG. 7A to FIG. 7D, FIG. 9A to FIG. 9D, FIG. 9E and FIG. 9F, and FIG. 9G and FIG. 9H, the historical information record displayed by the electronic device is a chat record in the instant messaging application (that is, the first application).

In an implementation, the content displayed on the first control includes an identifier of a second application, and the second application is different from the first application. In addition, that the electronic device displays a historical information record corresponding to a first date or a first time period includes: The electronic device displays a historical information record of the second application on the first date or within the first time period.

For example, in FIG. 4B, for the control on which displayed content is "View emails on this day", the displayed content includes "mails", which may be understood as an identifier of the email application. In addition, after receiving an operation performed by the user on the control on which displayed content is "View emails on this day", the electronic device displays email records in the email application.

In a possible design, the displaying a historical information record of the second application on the first date or within the first time period includes the following steps:

S1: Determine the second application based on the identifier of the second application.

S2: Determine the historical information record of the second application on the first date or within the first time period.

S3: Determine a third interface, where the third interface includes the historical information record of the second application on the first date or within the first time period.

For a specific implementation process of this design, refer to the corresponding descriptions of the examples in FIG. 5A to FIG. 5D, FIG. 6A to FIG. 6D, and/or FIG. 8A to FIG. 8E.

In an implementation, the second application is any one of an instant messaging application, an email application, a schedule application, a calendar application, a call application, or an SMS application.

In an implementation, the first application is any one of an instant messaging application, an email application, a schedule application, a calendar application, a call application, or an SMS application.

Figures 18, 19:
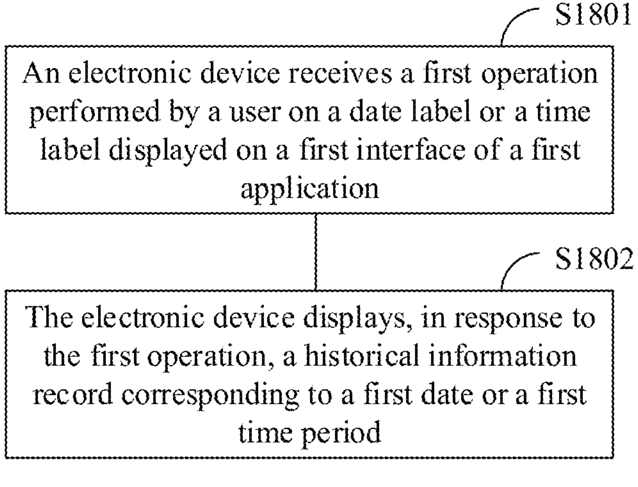
FIG. 18 is a schematic flowchart 2 of an information display method according to an embodiment.
FIG. 19 is a schematic diagram 2 of a structure of an electronic device according to an embodiment.

Based on the foregoing examples, an embodiment of this application further provides another information display method. Refer to FIG. 18. The method may include the following steps.

S1801: An electronic device receives a first operation performed by a user on a date label or a time label displayed on a first interface of a first application.

The date label indicates a date corresponding to information displayed on the first interface, and the time label indicates time information corresponding to the information displayed on the first interface.

For example, the first operation may be a tap operation performed by the user on the date label or the time label on the chat interface (that is, the interface 1001, the interface 1101, the interface 1201, the interface 1301, or the interface 1401) of the instant messaging application in the foregoing example.

S1802: The electronic device displays, in response to the first operation, a historical information record corresponding to a first date or a first time period.

In an implementation, the first date is consistent with a date indicated by the date label; or the first time period corresponds to a time information indicated by the time label.

In other words, in this design, the electronic device may display, in response to the first operation, a historical information record on the date indicated by the date label. For example, as shown in FIG. 10B, the electronic device displays, on the interface 1002, the chat records within the date (that is, "Yesterday") corresponding to the date label.

Alternatively, the electronic device may display, in response to the first operation, a historical information record within a time period corresponding to the time information indicated by the time label. For example, as shown in FIG. 14B, the electronic device displays the chat records within 4 hours from 6:15 to 10:15 yesterday (that is, 4 hours before the time information indicated by the time label) on the interface 1402. For another example, as shown in FIG. 14C, the electronic device displays the chat records within 12 hours from 22:15 the day before yesterday to 10:15 yesterday (that is, 12 hours before the time information indicated by the time label) on the interface 1402.

In an implementation, S1802 may include the following steps.

S1802*a*: The electronic device displays a second interface in response to the first operation.

The second interface includes a calendar.

S1802*b*: After receiving a third operation that the user selects the first date in the calendar, the electronic device displays the historical information record corresponding to the first date.

For a specific implementation process of this implementation, refer to the corresponding descriptions of the example in FIG. 13A to FIG. 13C.

In an implementation, the displaying a historical information record corresponding to a first date or a first time period includes: displaying a historical information record of the first application on the first date or within the first time period.

For a specific implementation process of this implementation, refer to the corresponding descriptions of the examples in FIG. 10A to FIG. 10C, FIG. 13A to FIG. 13C, and FIG. 14A to FIG. 14C.

In an implementation, the displaying a historical information record corresponding to a first date or a first time period includes: displaying a historical information record of a second application on the first date or within the first time period.

For a specific implementation process of this implementation, refer to the corresponding descriptions of the examples in FIG. 11A to FIG. 11C and FIG. 12A to FIG. 12C.

In a possible design, the second application is any one of an instant messaging application, an email application, a schedule application, a calendar application, a call application, or an SMS application.

In an implementation, the first application is any one of an instant messaging application, an email application, a schedule application, a calendar application, a call application, or an SMS application.

It may be understood that, to implement corresponding functions, the electronic device includes corresponding hardware structures and/or software modules for performing the functions. In embodiments of this disclosure, the electronic device is divided into function modules based on the foregoing method examples. For example, each function module may be obtained through division for each function. In addition, two or more functions may be integrated into one processing module. The integrated module may be implemented in a form of hardware, or may be implemented in a form of a software function module. Optionally, module division in embodiments of this disclosure is an example, and is merely logical function division. During actual implementation, there may be another division manner.

FIG. 19 is a schematic composition diagram of an electronic device according to an embodiment of this disclosure. The electronic device 190 may be a distributed system including one or more computer nodes. Different hardware components or software modules included in the electronic device may be deployed on different computer nodes, to perform the information display method provided in embodiments of this disclosure. The electronic device 190 may alternatively be a software function that can implement the foregoing information display method, or a virtualization function instantiated on a platform (for example, a cloud platform). The electronic device 190 may be configured to perform the information display method provided in the foregoing embodiments. In an implementation, the electronic device 190 may include a receiving unit 1901 and a display unit 1902.

The receiving unit 1901 is configured to receive a first operation performed by a user on a date label or a time label displayed on a first interface of a first application, where the date label indicates a date corresponding to information displayed on the first interface, and the time label indicates time information corresponding to the information displayed on the first interface.

The display unit 1902 is configured to display an operation menu in response to the first operation, where the operation menu includes a first control.

The receiving unit 1901 is further configured to receive a second operation performed by the user on the first control.

The display unit 1902 is configured to display, in response to the second operation, a historical information record corresponding to a first date or a first time period.

Optionally, content displayed on the first control includes information indicating the first date or information indicating the first time period.

Optionally, the first date is consistent with a date indicated by the date label; or the first time period corresponds to a time indicated by the time information indicated by the time label.

Optionally, that the display unit 1902 is configured to display, in response to the second operation, a historical information record corresponding to a first date or a first time period includes: the display unit 1902 is further configured to display a second interface in response to the second operation, where the second interface includes a calendar; and the display unit 1902 is further configured to: after receiving a third operation that the user selects the first date in the calendar, display the historical information record corresponding to the first date.

Optionally, the displaying a historical information record corresponding to a first date or a first time period includes: displaying a historical information record of the first application on the first date or within the first time period.

Optionally, the content displayed on the first control includes an identifier of a second application, and the second application is different from the first application. The displaying a historical information record corresponding to a first date or a first time period includes: displaying a historical information record of the second application on the first date or within the first time period.

Optionally, the displaying a historical information record of the second application on the first date or within the first time period includes: determining the second application based on the identifier of the second application; determining the historical information record of the second application on the first date or within the first time period; and displaying a third interface, where the third interface includes the historical information record of the second application on the first date or within the first time period.

Optionally, the second application is any one of an instant messaging application, an email application, a schedule application, a calendar application, a call application, or an SMS application.

Optionally, the first application is any one of an instant messaging application, an email application, a schedule application, a calendar application, a call application, or an SMS application.

In another implementation, in the electronic device 190: the receiving unit 1901 is configured to receive a first operation performed by a user on a date label or a time label displayed on a first interface of a first application, where the date label indicates a date corresponding to information displayed on the first interface, and the time label indicates time information corresponding to the information displayed on the first interface; and the display unit 1902 is configured to display, in response to the first operation, a historical information record corresponding to a first date or a first time period.

Optionally, the first date is consistent with a date indicated by the date label; or the first time period corresponds to a time indicated by the time information indicated by the time label.

Optionally, that the display unit 1902 is configured to display, in response to the first operation, a historical information record corresponding to a first date or a first time period includes: the display unit 1902 is further configured to display a second interface in response to the first operation, where the second interface includes a calendar; and the display unit 1902 is f configured to: after receiving a third operation that the user selects the first date in the calendar, display the historical information record corresponding to the first date.

Optionally, the displaying a historical information record corresponding to a first date or a first time period includes: displaying a historical information record of the first application on the first date or within the first time period.

Optionally, the displaying a historical information record corresponding to a first date or a first time period includes: displaying a historical information record of a second application on the first date or within the first time period, where the second application is different from the first application.

Optionally, the second application is any one of an instant messaging application, an email application, a schedule application, a calendar application, a call application, or an SMS application.

Optionally, the first application is any one of an instant messaging application, an email application, a schedule application, a calendar application, a call application, or an SMS application.

An embodiment of this disclosure further provides a chip. The chip includes a processing circuit and an interface. The processing circuit is configured to invoke, from a storage medium, a computer program stored in the storage medium, and run the computer program, to perform the foregoing information display method.

An embodiment of this disclosure further provides a computer-readable storage medium. The computer-readable storage medium stores instructions or code. When the instructions are run or the code is run on a computer, the computer is enabled to perform the foregoing information display method.

An embodiment of this disclosure further provides a computer program product. The computer program product includes instructions. When the computer program product runs on a computer, the computer is enabled to perform the foregoing information display method.

All or some of the functions, actions, operations, steps, and the like in the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this disclosure are generated. The computer may be a general-purpose computer, a special-purpose computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

Although this disclosure has been described with reference to specific features and embodiments thereof, it is obvious that various modifications and combinations may be made to this disclosure without departing from the spirit and scope of this disclosure. Correspondingly, this specification and the accompanying drawings are merely example descriptions of this disclosure defined by the appended claims, and are deemed to have covered any and all modifications, variations, combinations, or equivalents that fall within the scope of this disclosure. It is clear that a person skilled in the art can make various modifications and variations to this disclosure without departing from the spirit and scope of this disclosure. This disclosure is also intended to cover these modifications and variations of this disclosure provided that they fall within the scope of protection defined by the following claims and their equivalent technologies.

What is claimed is:

1. A method applied to an electronic device, the method comprising:

receiving a first user-selected operation on a date label or a time label displayed on a first interface of a first application, wherein the date label indicates a historical date corresponding to information displayed on the first interface, and wherein the time label indicates historical time information corresponding to the information displayed on the first interface;

displaying, in response to receiving the first user-selected operation, an operation menu comprising a first control, wherein the first control comprises an identifier of a second application and indicates a manner of displaying a historical information record and includes a historical date corresponding to the date label or a historical time period corresponding to the time label;

receiving a second user-selected operation on the first control; and displaying, in response to receiving the second user-selected operation on the first control, the historical information record of the second application that corresponds to a first date or a first time period according to the manner and on a second interface of the second application.

2. The method of claim 1, wherein the first control comprises information indicating the first date or information indicating the first time period.

3. The method of claim 2, wherein the first date is consistent with a date indicated by the date label or the first time period corresponds to a time indicated by the time information.

4. The method of claim 1, further comprising:

displaying a calendar interface in response to the second user-selected operation, wherein the second interface comprises a calendar;

receiving a user selection of the first date; and further displaying the historical information record in response to the selection.

5. The method of claim 1, wherein displaying the historical information record of the second application comprises displaying the historical information record in a preset display on the first interface of the first application, and wherein the preset display is a pop-up window, a floating window, or a split-screen interface.

6. The method of claim 1 further comprising displaying the historical information record on the first date or within the first time period.

7. The method of claim 6, further comprising:

determining the second application based on the identifier of the second application;

determining the historical information record of the second application on the first date or within the first time period; and further displaying the historical information record on a third interface on the first date or within the first time period.

8. The method of claim 6, wherein the second application is any one of an instant messaging application, an email application, a schedule application, a calendar application, a call application, or a short messaging service (SMS) application.

9. The method of claim 1, wherein the first application is any one of an instant messaging application, an email application, a schedule application, a calendar application, a call application, or a short messaging service (SMS) application.

10. An electronic device comprising:

one or more memories configured to store computer program code comprising computer instructions; and at least one processor coupled to the one or more memories and configured to execute the computer instructions to cause the electronic device to:

receive a first user-selected operation on a date label or a time label displayed on a first interface of a first application, wherein the date label indicates a historical date corresponding to information displayed on the first interface, and wherein the time label indicates historical time information corresponding to the information displayed on the first interface;

display, in response to receiving the first user-selected operation on the date label or the time label, an operation menu comprising a first control, wherein the first control comprises an identifier of a second application and indicates a manner of displaying a historical information record and includes a historical date corresponding to the date label and a historical time period corresponding to the time label;

receive a second user-selected operation on the first control; and display, in response to receiving the second user-selected operation, the historical information record of the second application that corresponds to a first date or a first time period according to the manner and on a second interface of the second application.

11. The electronic device of claim 10, wherein the first control comprises information indicating the first date or information indicating the first time period.

12. The electronic device of claim 11, wherein the first date is consistent with a date indicated by the date label or the first time period corresponds to a time indicated by the time information.

13. The electronic device of claim 10, wherein the at least one processor is further configured to execute the computer instructions to cause the electronic device to:

display a calendar interface in response to the second user-selected operation, wherein the calendar interface comprises a calendar;

receive a user selection of the first date; and further display the historical information record in response to the selection.

14. The electronic device of claim 10, wherein the at least one processor is further configured to execute the computer instructions to cause the electronic device to display the historical information record in a preset display on the first interface of the first application, and wherein the preset display is a pop-up window, a floating window, or a split-screen interface.

15. The electronic device of claim 10, wherein the at least one processor is further configured to execute the computer instructions to cause the electronic device to display the historical information record on the first date or within the first time period.

16. The electronic device of claim 15, wherein the at least one processor is further configured to execute the computer instructions to cause the electronic device to:

determine the second application based on the identifier of the second application;

determine the historical information record of the second application on the first date or within the first time period; and further display the historical information record on a third interface on the first date or within the first time period.

17. The electronic device of claim 15, wherein the second application is any one of an instant messaging application, an email application, a schedule application, a calendar application, a call application, or a short messaging service (SMS) application.

18. The electronic device of claim 10, wherein the first application is any one of an instant messaging application, an email application, a schedule application, a calendar application, a call application, or a short messaging service (SMS) application.

19. A computer program product comprising instructions that are stored on a non-transitory computer-readable medium and that, when executed by at least one processor, cause an electronic device to:

receive a first user-selected operation on a date label or a time label displayed on a first interface of a first application, wherein the date label indicates a historical date corresponding to information displayed on the first interface, and wherein the time label indicates historical time information corresponding to the information displayed on the first interface;

display, in response to receiving the first user-selected operation, an operation menu comprising a first control, wherein the first control comprises an identifier of a second application and indicates a manner of displaying a historical information record and includes a historical date corresponding to the date label and a historical time period corresponding to the time label;

receive a second user-selected operation on the first control; and display, in response to receiving the second user-selected operation on the first control, a historical information record of the second application that corresponds to a first date or a first time period according to the manner and on a second interface of the second application.

20. The computer program product of claim 19, wherein the first control comprises information indicating the first date or information indicating the first time period.

* * * * *